United States Patent
Yamamoto et al.

(10) Patent No.: US 6,835,332 B2
(45) Date of Patent: Dec. 28, 2004

(54) PROCESS FOR PRODUCING AN ELECTRODE MATERIAL FOR A RECHARGEABLE LITHIUM BATTERY, AN ELECTRODE STRUCTURAL BODY FOR A RECHARGEABLE LITHIUM BATTERY, PROCESS FOR PRODUCING SAID ELECTRODE STRUCTURAL BODY, A RECHARGEABLE LITHIUM BATTERY IN WHICH SAID ELECTRODE STRUCTURAL BODY IS USED, AND A PROCESS FOR PRODUCING SAID RECHARGEABLE LITHIUM BATTERY

(75) Inventors: Tomoya Yamamoto, Nara (JP); Soichiro Kawakami, Nara (JP); Hiroya Umeyama, Toyota (JP)

(73) Assignee: Canon Kabushiki Kaisha, Tokyo (JP)

( * ) Notice: Subject to any disclaimer, the term of this patent is extended or adjusted under 35 U.S.C. 154(b) by 240 days.

(21) Appl. No.: 09/804,191

(22) Filed: Mar. 13, 2001

(65) Prior Publication Data

US 2002/0015889 A1 Feb. 7, 2002

(30) Foreign Application Priority Data

Mar. 13, 2000 (JP) .................................... 2000-069100

(51) Int. Cl.$^7$ ............................. B05D 5/12; C22B 5/18; C22C 13/00; H01M 4/04; B22F 9/16

(52) U.S. Cl. ................. 252/519.1; 252/500; 252/518.1; 252/519.5; 420/557; 420/563; 420/576; 420/577; 423/89; 423/87; 423/99; 423/138; 429/226; 429/218.1; 429/231.5

(58) Field of Search ............................ 252/518.1, 519.1, 252/519.5, 519.14, 520.1, 522.2; 420/402, 415, 435, 557, 563, 576, 577, 441, 457; 429/218, 220, 221, 226, 218.1, 231.5; 423/89, 87, 99, 138; 75/351

(56) References Cited

U.S. PATENT DOCUMENTS

| 4,163,829 A | | 8/1979 | Kronenberg ................. 429/194 |
| 4,397,812 A | * | 8/1983 | Mallory, Jr. ................. 420/441 |
| 5,039,582 A | | 8/1991 | Pistoia ........................ 429/218 |
| 5,308,377 A | * | 5/1994 | Bonnemann et al. .......... 75/351 |
| 5,435,830 A | | 7/1995 | Senda et al. ................... 75/370 |
| 5,795,679 A | * | 8/1998 | Kawakami et al. ...... 429/218.1 |
| 6,528,208 B1 | * | 3/2003 | Thackeray et al. ...... 429/218.1 |

FOREIGN PATENT DOCUMENTS

| EP | 1 033 767 | 9/2000 |
| EP | 1 039568 | 9/2000 |
| JP | 54-78434 | 6/1979 |
| JP | 62-15761 | 1/1987 |
| JP | 62-93866 | 4/1987 |
| JP | 62-113366 | 5/1987 |
| JP | 63-13264 | 1/1988 |
| JP | 63-13267 | 1/1988 |

(List continued on next page.)

*Primary Examiner*—Mark Kopec
*Assistant Examiner*—Kallambella Vijayakumar
(74) *Attorney, Agent, or Firm*—Fitzpatrick, Cella, Harper & Scinto

(57) ABSTRACT

A process for producing an electrode material for a rechargeable lithium battery, comprising the steps of mixing a metal compound (a) of a metal (a') capable of being electrochemically alloyed with lithium, a transition metal compound (b) of a transition metal (b') and a complexing agent (c) with a solvent (d) to obtain a mixed solution, mixing a reducing agent (e) with said mixed solution to obtain a mixture, and oxidizing said reducing agent in said mixture to reduce ion of said metal (a') and ion of said transition metal (b') to obtain an amorphous alloy material capable of being electrochemically alloyed with lithium as said electrode material. An electrode structural body in which said electrode material is used, and a rechargeable lithium battery in which said electrode material is used.

69 Claims, 7 Drawing Sheets

FOREIGN PATENT DOCUMENTS

| | | |
|---|---|---|
| JP | 63-114057 | 5/1988 |
| JP | 2-12768 | 1/1990 |
| JP | 362464 | 3/1991 |
| JP | 5-47381 | 2/1993 |
| JP | 5-78716 | 3/1993 |
| JP | 5-190171 | 7/1993 |
| JP | 8-64239 | 3/1996 |
| JP | 10-223221 | 8/1998 |
| JP | 10-317021 | 12/1998 |
| JP | 11-329442 | 11/1999 |

* cited by examiner

F I G. 1
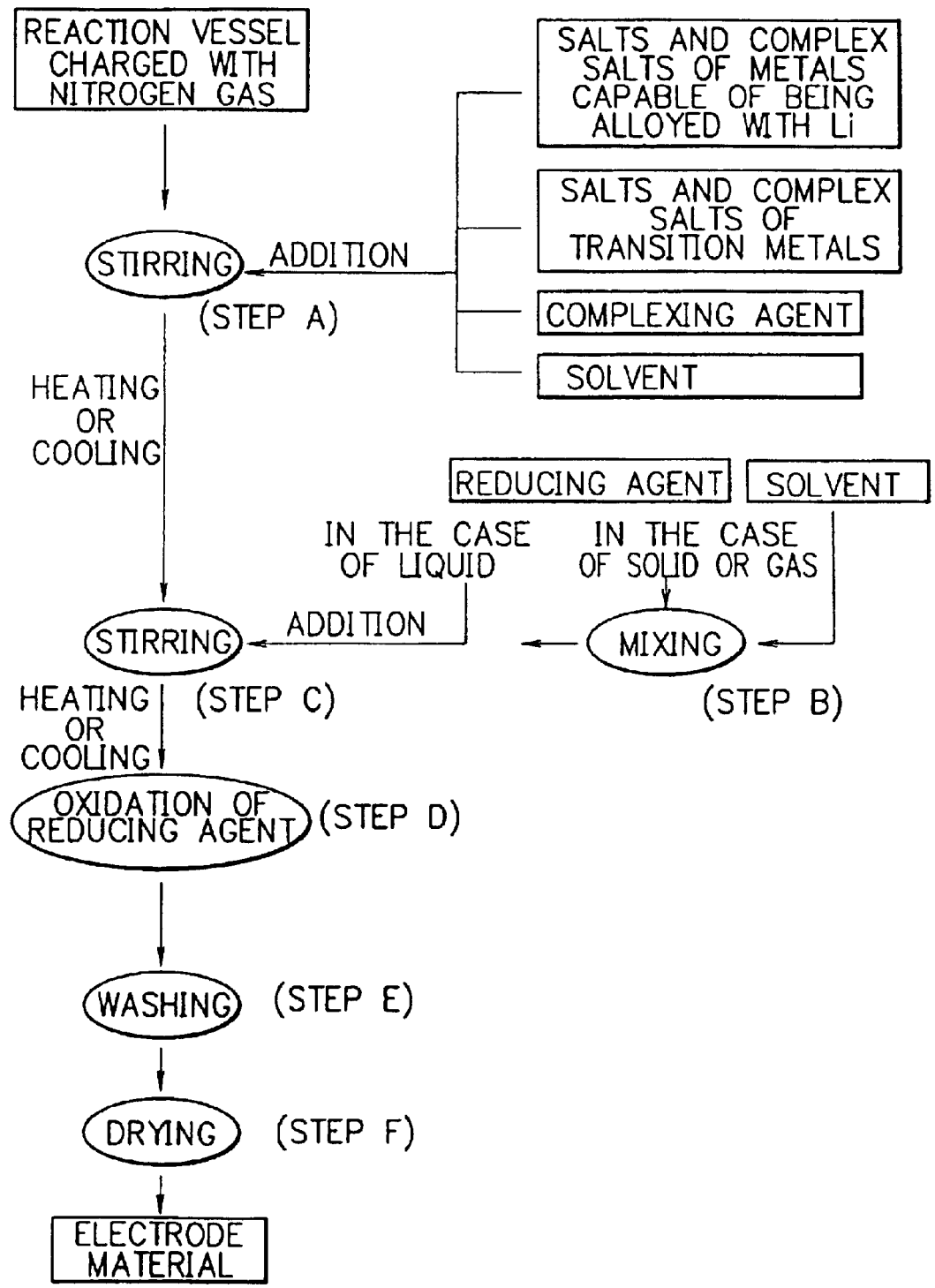

F I G. 2
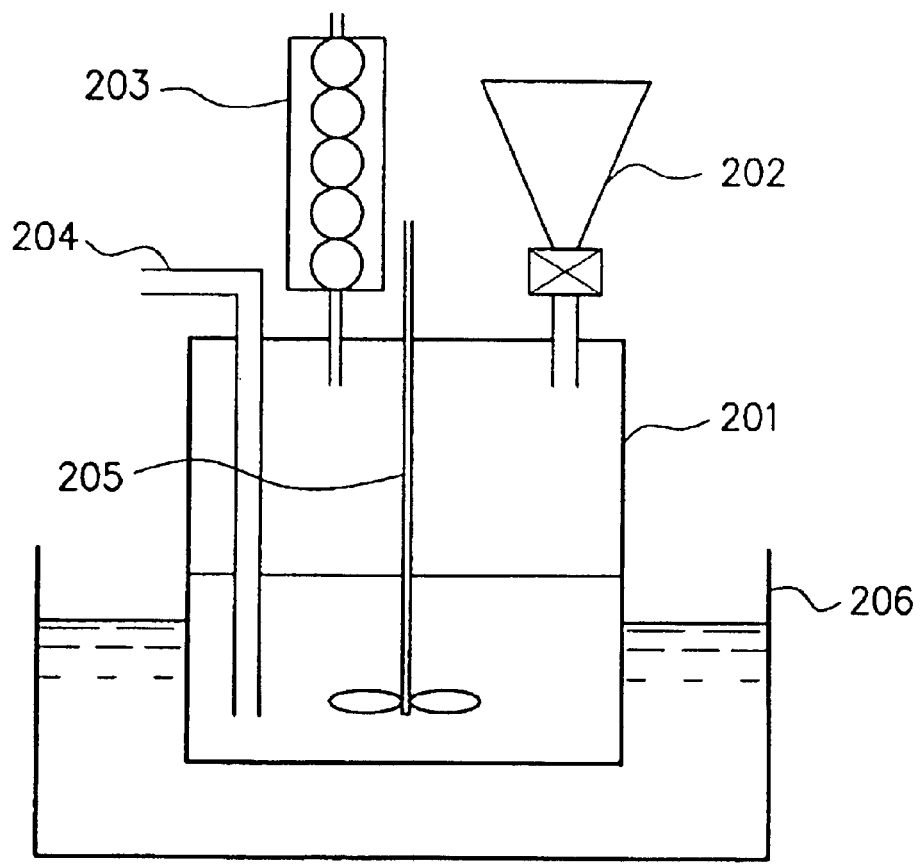

F I G. 3
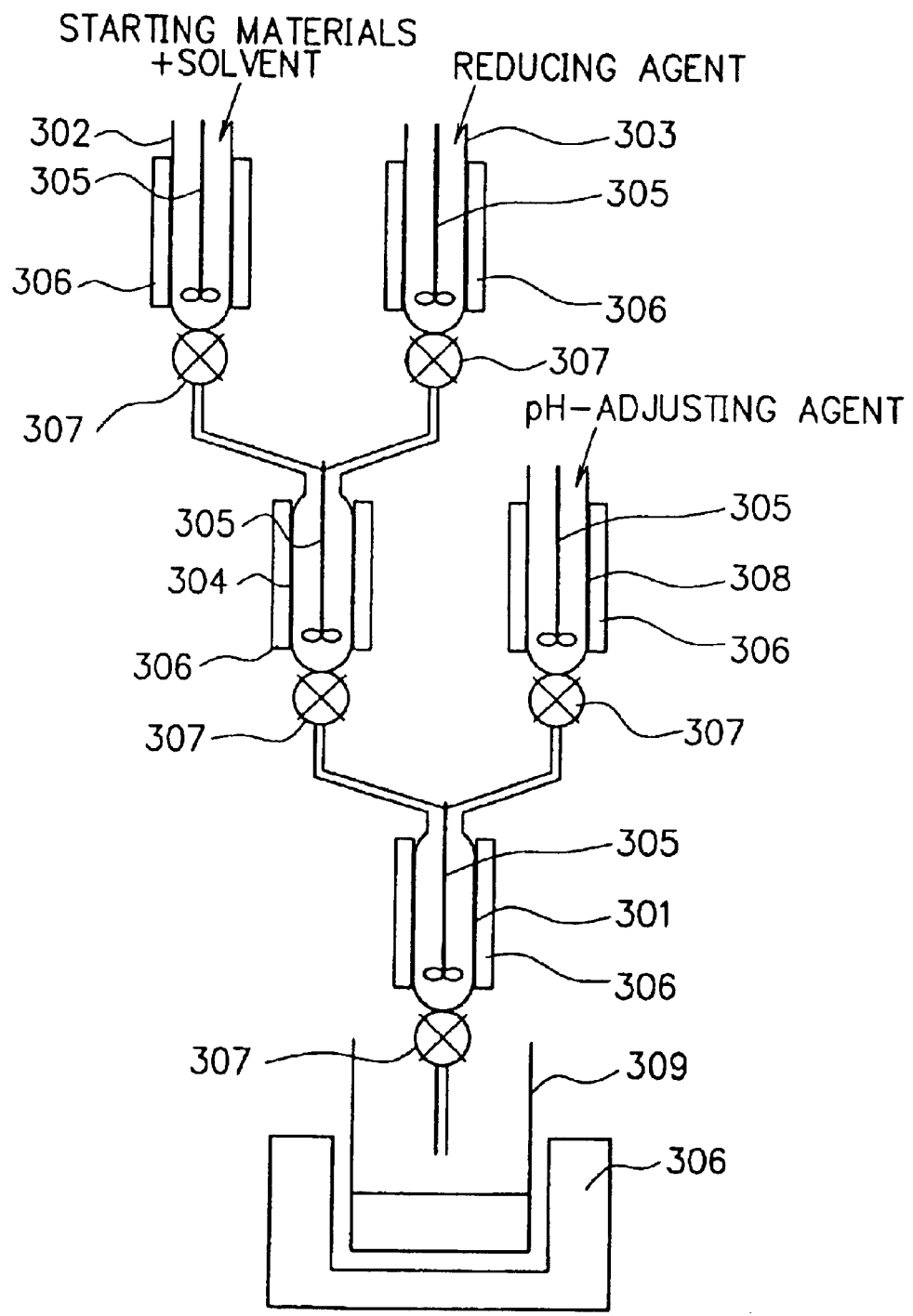

(1)

(2)

PROCESS FOR PRODUCING AN ELECTRODE MATERIAL FOR A RECHARGEABLE LITHIUM BATTERY, AN ELECTRODE STRUCTURAL BODY FOR A RECHARGEABLE LITHIUM BATTERY, PROCESS FOR PRODUCING SAID ELECTRODE STRUCTURAL BODY, A RECHARGEABLE LITHIUM BATTERY IN WHICH SAID ELECTRODE STRUCTURAL BODY IS USED, AND A PROCESS FOR PRODUCING SAID RECHARGEABLE LITHIUM BATTERY

BACKGROUND OF THE INVENTION

1. Field of the Invention

The present invention relates to a process for producing an electrode material which can be desirably used in the production of a rechargeable lithium battery in which oxidation-reduction reaction of lithium (comprising oxidation reaction of lithium and reduction reaction of lithium ion) is used (this battery will be hereinafter referred to as rechargeable lithium battery for simplification purpose), an electrode structural body using said electrode material, a rechargeable lithium battery whose electrode comprising said electrode structural body, a process for producing said electrode structural body, and a process for producing said rechargeable lithium battery. More particularly, the present invention relates to an electrode structural body for a rechargeable lithium battery, which is constituted by an electrode material comprising a specific, amorphous alloy material capable of being alloyed with lithium and which provides a high capacity and a prolonged cycle life for said battery and to a rechargeable lithium battery having an anode comprising said electrode structural body and which has a high capacity and a prolonged cycle life. The present invention includes a process for producing said electrode structural body and a process for producing said rechargeable lithium battery.

2. Prior Art

In recent years, the global warming of the earth because of the so-called greenhouse effect to an increase in the content of $CO_2$ gas in the air has been predicted. For instance, in thermal electric power plants, thermal energy obtained by burning a fossil fuel is converted into electric energy, and along with burning of such fossil fuels a large amount of $CO_2$ gas is exhausted in the air. Accordingly, in order to suppress this situation, there is a tendency of prohibiting to newly establish a thermal electric power plant under these circumstance, so-called load leveling practice has been proposed in order to effectively utilize electric powers generated by power generators in thermal electric power plants or the like, wherein a surplus power unused in the night is stored in rechargeable batteries installed at general houses and the power thus stored is used in the daytime when the demand for power is increased, whereby the power consumption is leveled.

Now, for electric vehicles which do not exhaust anya'r polluting substances such as $CO_2$, $NO_x$, hydrocarbons and the like, there is an increased demand for developing a high performance rechargeable battery with a high energy density which can be effectively used therein. Besides, there is also an increased demand for developing a miniature, lightweight, high performance rechargeable battery usable as a power source for portable instruments such as small personal computers, word processors, video cameras, and cellular phones.

As such miniature, lightweight and high performance rechargeable battery, there have proposed various rocking chair type lithium ion batteries in which a carbonous material such as graphite capable of intercalating lithium ion at intercalation sites of its six-membered network plane provided by carbon atoms in the battery reaction upon charging is used as an anode material and a lithium intercalation compound capable of deintercalating said lithium ion from the intercalation in the battery reaction upon charging is used as a cathode material, Some of these lithium ion batteries have been practically used. However, for any of these lithium ion batteries whose anode comprising the carbonous material (the graphite), the theoretical amount of lithium which can be intercalated by the anode is only an amount of $\frac{1}{6}$ per carbon atom. Because of this, in such lithium icon battery, when the amount of lithium intercalated by the anode comprising the carbonous material (the graphite) is made greater than the theoretical amount upon performing charging operation or when charging operation is performed under condition of high electric current density, there will be an unavoidable problem such that lithium is deposited in a dendritic state (that is, in the form of a dendrite) on the surface of the anode. This will result in causing internal-shorts between the anode and the cathode upon repeating the charging and discharging cycle. Therefore, it is difficult for the lithium ion battery whose anode comprising the carbonous material (the graphite) to achieve a sufficient charging and discharging cycle life. In addition, using this battery design, it is extremely difficult to attain a desirable rechargeable battery having a high energy density comparable to that of a primary lithium battery in which a metallic lithium is used as the anode active material.

Now, rechargeable lithium batteries in which a metallic lithium is used as the anode have been proposed and they have attracted public attention in a viewpoint that they exhibit a high energy density. However, such rechargeable battery is not practically usable one because its charging and discharging cycle life is extremely short. A main reason why the charging and discharging cycle life is extremely short has been generally considered as will be described in the following. The metallic lithium as the anode reacts with impurities such as moisture or an organic solvent contained an electrolyte solution to form an insulating film or/and the metallic lithium as the anode has a irregular surface with portions to which electric field is converged, and these factors lead to generating a dendrite of lithium upon repeating the charging and discharging cycle, resulting in internal-shorts between the anode and cathode. As a result, the charging and discharging cycle life of the rechargeable battery is extremely shortened.

When the lithium dendrite is grown to make the anode and cathode such that the anode is internally shorted with the cathode as above described, the energy possessed by the battery is rapidly consumed at the internally shorted portion. This situate on often creates problems in that the battery is heated or the solvent of the electrolyte is decomposed by virtue of heat to generate gas, resulting in an increase in the inner pressure of the battery. Thus, the growth of the lithium dendrite tends to cause internal-shorts between the anode and the cathode whereby occurring such problems as above described, where the battery is damaged or/and the lifetime of the battery is shortened.

In order to eliminate the above problems for such rechargeable battery in which the metallic lithium is used as the anode, specifically, in order to suppress the progress of the reaction between the metallic lithium of the anode and the moisture or the organic solvent contained in the electrolyte solution, there has been proposed a method of using a lithium alloy such as a lithium-aluminum alloy as the anode. However, this method is not widely applicable in practice for the following reasons. The lithium alloy is hard and is difficult to wind into a spiral form and therefore, it is difficult to produce a spiral-wound cylindrical rechargeable battery. Accordingly, it is difficult to attain a rechargeable battery having a sufficiently long charging and discharging cycle life. It is also difficult to attain a rechargeable battery having a desirable energy density similar to that of a primary battery in which a metallic lithium is used as the anode.

Japanese Unexamined Patent Publications Nos. 64239/1996, 62464/1991, 12768/1990, 113366/1987, 15761/1987, 93866/1987, and 78434/1979 disclose various metals, i.e. Al, Cd, In, Su, Sb, Pb, and B; which are capable of forming an alloy with lithium in a rechargeable battery when the battery is subjected to charging, and rechargeable batteries in which these metals, alloys of these metals, or alloys of these metals with lithium are used as the anodes. However, the above-mentioned publications do not detail about the configurations of the anodes.

By the way, when any of the foregoing alloy materials is fabricated into a plate-like form such as a foil form which is generally adopted as all electrode of a rechargeable battery and it is used as an anode of a rechargeable battery in which lithium is used as the anode active material, the specific surface area of a portion in the anode's electrode material layer contributing to the battery reaction is relatively small and therefore, the charging and discharging cycle is difficult to be effectively repeated with a large electric current.

Further, for a rechargeable battery in which any of the foregoing alloy materials is used the anode, there are such problems as will be described in the following. The anode is expanded with respect to the volume because of alloying with lithium upon charging and shrunk upon discharging, where the anode suffers from repetitive variations with respect the volume. Because of this, the anode has a tendency that it is eventually distorted and cracked. In the case where the anode becomes to be in such state, when the charging and discharging cycle is repeated over a long period of time, in the worst case, the anode is converted into a pulverized state to have an increased impedance, resulting in shortening the charging and discharging cycle life. Hence, none of the rechargeable batteries disclosed in the above-mentioned Japanese publications has been put to practical use.

In *Extended Abstracts WED-2 (pages 69–72) of 8th INTERNATIONAL MEETING ON LITHIUM BATTERIES* (hereinafter referred to as document 1), there is described that by electrochemically depositing a Sn or a Sn-alloy on a copper wire heaving a diameter of 0.07 mm as a collector, an electrode having a deposited layer comprising a grained tin material with a small particle size of 200 to 400 nm can be formed, and a cell in which the electrode having such deposited layer with a thin thickness of about 3 μm and a counter electrode comprising a lithium metal are used has an improved charging and discharging cycle life. Document 1 also describes that in the evaluation wherein a cycle of operating charging up to 17 Li/Sn (one atom of Sn is alloyed with 1.7 atoms of Li) at a current density of 0.25 mA/cm$^2$ and operating discharging up to 0.9 V vs Li/Li$^+$ is repeated, an electrode comprising a fine-grained Sn material with a particle size of 200 to 400 nm, an electrode comprising a $Sn_{0.91}Ag_{0.09}$ as alloy and an electrode comprising a $Sn_{0.72}Sb_{0.20}$ alloy were greater than an electrode comprising a coarse-grained Sn alloy material with a particle size of 2000 to 4000 nm deposited on a collector comprising a copper sire having a diameter of 1.0 mm obtained in the same manner as in the above, In terms of the charging and discharging cycle lifer respectively by about 4 times, about 9 times, and about 11 times. However, the evaluated results described in document 1 are of the case where the lithium metal was used as the counter electrode and therefore, they are not evaluated results obtained in practical battery configurations. In addition, the foregoing electrodes are those prepared by depositing such grained material as above described on the collector comprising a copper wire having a diameter of 0.07 and therefore, any of them is not of a practically usable electrode form. Further in addition, according to the description of document 1, in the case where a Sn alloy is deposited on a large area having a diameter of 1.0 mm for example, it is understood that there is afforded an electrode having a layer comprising a coarse-grained tin alloy material with a particle size of 2000 to 4000 nm. However, for this electrode, the lifetime as a battery will be extremely shortened.

Japanese Unexamined Patent Publications Nos. 190171/1993, 47381/1993, 114057/1988, and 13264/1988 disclose rechargeable lithium batteries in which various lithium alloys are used as the anodes. In these publications, there are described that these rechargeable lithium batteries prevent deposition of lithium dendrite and have an improved charging efficiency and an improved charging and discharging cycle life, Japanese Unexamined Patent Publication No. 234585/1993 discloses a rechargeable lithium battery having an anode comprising a metal powder, which is difficult to form an intermetallic compound with lithium, is uniformly bonded on the surface of a lithium metal, In this publication, it is described that this rechargeable lithium battery prevents deposition of lithium dendrite and has an improved charging efficiency and an improved charging and discharging cycle life.

However any of the anodes described in the above-mentioned publications is not decisive one which can markedly prolong the charging and discharging cycle life of the rechargeable lithium battery.

Japanese Unexamined Patent Publication No. 13267/1988 discloses a rechargeable lithium battery in which a lithium alloy obtained by electrochemically alloying an amorphous metal comprising a plate-like aluminum alloy as a main example with lithium is used as the anode. This publication describes that this rechargeable lithium battery excels in charge-discharge characteristics. However, according to the technique described in this publication, it is difficult to realize a practically usable rechargeable lithium battery having a high capacity and a charging and discharging cycle life which falls in a practically usable region.

Japanese Unexamined Patent Publication No 223221/1998 discloses a rechargeable lithium battery in which a low crystalline or amorphous intermetallic compound of an element selected from a group consisting of Al, Ge, Pb, Si, Sn, and Zn is used as the anode. This publication describes that this rechargeable lithium battery has a high capacity and excels in cycle characteristics. However, it is extremely difficult to industrially produce such low crystalline or amorphous intermetallic compound in practice. According to the technique described in this publication, it is difficult to realize a practically usable rechargeable lithium battery having a high capacity and a prolonged charging and discharging cycle life.

By the way, Japanese Unexamined Patent Publication No. 317021/1998 discloses a method of chemically producing an amorphous Co—Ni alloy using a reducing agent. However this amorphous Co—Ni alloy cannot be used as the electrode material in a rechargeable lithium battery because it does not contain a metal capable of being alloyed with lithium.

Japanese Unexamined Patent Publication No. 78716/1993 discloses a process of chemically producing a metal powder using a reducing agent comprising titanium trichloride. The present inventors conducted experimental studies in that a plurality of metal powders were prepared in accordance with the technique described in this document, a plurality of rechargeable lithium batteries were prepared using said metal powders as their anodes, and the resultant rechargeable lithium batteries were evaluated with respect to their battery characteristics. As a result, it was found that any of the rechargeable lithium batteries does not have a charging and discharging cycle life which falls in a practically usable region. Thus, according to the technique described in this document, it is difficult to realize a rechargeable lithium battery having a charging and discharging cycle life which falls in a practically usable region.

Further, Japanese Unexamined Patent Publication No-329442/1999 discloses a lithium ion type non-aqueous rechargeable battery in which at least either the cathode or the anode contains a conductive material comprising a metal deposited on the surface of a conductive material by a method of reducing a metal ion. In this document, it is described that the rechargeable battery excels in high rate discharging characteristics and cycle performance. However, in this document, neither detailed description nor discussion are made of amorphilization for the conductive material constituting the electrode of the rechargeable battery. Further, in this document, concrete grounds which demonstrate that the rechargeable battery excels in cycle performance are not detailed. Thus, it is difficult to recognize that the rechargeable battery disclosed in this document is satisfactory in terms of the charging and discharging cycle life.

As above described, for the conventional rechargeable lithium batteries in which oxidation-reduction reaction of lithium is used, enlargement of their energy density and prolongation of their charging and discharging cycle life are massive subjects to be solved.

SUMMARY OF THE INVENTION

The present invention has been accomplished in view of the foregoing situation in the prior art for rechargeable lithium batteries in which oxidation-reduction reaction of lithium is used.

An object of the present invention is to provide a process for producing an electrode material comprising a specific amorphous alloy material capable of being electrochemically alloyed with lithium and which has excellent characteristics, and is suitable as a constituent of an electrode of a rechargeable lithium battery (that is, a rechargeable battery in which oxidation-reduction reaction of lithium is used).

A typical embodiment of the electrode material-producing process of the present invention comprises the steps of; (1) mixing at least one kind of a metal compound (a) selected from a group consisting of metal salts and metal complexes of a metal (a') capable of being electrochemically alloyed with lithium, at least one kind of a transition metal compound (b) selected from a group consisting of transition metal salts and transition metal complexes of a transition metal (b') and a completing agent with a solvent to obtain a mixed solution, (2) mixing a reducing agent with said mixed solution to obtain a mixture, and (3) oxidizing M aid reducing agent in said mixture to reduce ion of said metal (a') and ion of said transition metal (b') whereby depositing an amorphous alloy material (including an amorphous alloy particulate) capable of being electrochemically alloyed with lithium which is usable as an electrode material for a rechargeable lithium battery.

As a preferable example of said amorphous alloy material produced according to the electrode material-producing process of the present invention there can be mentioned an amorphous alloy material an (including an amorphous alloy particulate) containing a Sn.A.X alloy with a substantially non-stoichiometric ratio composition as a principal constituent. For the formula Sn.A.X, A indicates at least one kind of an element selected from a group consisting of transition metal elements, X indicates at least one kind of an element selected from a group consisting of B, Cu N, O and S, where the element X is not always necessary to be contained. The content of the constituent element Sn of the amorphous Sn.A.X alloy has a relationship of Sn/(sn+A+X) 20 to 80 atomic % in terms of the number of atoms of each element (atom) of the entire constituent elements Sn, A and X. The amorphous alloy maters al has excellent characteristics and it is extremely suitable as a constituent of an electrodes specifically, an anode of a rechargeable lithium battery.

Another object of the present invention is to provide an electrode structural body constituted by said electrode material and which has a high capacity and a prolonged cycle life and is usable as an electrode of a rechargeable lithium battery and a process for producing sad electrode structural body.

A further object of the present invention is to provide a rechargeable lithium battery whose electrode comprising said electrode structural body and which has a prolonged charging and discharging cycle life and a high energy density and a process for producing said rechargeable lithium battery.

BRIEF DESCRIPTION OF THE DRAWINGS

FIG. 1 is a schematic flow chart for explaining an embodiment off a process for producing an electrode material for a rechargeable lithium battery in the present invention.

FIG. 2 is a schematic cross-sectional view illustrating an example of an apparatus used for practicing the process for producing an electrode material in the present invention.

FIG. 3 is a schematic cross-sectional view illustrating another example of an apparatus used for practicing the process for producing an electrode material in the present invention.

DESCRIPTION OF THE INVENTION AND PREFERRED EMBODIMENTS

Figure 4:
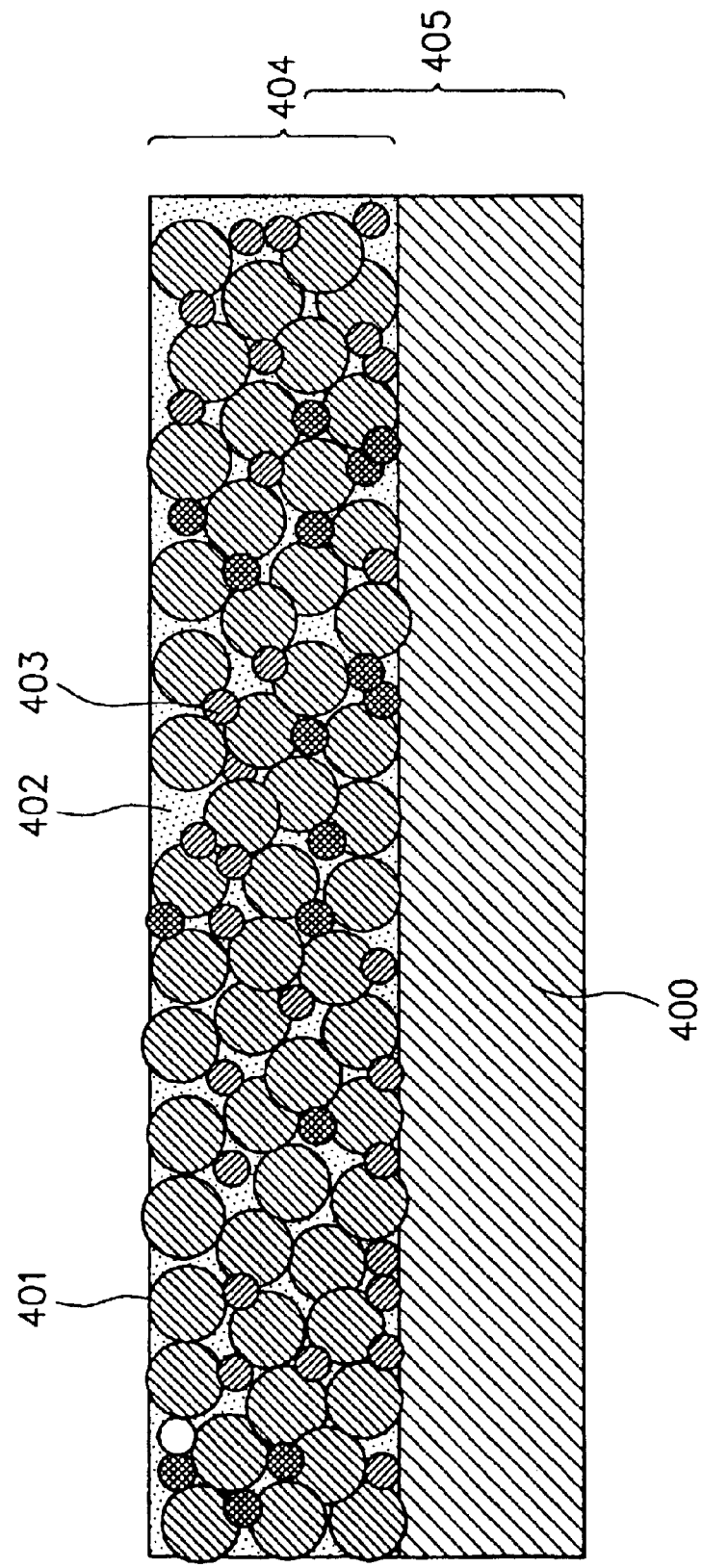
FIG. 4 is a schematic cross-sectional view illustrating the structure of an example of an electrode structural body according to the present invention.

As previously described, the present invention provides a process for producing an electrode material comprising a specific amorphous alloy material capable of being alloyed with lithium and which has excellent characteristics, and is suitable as a constituent of an electrode of a rechargeable lithium battery.

The process typically comprises the steps of: (1) mixing at least one kind of a metal compound (a) selected from a group consisting of metal salts and metal complexes of a metal (a') capable of being electrochemically alloyed with lithium, at least one kind of a transition metal compound (b) selected from a group consisting of transition metal salts and transition metal complexes of a transition metal (b') and a complexing agent with a solvent to obtain a mixed solution, (2) mixing a reducing agent with said mixed solution to obtain a mixture, and (3) oxidizing said reducing agent in said mixture to reduce ton of said metal (a') and ion of said transition metal (b') whereby depositing an amorphous alloy material capable of being electrochemically alloyed with lithium which is usable as an electrode material for a, rechargeable lithium battery.

The present invention provides an electrode structural body comprising an electrode material and a collector, characterized in that said electrode material comprises said electrode material produced by the above process and said collector comprises a material incapable of being alloyed with lithium in electrochemical reaction.

The electrode structural body has a high capacity and a prolonged cycle life and is usable as a electrode of a rechargeable lithium battery.

The present invention provides a process for producing said electrode structural body, characterized by including a step of arranging aforesaid electrode material produced by the above electrode material-producing process on a collector comprising a material incapable of being alloyed with lithium in electrochemical reaction.

The present invention provides a rechargeable lithium battery comprising at least an anode, a cathode and an electrolyte and in which oxidation-reduction reaction of lithium is used, characterized in that said anode comprises aforesaid electrode structural body.

The rechargeable lithium battery has a high energy density and a prolonged charging and discharging cycle life.

The present invention provides a process for producing a rechargeable lithium battery comprising at least an anode, a cathode and an electrolyte and in which oxidation-reduction reaction of lithium is used, characterized by including a step of forming said anode using an electrode structural bony formed by arranging aforesaid electrode material produced by the above electrode material-producing process on a collector comprising a material incapable of being alloyed with lithium in electrochemical reaction and a step of arranging said anode and said cathode to oppose to each other through said electrolyte.

As above described, the process for producing an electrode material for a rechargeable lithium battery in the present invention comprises sequentially conducting a step (1) of mixing at least one kind of a metal compound (a) selected from a group consisting of metal salts and metal complexes of a metal (a') capable of being electrochemically alloyed with lithium, at least one kind of a transition metal compound (b) selected from a group consisting of transition metal salts and transition metal complexes of a transition metal (b') and a completing agent (c) with a solvent (d) to obtain a mixed solution, a step (2) of mixing a reducing agent (e) with said mixed solution to obtain a mixture, and a step (3) of oxidizing said reducing agent in said mixture to reduce ion of said metal (a') and ion of said transition metal (b') whereby depositing an amorphous alloy material (including an amorphous alloy particulate) capable of being electrochemically alloyed with lithium as said electrode material.

The amorphous alloy material is preferred to be an amorphous metal-containing alloy material. And the amorphous alloy material is preferred to have a peak appeared in a range of 20 θ=20° to 50° in X-ray diffraction using α-rays of Cu as a radiation source, having a half width of preferably more than 0.2°, more preferably more than 0.5° further, the amorphous alloy material is preferred to comprise a particulate having a crystallite size calculated from X-ray diffraction analysis, which is preferably less than 50 nm, more preferably less than 200 nm.

The metal (a') capable of being alloyed with lithium can include Bi, In, Pb, Si, Ag, Sr, Ge, Zn, Sn, Cd, Sb, Ti, and Hg. Of these, Bi, In, Pb, Zn. Sn, Sb, and Tl are preferred, and Sa is more preferred. The metal (a') may comprise one ox more of these metals.

The transition metal (b') can include Cr, Mn, Fe, Co, Ni, Cu, Mo, To, Ru, Rh, Pd, Ag, Os, Ir, Ft, Au, Ti, V, Y, Sc, Zr, Nb, Hf, Ta, and W. Of these, Cr, Ma, Fe, Co, Ni, Cu. Ru, Rh, Pa, Ag, Os, Ir, Pt, and Au are preferred, and Cr, Mn, Fe, Co, Si, and Cu are more preferred. The transition metal (b') may comprise one or more of these transition metals.

In a preferred embodiment, the amorphous alloy material is preferred to comprise an amorphous alloy material (including an amorphous alloy particulate) containing a Sn.A.X alloy with a substantially non-stoichiometric ratio composition. For the formula Sn.A.X, A indicates at least one kind of an element selected from a group consisting of transition metal elements, X indicates at least one, kind of an element selected from a group consisting of B, C, N, O and S, where the element X is not always necessary to be contained. The content of the constituent element Sn of the amorphous Sn.A.X alloy is preferred to have a relationship of Sn/(Sn+A+X)=20 to 80 atomic % in terms of the number of atoms of each element (atom) of the entire constituent elements Sn, A and X.

The amorphous Sn.A.X alloy in the present invention is preferred to have a peak appeared in a range of 2θ=20° to 50° in X-ray diffraction using K α-rays of Cu as a radiation source, having a half width of preferably more than 0.2, more preferably more than 0.5°.

The above amorphous alloy material is preferred to comprise a particulate having a crystallite size calculated from X-ray diffraction analysis, which is preferably less than 50 nm, more preferably less than 20 nm. In addition, the amorphous alloy material is preferred to have an average particle size which is preferably in a range of from 0.1 $\mu$m to 2 $\mu$m, more preferably in a range of from 0.1 $\mu$m to 1 $\mu$m. Further in addition, the amorphous alloy material is preferred to have a specific surface area of preferably more than 10 $m^2$/g, more preferably more than 30 $m^2$/g.

The metal compound (a) used in the present invention is preferred to be soluble in the solvent (d). As specific preferable examples of the metal compound (a), there can be mentioned chlorides, sulfates and nitrates of those metals capable of being alloyed with lithium which are illustrated as the metal (a') in the above. Of these, chlorides, sulfates and nitrates of Sn are more preferable. In the present invention, these compounds can be used either singly or in combination of two or more of the as the compound (a).

Similarly, the transition metal compound (b) used in the present invention is preferred to be soluble in the solvent (d). As specific preferable examples of the transition metal compound (b), there can be mentioned chlorides, sulfates and nitrates of those transition metals capable of being alloyed with lithium which are illustrated as the transition mental (b') in the above. In the present invention, these compounds can be used either singly or in combination of two or more of them as the compound (b).

The complexing agent (c) used in the present invention can include organic carboxylic acids and amines. As specific preferable examples of the complexing agent (c), there can be mentioned citric acids, ethylenediaminetetraacetic acid, and salts of these acids. In the present invention, these compounds can be used either singly or in combination of two or more of them as the complexing agent (c).

The reducing agent (e) used in the present invention is preferred to comprise a material having an electrode potential which is inferior by more than 0.1 V or preferably more than 0.2 V to that of the metal (a') or the transition metal (b') which is the lowest. In addition, said material as the reducing agent (e) is preferred to be such that an aqueous solution of said material maintained at 25° C. has a normal electrode potential of less than −0.2 V or preferably less than −0.5 V. Further, said material as the reducing agent (e) is preferred to be soluble in the solvent (d).

Such material which can satisfy these conditions as the reducing agent (e) can include lower oxygen compounds such as hypophosphorous acid, phosphorous acid, sulfurous acid, thiosulfuric acid, and dithionous acid; salts of these compounds: metal salts in the low valence state of Fe (II), Ti (III) and Cr (II); organic compounds such as formaldehyde, formic acid, and oxalic acid; and salts of these organic compounds. In the present inventions these compounds can be used either singly or in combination of two or more of them as the reducing agent (e).

The solvent (d) used in the present invention can include water and polar solvents. Specifically, the solvent (d) may comprise at least one kind of a material selected from a group consisting of water, alcohols, ester compounds, amide compounds, nitrile compounds, amine compounds, halogen compounds, sulfur compounds, liquid ammonia, and glacial acetic acid. The solvent (d) is preferred to comprise at least one kind of a material selected from a group consisting of water and alcohols.

The step (2) of mixing the foregoing mixed solution with the reducing agent (e) is preferred to perform under condition with a temperature in a range −10 to 100° C. or preferably in a range of 10 to 90° C. Further, the step (2) is preferred to perform in an atmosphere composed of at least one kind of a gas selected from hydrogen gas, nitrogen gas, and inert gas such as argon gas or helium gas.

The step (3) of oxidizing the reducing agent (e) in the foregoing mixture is preferred to perform under condition with a temperature in a range of −10 to 100° C. or preferably in a range of 10 to 90° C. In addition, the step (3) is preferred perform in an atmosphere composed of at least one kind of a gas selected from hydrogen gas, nitrogen gas, and inert gas such as argon gas or helium gas.

Further, the step (3) is preferred to perform by adjusting the solution of the mixture to have a pH value in a range of 3 to 12 and preferably in a range of 5 to 10.

To adjust the solution of the mixture to have said pH value may be conducted by adding an alkali. The addition of the alkali is preferred to perform so that the pH value of the solutions of the mixture in changed from 2 or less to a range of 3 to 12 or preferably to a range of 5 to 10.

The alkali added can include hydroxides of alkali metals, hydroxides of alkaline earth metals, amines, and ammonia. These compounds can be used either singly or in combination of two or more of them.

The step of oxidizing the reducing agent (e) in the mixture may be performed concurrently at the time of mixing the mixed solution with the reducing agent (e) in the step (2) in which the mixed solution is mixed with the reducing agent.

The amount of the metal compound (a) to be added and that of the transition metal compound (b) to be added are preferred to be made such that [the number of moles of the metal (a') in the compound (a)]/[the number of moles of the transition metal (b') in the transition metal compound (b)] becomes to be in a range of 0.1 to 10 or preferably in a range of 0.2 to 5.

The amount of the completing agent (c) to be added is preferred to be made such that [the number of moles of the complexing agent (C)] [the number of moles of the metal compound (a)+the number of moles of the transition metal compound (b)] becomes to be in a range of 1 to 5 or preferably in a range of 2 to 5.

The amount of the reducing agent (e) to be added is preferred to be made such that the amount of the reducing agent (e) added becomes 1 to 3 times or preferably 1 to 2 times the sum of the oxidation-reduction equivalence point of the metal compound (a) and that of the transition metal compound (b) in terms of the equivalence ratio.

The above-described electrode material-producing process is possible to include a step of washing the foregoing alloy material as the electrode material. The process is also possible to include a step of drying the washed alloy material. The process is further possible to include a step of grinding the dried alloy material.

As previously described, the present invention provides an electrode structural body comprising an electrode material and a collector, characterized in that said electrode material comprises a given amorphous alloy material produced by the foregoing electrode material-producing process and said electrode comprises an material incapable of being alloyed in the electrochemical reaction. In this case, it is possible that the amorphous alloy as the electrode material is formed in a layer form on the collector.

The electrode structural body may be an electrode structural body comprising an electrode material layer formed using aforesaid amorphous alloy as the electrode material and a binder, and aforesaid collector. The binder in this case may comprise a water-soluble organic polymer material.

The electrode structural body may be an electrode structural body comprising an electrode material layer formed using aforesaid amorphous alloy as the electrode material, aforesaid binder, and an electrically conductive auxiliary, and aforesaid collector.

The present invention provides a process for producing an electrode structural body, characterized by including a step of arranging a given amorphous alloy material as the electrode material produced by the foregoing electrode material-producing process on a collector comprising a material incapable of being alloyed with lithium in the electrochemical reaction. The process is possible to include a step of forming said amorphous alloy material in a layer form on said collector by way of press forming. The process is also possible to include a step of mixing said amorphous alloy material with a binder and if necessary, a solvent to obtain a paste-like product and arranging said paste-le product on said collector.

The present invention provides a rechargeable lithium battery comprising at least an anode, a cathode and an electrolyte and in which oxidation-reduction reaction of lithium is used, characterized in that said anode comprises aforesaid electrode structural body. In this case, it is desired for the cathode to chiefly comprise a lithium-containing electrode material.

The present invention provides a producing a rechargeable lithium battery comprising at least an anode, a cathode and an electrolyte and in which oxidation-reduction reaction of lithium is used, characterized by including a step of forming said anode using an electrode structural body formed by arranging an given amorphous alloy material as the electrode material produced by the foregoing electrode material-producing process on a collector comprising a material incapable of being alloyed with lithium in electrochemical reaction and a step of arranging said anode and said cathode to oppose to each other through said electrolyte. The cathode is preferred to chiefly comprise a lithium-containing electrode material.

The anode-forming step may be conducted by forming said amorphous alloy material in a layer form on said collector by way of press forming. Alternatively, the anode-forming step may be conducted by mixing said amorphous alloy material with a binder and if necessary, a solvent to obtain a paste-like product and arranging said paste-like product on said collector.

By the way, the present invention has been accomplished on the basis of the following finding obtained through experimental studies by the present invention. That is, the present inventors created a process which enables one to produce an amorphous alloy material capable of being electrochemically alloyed with lithium and which has excellent characteristics, and is suitable as a constituent of an electrode of a rechargeable lithium battery in which oxidation-reduction reaction of lithium is used. Particularly, the process comprises the steps of: mixing at least one kind of a metal compound (a) selected from a group consisting of metal salts and metal complexes of a metal (a') capable of being electrochemically alloyed with lithium, at least one kind of a transition metal compound (b) selected from a group consisting of transition metal salts and transition metal complexes of a transition metal (b') and a complexing agent with a solvent to obtain a mixed solution; mixing a reducing agent with said mixed solution to obtain a mixture; and oxidizing said reducing agent in said mixture to reduce ion of said metal (a') and ion of said transition metal (b') whereby depositing an amorphous alloy material capable of being electrochemically alloyed with lithium.

A variety of amorphous alloy materials were prepared by this process. Using these amorphous alloy materials as electrode materials, there were prepared a plurality of electrode structural bodies respectively usable as an anode of a rechargeable lithium battery. Using these electrode structural bodies, there were prepared a plurality of rechargeable lithium batteries. And the resultant rechargeable lithium batteries were evaluated with respect to their battery characteristics. As a result, any of the rechargeable lithium batteries was found to have a high capacity and a prolonged cycle life (a prolonged charging and discharging cycle life).

For the reason why such rechargeable lithium battery whose anode comprising an electrode structural body formed using the electrode material comprising aforesaid amorphous alloy material has a high capacity and a prolonged cycle life, it is considered as will be described below.

In the system in which the metal compound capable of being electrochemically alloyed with lithium and the transition metal compound are together present, by performing reduction by the reducing agent, there are afforded an alloy comprising a metal capable of being alloyed with lithium and a transition metal. That is, as shown in the following equations, metal ion $M^+$ capable of being alloyed with lithium in the oxidized state and transition metal ion $A^+$ are reduced by the reducing agent R (where the reducing agent itself is oxidized) to form an alloy MA.

$$M^+ + A^+ + R \rightarrow MA + R^{2+}$$

$$M^+ + A^+ + R^+ \rightarrow MA + R^{3+}$$

(where $M^+$ indicates metal ion of the metal capable of being alloyed with lithium, $A^+$ indicates metal ion of the transition metal, each of R and $R^+$ indicates the reducing agent, and the mark "+" indicates an oxidation number.)

Specifically, for instance, as shown in the following equations;

$$Sn^{2+} + Ni^{2+} + Ti \rightarrow SnNi + Ti^{4+}$$

$$Sn^{2+} + Ni^{2+} + 4Ti^{3+} \rightarrow SnNi + 4Ti^{4+}$$

Sn ion and Ni ion are reduced to form an alloy comprising Sn and Ni. At this time, when the formation of the alloy is performed in a solvent, the respective metal ions are reduced into metals from the uniformly mixed state in the solvent. Because of this, the homogeneousness of the alloy formed is improved. This alloy is formed from the metal elements which are different with respect to their atomic radius (preferably more than 10% more preferably more than 12%). Therefore, it is considered that distortion is liable to occur in the formation of an alloy crystal, and thus, an amorphous portion is likely to readily form. In addition, at the time when reduced metal elements are bonded to form a crystal, it is considered that the solvent molecular hinders to formation of the crystal, and as a result, distortion is liable to occur in the formation of the alloy crystal, and thus, an amorphous portion is likely to readily form.

Now, in accordance with the foregoing process, there can be obtained an amorphous alloy particulate containing amorphous phase which has a short distance order property but does not have a long-distance order property. The amorphous alloy particulate does not have a large change in the crystalline structure when it is alloyed with lithium, and therefore the volume expansion as small. In this connection, when the amorphous alloy particulate is used in the anode of a rechargeable lithium battery, the electrode material layer of the anode is slightly sanded or shrunk upon charging or discharging. Thus, there can be attained a rechargeable lithium battery whose anode is hardly cracked or ruptured even when the charging and discharging cycle is repeated over a long period of time, where the performance thereof is maintained without being deteriorated.

Separately, by using the complexing agent in the reaction system, it is possible that the metal compounds form complexes and they are stably and can uniformly present in the solvent without being aggregated. Because of this, it is considered that the homogeneousness of the alloy formed is more improved and the amorphization is more facilitated.

In the followings description in sore detail will be made of the process for producing an electrode material in the present invention.

The production process basically comprises mixing a prescribed reducing agent with a mixed solution which contains a prescribed metal compound containing a metal capable of being alloyed with lithium, a prescribed transition metal compound, and a prescribed complexing agent, and oxidizing said reducing agent to reduce ion of the metal capable of being alloyed with lithium and ion of the transition metal whereby synthesizing an amorphous alloy material.

Preferred embodiments of the production process will be detailed with reference to FIGS. 1 to 3.

FIG. 1 is a schematic flow chart for explaining an embodiment of the production process. FIG. 2 is a schematic cross-sectional view illustrating an example of a fabrication apparatus used for practicing the production process. FIG. 3 is a schematic cross-sectional view illustrating another example of a fabrication apparatus used for practicing the production process.

The fabrication apparatus shown in FIG. 2 is a batch type fabrication apparatus in which all the steps from the introduction of starting materials to the termination of the reaction treatment are performed in the same reaction vessel. The fabrication apparatus shown in FIG. 2 comprises a reaction vessel 201 provided with an starting material introduction device 202, a reflux device 203, a gas introduction pipe 204, an agitator 205, and a temperature controlling equipment 206.

The fabrication apparatus show n FIG. 3 is a continuous fabrication apparatus in which the respective steps are individually performed in separate vessels.

The fabrication apparatus shown in FIG. 3 comprises a starting material addition vessel 302, a reducing agent addition vessel 303, a mixing vessel 304, an addition vessel 308, a reaction vessel 301, and a product recovery vessel 309. The respective vessels are communicated with each other through connection pipes 307 having a flow rate regulating valve 307 such that a flow from each of the starting material addition vessel 302 and the reducing agent addition vessel 303 is flown into the mixing vessel 304, followed by being flown into the reaction vessel 301; a flow from the addition vessel 308 is flown into the reaction vessel 301, and a flow from the reaction vessel 301 is flown into the product recovery vessel 309. Each of the vessels 301, 302, 303, 304, and 308 is provided with an agitator 305. And each of the vessels 301, 302, 303, 304, 308 and 309 is provided with a temperature controlling equipment 306.

The production process in the fabrication apparatus shown in FIG. 2 will be explained while referring to FIG. 1.

In the fabrication apparatus shown in FIG. 2, first, inert gas such as nitrogen gas is introduced into the reaction vessel 201 through the gas introduction pipe 204, where only excessive gas is exhausted outside the system through the reflux device 203. Then, at least one kind of a metal compound (a) selected from a group consisting of metal salts and metal complexes of a metal (a') capable of being electrochemically alloyed with lithium, at least one kind of a transition metal compound (b) selected from a group consisting of transition metal salts and transition metal complexes of a transition metal (b'), a complexing agent (c) and a solvent (d) are introduced into the reaction vessel 201 through the starting material introduction device 202, followed by being stared by means of the agitator 205 (see, step A in FIG. 1), where a reducing agent (e) is introduced there through the starting material introduction device 202 (see, step C in FIG. 1). The temperature of the mixed solution in the reaction vessel 201 is controlled to a prescribed temperature by means of the temperature controlling equipment 206.

Thereafter, if necessary in order to oxidize the reducing agent in the mixed solution, by adding a pH-adjusting agent comprising an alkali or the like (see, step C in FIG. 1), the reducing agent in the mixed solution is oxidized (see, step D in FIG. 1), and reduction reaction of the metal compound (a) and the transition metal compound (b) is progressed. After the termination of the reaction, a synthesized product is washed and dried (see, steps E and F in FIG. 1). In this way, there is obtained an amorphous alloy material as an electrode material.

The production process in the continuous fabrication apparatus shown in FIG. 3 will be explained while referring to FIG. 1.

In the continuous fabrication apparatus shown in FIG. 3, first, the entire inside atmosphere is replaced by inert gas such as nitrogen gas or the like. Then, at least one kind of a metal compound (a) selected from a group consisting of metal salts and metal complexes of a metal (a') capable of being electrochemically alloyed with lithium, at least one kind of a transition metal compound (b) selected from a group consisting of transition metal salts and transition metal complexes of a transition metal (b') a completing agent (c) and a solvent (d) are introduced into the starting material addition vessel 302, followed by being stirred by means of the agitator 305 (see, step A in FIG. 1), and the mixture in the starting material addition vessel 302 is introduced into the mixing vessel 304 while adjusting the amount of the mixture to be added by means of the flow rate regulating valve 307, and a reducing agent (e) introduced into the reducing agent addition vessel 303 is introduced into the mixing vessel 304 while adjusting the amount of the reducing agent to be added by means of the flow rate regulating valve 307, where the contents in the mixing vessel 304 are stirred and well-mixed by means of the agitator 305 (see, step C in FIG. 1). The temperature of the mixed solution in the mixing vessel 304 is controlled to a prescribed temperature by means of the temperature controlling equipment 306. The mixed solution in the mixing vessel 304 is introduced into the reaction vessel 301 while adjusting the amount of the mixed solution to be added by means of the flow rate regulating valve 307, and if necessary in order to oxidize the reducing agent in the mixed solution, by introducing a pH-adjusting agent comprising an alkali or the like into the reaction vessel 301 from the addition vessel 308 while adjusting the amount of the pH-adjusting agent to be added by means of the flow rate regulating valve 307, the reducing agent an the mixed solution is oxidized (see, step D in FIG. 1), and reduction reaction of the metal compound (a) and the transition metal compound (b) is progressed. The temperature of the reaction solution in the reaction vessel 301 is controlled to a prescribed temperature by means of the temperature controlling equipment 306, followed by being introduced into the product recovery vessel 309, where the reaction solution in the product recovery vessel 309 is cooled to a prescribed temperature, whereby a synthesized product is afforded in the product recovery vessel 309. The synthesized product is taken out from the product recovery vessel 309, and it is washed and dried (see, steps E and F in FIG. 1). In this way, there is obtained an amorphous alloy material as an electrode material.

The resultant amorphous alloy material as the electrode material may be ground by means; of a grinding apparatus such as a ball mill or the like.

The production process which is practiced by using the continuous fabrication apparatus shown in FIG. 3 is more advantageous in comparison with the production process which is practiced by using the batch type fabrication apparatus show in FIG. 2, in that in the former, (i) the separation of a product from the starting materials remained without being reacted can be readily conducted and the product can be obtained in a state with little impurity, (ii) the reaction time can be readily adjusted as desired by means of the flow rate regulating valve, and (iii) the temperature of the starting materials, the reaction temperature and the temperature of a product can be individually controlled, and (iv) particularly in the case of producing an electrode material in a large amount, a stable and homogeneous product as the electrode material can be continuously produced.

Now, in the electrode material-producing process of the present invention, at the time of adding the reducing agent (see, step C in FIG. 1) and also at the time of oxidizing the reducing agent (see, step D in FIG. 1), to maintain the temperature of the mixed solution in the reaction vessel to be constant at a prescribed temperature by heating or cooling the reaction vessel is preferred because decomposition reaction or side reaction of the reducing agent due to heat of the mixing or heat of the reaction is difficult to occur. Specifically, it is desired that the temperature of the mixed solution in the reaction vessel is maintained at a temperature preferably in a range of from −10 to 100° C. or more preferably in a range of from 10 to 90° C. When the temperature of the mixed solution in the reaction vessel is maintained at a temperature of less than −10° C., there is a tendency in that the extent of an amorphous portion (phase) formed in a product is decreased. When the temperature of the mixed solution in the reaction vessel is maintained at a temperature of beyond 100° C. there is a tendency in that impurity in a relatively large amount is occurred and it gets in a product obtain red.

In addition, at the time of adding the reducing agent (see, step C in FIG. 1), it is preferred to control the temperature of the reducing agent to be the same as that of the mixed solution in the reaction vessel in order to decrease a change in the temperature of the mixed solution in the reaction vessel when the reducing agent is added to and mixed with the mixed solution.

As the gas which is introduced into the reaction vessel, it is possible to use hydrogen gas and inert gas such as argon gas or helium gas other than nitrogen gas. In this case, there is an advantage in that the reducing agent is maintained without being oxidized with said gas. Further, it is preferred that the introduction of said gas into the reaction vessel is continued from the step of introducing the metal compound (a) and the transition metal compound (b) into the reaction vessel (see, step A in FIG. 1) until the step of oxidizing the reducing agent (see, step D in FIG. 1). In this case, gas and the like generated by the reaction in the reaction chamber are exhausted outside the system and as a result, impurity is refrained from generating in the reaction vessel.

Particularly, when formaldehyde or formic acid is used as the reducing agent, carbon dioxide is liable to generate, and when sodium thiosulfate is used as the reducing agent, sulfa dioxide is liable to generate; and when such gas is generated, impurity such as carbonate substance or sulfate substance is likely to generate. However, such impurity is refrained from generating.

Further, at the time of adding the reducing agent (see, step C in FIG. 1), it is preferred that when the reducing agent comprises a solid or gaseous material, said material is dissolved a solvent which is the same as the solvent used in the reaction prior to adding it (see, step B. in FIG. 1). In the case where the reducing agent comprises a liquid material, said liquid material can be added as it is (see, step B in FIG. 1).

For the amount of the reducing agent to be added (see, step C in FIG. C), it is sufficient to add a given material as the reducing agent in an amount which is corresponding to an equivalence point with respect to a change in the oxidation number per mole of said material as the reducing agent (the number of electron released) and a change in the oxidation number per mole of the metal which is to be reduced (the number of electron released, i.e., the number of electrons entrapped). However, the reducing agent in an excessive count is preferred to be added because the yield is increased in this case.

The amount corresponding to the equivalence point here is meant that for instance, in the case where the reducing agent is oxidized such that the oxidation number is changed from +3 to +4 and the metal in the metal compound to be reduced is reduced such that the oxidation number is changed from +2 to 0, the reducing agent in an amount which is corresponding to 2 times the amount of the metal compound in terms of the mole ratio is added.

Even when the oxidation number of the metal compound (a) containing the metal capable of being alloyed with lithium is different from that of the transition metal (b), it is sufficient to add the reducing agent in an amount corresponding to the sum of the equivalence point of the metal compound (a) and that of the transition metal compound (b). In a preferred embodiment, in view of increasing the yield while preventing the generation of impurity, the amount of the reducing agent to be added is preferably 1 to 3 times or more preferably 1 to 2 times respectively versus the sum of the equivalence point of the metal compound (a) and that of the transition metal compound (b).

In the case where the reducing agent has a large oxidation power and it sufficiently reacts with the metal compound merely by mixing it with the metal compound, it is preferred to hasten the addition speed of the reducing agent at the time of adding the reducing agent (see, step C in FIG. 1), because in this case, the reaction in the mixed solution is rapidly progressed, where an alloy crystal is hardly formed and the amorphization is desirably progressed. That is it is desired that generation reaction of an alloy is terminated within a short period of time. For the addition speed of the reducing agent, it is desired that the addition of the entire amount of the reducing agent is terminated preferably within 2 minutes or more preferably within 1 minute.

For the use amount of the metal compound (a) and that of the transition metal compound (b) to be used, they are preferred to be made such that [the number of moles of the metal (a')(capable of being alloyed with lithium) in the metal compound (a)]/[the number of moles of the transition metal in the transition metal compound (b)] is preferably in a range of from 0.1 to 10 or more preferably in a range of from 0.2 to 5. In the case where the relationship between the use amount of the metal compound (a) and that of the transition metal compound (b) is outside the above range, there is a tendency that the amorphous portion (phase) occurred in a product as an electrode material is diminished.

Separately, it is possible to use an appropriate compound or the like other than the metal compound (a) and that of the transition metal compound (b) so that a product obtained as an electrode material contains its constituent. In this case, it is possible that said compound is introduced into the reaction vessel together with the metal compound (a) and that of the transition metal compound (b) when the metal compound (a) and that of the transition metal compound (b) are introduced into the reaction vessel (see, step A in FIG. 1).

For the amount of the complexing agent (c) to be added, it is desired to be made such that [the number of moles of the complexing agent] [the number of moles of the metal compound (a)+the number of moles of the transition metal compound (b)] is preferably in a range of from 1 to 5 or more preferably in a range of from 2 to 5.

When the complexing agent in an mount which falls in the above range is used, the metal ion of the metal compound (a)

and that of the transition metal compound (b) are stably and uniformly dissolved in the solvent (d) and as a result, the occurrence of impurity is diminished, where a product with good amorphization as an electrode material can be obtained.

For the use amount of the solvent (d) it is desired in such an amount that the metal compound (a), the transition metal compound (b), the complexing agent (c) and the reducing agent (e) which are mixed with the solvent are uniformly dispersed in the solvent while being dissolved therein. However, in the case where the mixed solution whose solvent is excessive and which is therefore thin in terms of the concentration, the reduction reaction becomes gentle and therefore, the yield of a product (a synthesized product) is decreased. In this respect, the use amount of the solvent is preferred to be adjusted so that the weight molar concentration of the reducing agent (e) becomes to fall preferably in a range of from 0.1 to 5 mole/Kg or more preferably in a range of from 0.5 to 4 mole/Kg.

At the time when the metal compound (a), the transition metal compound (b), and the complexing agent (c) are mixed with the solvent (d) (see, step A in FIG. 1), these materials may be entirely mixed with the solvent at the same time. Alternatively, it is possible that they are intermittently mixed with the solvent several times. In this case, it is possible that each of the metal compound (a), the transition metal compound (b), and the complexing agent (c) is individually mixed with the solvent and they are together mixed.

Separately, at the time when the metal compound (a), the transition metal compound (b), and the complexing agent (c) are mixed with the solvent (d) (see, step A in FIG. 1), it is possible to add a dispersant comprising a surface active agent selected from a group consisting of an anionic surface active agent, a cationic surface active agent, and a nonionic surface active agent. In this case, the homogeneousness of the mixed solution is unproved.

At the time when the oxidation is performed by adding the reducing agent (see, steps C and D in FIG. 1), to maintain the mixed solution (the reaction solution) to be constant at a prescribed pH value is preferred for the reason that a complex formed by the metal ions and the complexing agent is stabilized. Specifically, it is preferred that the pH value of the mixed solution is made to be preferably in a range of from 3 to 12 or more preferably in a range of from 5 to 10. When the pH value of the mixed solution is less than 3, the yield of a product as an electrode material is diminishes. When the pH value of the mixed solution is beyond 12, there is a tendency in that impurity is increased.

To adjust the pH value of the mixed solution in the above range may be performed by adding an acid or an alkali to the mixed solution or by adding a pH buffer to the mixed solution.

When the reducing agent comprises, for instance, titanium trichloride which is highly reactive and is likely to become unstable when the pH value of the mixed solution is in the above range, it is considered to take a manner in that in step C (see, FIG. 1), the reducing agent is added to the mixed solution which is maintained at a pH value where the reducing agent is stabilized, and in step D (see, FIG. 1) by adding an alkali or an acid to the mixed solution, the reducing agent is oxidized and simultaneously with this, the pH value of the reaction solution is controlled to fall in the above ranges. But this manner is not always effective because in the high pH value region (the alkaline region), the metal ions of the metal compound (a) and the transition metal compound (b) form hydroxides and they are precipitated. Therefore, it is preferred to control the pH value of the mixed solution (the reaction solution) to fall in the above range by adding an alkali from the low pH value region (the acidic region) in this case, in view of the stability of the reducing agent in step C (see, FIG. 1), it is preferred to make the pH vale of the low pH value region to be 2 or less.

In addition, it is preferred to hasten the speed of adding the alkali because in this case, the reduction reaction in the mixed solution is rapidly occurred and as a result, an alloy crystal is hardly formed and the amorphization is desirably progressed.

Figure 8:
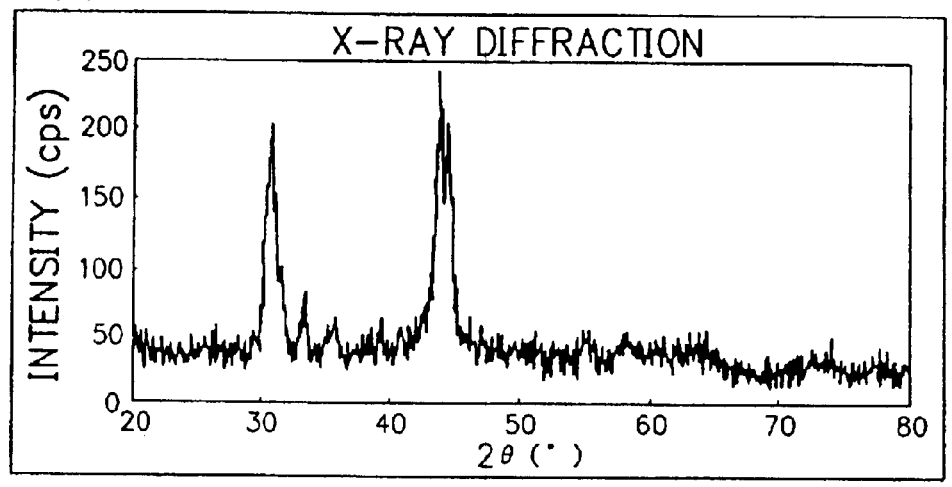
FIG. 8 shows X-ray diffraction charts of examples of electrode materials obtained by the electrode material production process of the present invention.
Figure 8:
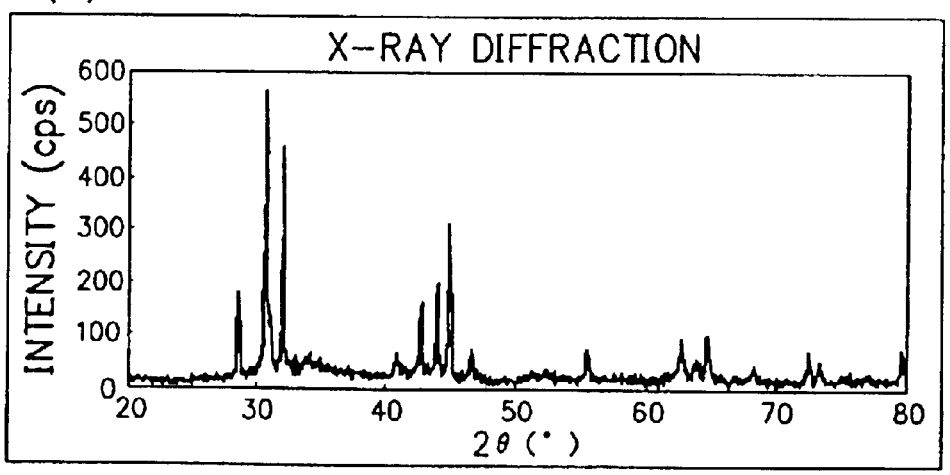

The above situation can be understood with reference to X-ray diffraction charts shown in FIG. 8.

FIG. 8(1) shows an X-ray diffraction chart of an amorphous alloy material obtained by quickly adding an alkali for 30 seconds in Example 1 which will be described later. FIG. 8(2) shows an X-ray diffraction chart of an amorphous alloy material obtained in the same manner as in Example 1 except for slowly adding the alkali for 15 minutes.

In comparison of the X-ray diffraction chart shown in FIG. 8(1) with the X-ray diffraction chart shown in FIG. 8(2), it is understood that the amorphization in the latter is not progressed as that in the former.

That is, it is preferred that the generation reaction of an alloy is terminated within a short period of time and that the addition of the total amount of the alkali is completed preferably for less than 2 minutes or more preferably for less than 1 minute.

Specific preferable examples of the alkali to be added are hydroxides of alkali metals, hydroxides of alkaline earth metals, amine and ammonia.

The method adopted for oxidizing the reducing agent is different depending upon the oxidation power of the reducing agent (that is, a difference between the electrode potential of the reducing agent and that of the metal ion to be reduced) [which will be described later in the item of reducing agent]. However, as specific examples of the method for oxidizing the reducing agent, there can be mentioned a method in that any of the foregoing alkalis is added to a mixed solution containing a given reducing agent, given metal ion capable of being alloyed with lithium, and given transition metal ion to adjust the pH value of said mixed solution whereby oxidizing the reducing agent contained in the mired solution; a method in that a given reducing agent is admixed in a mixed solution containing a given reducing agent, given metal ion capable of being alloyed with lithium, and given transition metal ion, followed by subjecting to a heat treatment, whereby the reducing agent in the mixed solution is oxidized; a method in that a given reducing agent is heated, a mixed solution containing a given reducing agent, given metal ion capable of being alloyed with lithium, and given transition metal ion is also heated, and the heated reducing agent is admixed in the heated mixed solution, whereby the reducing agent in the mixed solution is oxidized and a method in that when a given reducing agent having a strong oxidation power and which is liable to rapidly cause reaction is used, after the reducing agent is cooled, the reducing agent is admixed in a mixed solution containing a given reducing agent, given metal on capable of being alloyed with lithium, and given transition metal ion, whereby the reducing agent in the mixed solution is oxidized.

Now, the temperature of the mixed solution in the reaction vessel is preferred to be controlled by cooling or seating the mixed solution so as to fall preferably in a range of from −10 to 100° C. or more preferably in a range of from 10 to 90° C.

In the following description will be made each starting material used in the process for producing an electrode material.

Metal Compound (a):

The metal compound (a) includes metal salts and metal complexes of a metal (a') capable of being alloyed with lithium. These metal salts and metal complexes are soluble in the solvent (d).

The metal (a') can include Bi, In, Pb, Si, Ag, Sr, Ge, Zn, Sn, Cd, Sb, Tl, and Hg. Of these, Bi, In, Pb, Zn, Sn, Sb and Tl are preferred, and Sn is more preferred.

As specific preferable examples of the salt of the metal (a'), there can be mentioned chlorides, sulfates and nitrates of a metal selected from a group consisting of Bi, In, Pb, Si, Ag, Sr, Ge, Zn, Sn, Cd, Sb, Tl, and Hg as the metal (a'), which are readily dissolved in the solvent (d) to form metal ions. Of these, chlorides, sulfates and nitrates of a metal selected from a group consisting Bi, In, Pb, Zn, Sn, Sb and Tl are preferred, because these salts are readily dissolved in the solvent (d) to stably form metal ions. Particularly, chlorides, sulfates and nitrates of Sn are more preferred, because these salts of Sn make it possible to form an alloy with a transition metal while readily foaming amorphous portion (amorphous phase).

Specific preferable examples of the metal complex of the metal (a') are amine complexes, fluoro complexes, polyamine complexes, and polyphrin complexes of a metal selected from a group consisting of Bi, In, Pb, Si, Ag, Sr, Ge, Zn, Sn, Cd, Sb, Tl, and Hg as the metal (a'), which are readily dissolved in the solvent (d) to form metal ions.

The above-mentioned metal salts and metal complexes may be used either singly or in combination of two or more of them.

Besides, organometallic compounds, e.g., alkyl compounds, phenyl compounds, and the like of a metal selected from a group consisting of Bi, In, Pb, Si, Ag, Sr, Ge, Zn, Sn, Cd, Sb, Tl, and Hg which are soluble in the solvent (d) are also usable as the metal compound (a).

Transition Metal Compound (b):

The transition metal compound (b) includes transition metal salts ad transition metal complexes of the transition metal (b'). These transition metal salts and transition metal complexes are soluble in the solvent (d).

The transition metal (b') can include Cr, Mn, Fe, Co, Ni, Cu, Mo, Tc, Ru, Rh, Pd. Ag, Os, Ir, Pt, AU, Ti, V, Y, Sc, Zr, Nb, Hf, Ta, and W. Of these, Cr, Mm, Fe, Co, Ni, Cu, Ru, Rh, Pd, Ag, Os, Ir, Pt, and Au are preferred, and Cr, Mn, Fe, Co, Ni, and Cu are more preferred.

As specific preferable examples of the transition metal salt of the transition metal (b'), there can be mentioned chlorides, sulfates and nitrates of a transition metal selected from a group consisting of Cr, Mn, Fe, Co, Ni, Cu, Mo, Tc, Ru, Rh, Pd, Ag, Os, Ir, Pt, Au, Ti, V, Y, Sc, Zr, Nb, Hf, Ta, and W as the transition metal (b'), which are readily dissolved in the solvent (d) to form metal ions. Of these, chlorides, sulfates and nitrates of a transition metal selected from a group consisting Cr, Mn, Fe, Co, Ni, Cu, Ru, Rh, Pd, Ag, Os, Ir, Pt, and Au are preferred, because these salts are readily dissolved in the solvent (d) to stably form metal ions. Particularly, chlorides, sulfates and nitrates of a transition metal selected from a group consisting of Cr, ME, Fe, Co, Ni, and Cu are sore preferred, because these salts make it possible to form an alloy with a metal capable of being alloyed with lithium while readily forming amorphous portion (amorphous phase).

Specific preferable examples of the metal complex of fee metal (b') are amine complexes, fluoro complexes, polyamine complexes, and polyphrin complexes of a metal selected from a group consisting of Cr, Mn, Fe, Co. Ni, Cu, Mo, To, Ru, Rh, Pd, Ag, Os, Ir, Pt, Au. Ti, V, Y, Sc, Zr, Nb, Hf, Ta, and W as the transition metal (b'), which are readily dissolved in the solvent (d) to form metal ions.

The above-mentioned transition metal salts and transition metal complexes may be used either singly or in combination of two or more of them.

Besides, organometallic compounds, e.g., alkyl compounds, phenyl compounds, and the like, of a transition metal selected from a group consisting of Cr, Mn, Fe, Co, Ni, Cu, Mo, Tc, Ru, Rh, Pd, Ag, Os, Ir, Pt, AU, Ti, V, Y, Sc, Zr, Nb RE, Ta, and W which are soluble in the solvent (d) are also usable as the transition metal compound (b).

Complexing Agent (c):

As the complexing agent (c), there can be used an adequate compound which makes it possible to form a complex with the foregoing metal ion [that is, the ion of the metal (a') and the ion of the transition metal (b')] in the solvent (d). However, as the complexing agent (c), it is preferred to use a prescribed compound which makes the foregoing mixed solution to contain a complex witch is formed by the metal (a') and said compound as the complexing agent (c) and also a complex which is formed by the transition metal (b') and said compound as the complexing agent (c). By adding such compound as the complexing agent (c), it is possible that the foregoing metal ion forms a desired complex so that it can present as stable ion in the solvent even when the temperature, the pH value or the lie of the mixed solution is changed during the reaction operation. Further, the reduction reaction is efficiently occurred, and as a result, the generation of impurity is diminished and the yield of a product is improved.

The formation of such complex formed by the metal ion and the complexing agent can be confirmed by means of spectrochemical analysis in ultraviolet and visible region or infrared spectrum analysis in which analysis is performed based on a spectral position or a spectral shift.

As specific preferable examples of the complexing agent (c), there can be mentioned cyanides; thiocyanic acid and salts thereof; nitrous acid and salts thereof; ammonia and salts thereof; amines such as pyridine, bipyridine, ethylenediamine, and dietylenetriamine and slats thereof; ketones such as acetylacetone; organic carboxylic acids such as urea, oxalic acid, citric acid, tartaric acid, and ethylenediaminetetraacetic acid and salts thereof; amino acids such as arginine and alanine; and polyols such as ethylene glycol and polyethylene glycol. Of these, amines and organic carboxylic acids particularly citric acid and ethylenediaminetetraacetic acid and salts thereof are preferred because they make it possible to stably form a desired complex during the reaction, where a homogeneous alloy can be formed.

The above-mentioned compounds as the complexing agent (c) may be used either singly or in combination two or more of them.

Solvent (d):

As the solvent (d), there can be used any solvents as long as the metal compound (a), the transition metal compound (b), the complex of the metal compound (a) and the complexing agent (c), and the complex of the transition metal compound (b) and the complexing agent (c) are uniformly dispersed and dissolved therein so that a homogeneous alloy material can be formed.

Such solvent can include water and polar solvents. Specific examples of the polar solvent are alcohols such as methanol, ethanol, and ethylene glycol; esters such as ethyl acetate, butyl acetate, ethylene carbonate, propylene carbonate, and dimethyl carbonate; amides such as formamido, N,N-diethylformamide, N,N- dimethylacetamide, 1,3-diethyl-2-imidazolidinone, and N-methylpyrrolidone nitrites such as acetonitrile, propionitrile, succinonitrile, and benzonitrile; amines such as ethylenediamine, triethyleneamine, aniline, pyridine, and piperidine; halogen compounds such as methylene chloride chloroform, 1,2-dichloroethane, chlorobenzene, and 1-bromo-2-chloroethane; sulfur compounds such as dimethyl sulfoxide, and sulfolane; liquid ammonium; and glacial acetic acid. Of these, water and alcohols are preferred because the solubility of the complex of the metal compound (a) and the complexing agent (c) and that of the complex of the transition metal compound (b) and the complexing agent (c) are high therein.

The above-mentioned solvents may be used either singly or in combination of two or more of them.

Reducing Agent (e):

The reducing agent (e) comprises a compound which can reduce the foregoing ion [that is, the ion of the metal (a') and the ion of the transition metal (b')] and which has an electrode potential (which is provided by the ion or element contained in said compound as the reducing agent), which is inferior to the electrode potential (E) of each of the metal (a') and the transition metal (b'). That is, as the reducing agent (e), there is used such a compound that when said compound as the reducing agent exists together with the ion of the metal (a') and the ion of the transition metal (b'), these metal ions are likely to be reduced and the compound is likely to be oxidized.

The electrode potential (E) is meant an electric potential between a normal hydrogen electrode and a given metal when a combination of said normal hydrogen electrode and said metal is immersed in a solution containing ion of said metal. In general, the dissociation degree of the ion is changed depending upon the temperature or the pH value of the solution, and because of this, the electrode potential is also changed.

Particularly, as the reducing agent (e), there is used an adequate compound whose electrode potential in the liquid state upon the reduction reaction is inferior to the the electrode potential of the metal (a') or that of the transition metal (b') which is the lowest. Particularly, the electrode potential of the compound as the reducing agent is preferred to be inferior by more than 0.1 V or preferably more than 0.2 V to that of metal (a') or the transition metal (b') which is the lowest, because the reduction reaction is efficiently occurred in this case.

As previously described, the electrode potential of the reducing agent is changed depending upon the temperature or the pH value of the mixed solution. Therefore, it is inconvenient to select an adequate compound suitable as the reducing agent (e). However, by referring to a normal electrode potential (E°) as a guide, it is possible to select such compound having a normal electrode potential which is lower than the electrode potential of each of the metal compound (a) and the transition metal compound (b).

The normal electrode potential (E°) here can be obtained from the electrode potential (E) in accordance with the equation $E°=E-(RT/nF)\ln a$, with R being a gas constant, T being an absolute temperature, F being a Faraday constant, n being ion valency, and a being an activity of a metal ion in a solution.

That is, the normal electrode potential (E°) is an electrode potential when a=1, and it is indicated by an electrode potential which is exhibited when the concentration of a solute constituting a monopole in the solution is in a standard state (a=1) which is 1 atmospheric pressure it the case of a gas and which is in the most stable state (with respect to the pH value or temperature) in the case of a solid or liquid. The electrode potential has an inherent value depending upon the kind of a material involved.

In the case where at least one kind of a metal compound selected from a group consisting of hydrochlorides of Sn, sulfates of Sn and nitrates of Sn is used as the metal compound (a), when a given compound is such that the an aqueous solution thereof maintained at an aqueous solution maintained at 25° C. has a normal electrode potential which is lower than the electrode potential of said metal compound, said compound can be used as the reducing agent (e). However, it is preferred to use a reducing agent comprising a compound whose normal electrode potential is less than −0.2 V or preferably less than −0.5 V, because the reduction of Sn is efficiently occurred in tis case.

And said compound as the reducing agent is soluble in the solvent (d), the compound is preferable because the reduction reaction is uniformly occurred. Further, when the compound is still soluble in the solvent even after it is oxidized, the compound is more preferable because contamination of impurity into an ahoy particulate deposited by the reaction is diminished.

Such compound which can satisfy these conditions as the reducing agent (e) can include lower oxygen compounds such as hypophosphorous acid, phosphorous acid, sulfurous acid, thiosulfuric acid, and dithionous acid and salts of these compounds; metal salts in the low valence state of Fe (II), Ti (III) and Cr (II); organic compounds such asp formaldehyde, formic acid, and oxalic acid and salts of these organic compounds. In the present invention these compounds can be used either singly or in combination of two or more of them as the reducing agent (e).

In the following, description will be made of an electrode material produced by the electrode material-producing process of the present invention.

As previously described, the electrode material produced according to the present invention comprises an amorphous alloy material (including an amorphous alloy particulate) chiefly comprising at least one kind of a metal (a') capable of being alloyed with lithium and at least one kind of a transition metal (b').

The metal (a') can include BI, In, Pb, Si, Ag, Sr, Ge, Zn, Sn, Cd, Sb, Ti, and Hg. Of these, Bi, In, Pb, Zn, Sn, Sb, and Tl are preferred, and Sn is more preferred. The metal (a') may comprise one or more of these metals.

The transition metal (b') can include Cr, Mn, Fe, Co, Ni, Cu, No, Tc, Ru, Rh, Pd, Ag, Os, Ir, Pt, Au, Ti, V, Y, Sc, Zr, Nb, Hf, Ta, and W. Of these, Cr, Mn, Fe, Co, Ni, Cu, Ru, Rh, Pd, Ag, Os, Ir, Pt, and Au are preferred, and Cr, Mn, Fe, Co, Ni, and Cu are more preferred. The transition metal (b') may comprise one or more of these transition metals.

The electrode material produced according to the present invention also includes an amorphous alloy material (including an amorphous alloy particulate) chiefly comprising at least one kind of a meta (a') selected from a group consisting of the above-mentioned metals capable of being alloyed with lithium and at least one kind of a transition metal (b') selected from a group consisting of the above-mentioned transition metals and which contains at least one kind of an element selected from a group consisting of B, C, N, O, P, and S. This amorphous alloy material may be produced by making a compound containing at least one kind of an element selected from a group consisting of B, C, N, O, P, and S to exist together with the foregoing metal compound (a) and the foregoing transition metal compound (b) in the reaction system. These elements have an atomic radius which is smaller than that of each of the metal (a') and the transition metal (b') and because of this, they facilitate the amorphization. Particularly, B, C, N, and F has a more small atomic radius and therefore these elements are more preferred for the amorphization.

In a preferred embodiment, the electrode material produced according to the electrode material-producing process of the present invention comprises am amorphous alloy material (including an amorphous alloy particulate) containing a Sn.A.X alloy with a substantially non-stoichiometric ratio composition as a principal constant constituent. For the formula Sn.A.X. A indicates at least one kind of a transition metal element selected from a group consisting of Cr, Mn, Fe, Co, Ni, Cu, Mo, Tc, Ru, Rh, Pd, Ag, Os, Ir, Pt, Au, Ti, V, Y, Sc, Zr, Nb, Hf, Ta, and W. X indicates at least one kind of an element selected from a group consisting of B, C, N, O and S, where the element X is not always necessary to be contained. The content of the constituent element Sn of the amorphous Sn.A.X alloy is preferred to have a relationship of Sn/(Sn+A+X)=20 to 80 atomic % in terms of the number of atoms of each element (atom) of the entire constituent elements Sn, A and X.

The "amorphous alloy with a substantially non-stoichiometric ratio composition" in the present invention means an amorphous alloy in which more then two kinds of metal elements are not bonded at a simple integral ratio. That is, the "amorphous alloy with a substantially non-stoichiometric ratio composition" in the present invention is distinguished from an intermetallic compound in which more than two kinds of metal elements are bonded at a simple integral ratio. More concretely, the element composition of the "amorphous alloy" in the present invention is distinguished from that off any of known intermetallic compounds (which have a regular atomic arrangement and a crystalline structure which is quite different from that of each constituent metal), namely, it is distinguished from the composition (the stoichiometric composition) expressed by a prescribed structural formula in which more than two kinds of metal elements are bonded at a simple integral ratio. It should be noted to the fact that those compounds an which more than two kind of metal elements are bonded at a simple integral ratio and which have a regular atomic arrangement and a crystalline structure which is quite different from that of each constituent metal are known as intermetallic compounds.

The "amorphous alloy with a substantially non-stoichiometric ratio composition" in the present invention is distinguished from such intermetallic compound.

For instance, as for Sn—Co alloy, it is widely known that $Sn_2Co_3$, SnCo, and $Sn_2Co$ which have a composition ratio in which the atomic ratio of Sn and Co is a simple integral ratio are intermetallic compounds.

However, the composition ratio of a Sn—Co alloy with the non-stoichiometric ratio composition which is produced by the electrode material-producing process of the present invention (see, example which will be later described) is deviated from that of said intermetallic compound and therefore, the former is clearly distinguished from the latter. In this way, the "amorphous alloy" in the present invention is of the composition which is quite different from the stoichiometric composition in view of this, the "amorphous alloy" in the present invention is identified by the term "amorphous allow with a non-stoichiometric ratio composition".

Whether or not the amorphous alloy particulate contains amorphous phase or whether or not it is truly amorphous may be confirmed by the following analytical method.

In a X-ray diffraction chart of a given specimen in which a peak intensity against a diffraction angle by X-ray diffraction analysis using Kα-rays of Cu is appeared, in the case where the specimen is crystalline, a sharp peak is appeared. However, in the case where the specimen contains amorphous phase, a broad peak with a widened half width is appeared, and in the case where the specimen is completely amorphous, no X-ray diffraction peak is appeared. Separately, according to a radial distribution function curve which is obtained by way of calculation on the basis of data obtained in the X-ray diffraction analysis of a specimen, said radial distribution function curve being of a function showing the situation that for a given atom, existential probability of other atom is present at a point being apart from said given atom at a given distance in the case where the specimen is amorphous, being different from the case of a crystalline whose interatomic distance is constant wherein a sharp peak is appeared at every point of a definite distance, it is understood that the density at a short distance in the vicinity of the foregoing given atom is large but it is diminished as the distance from the atom becomes distant.

According to an electron diffraction patter obtained by electron diffraction analysis, it is understood that in the course of shifting from a spot pattern of a crystalline to an amorphous nature, there are observed electron diffraction pattern changes from a ring pattern to a diffuse ring pattern, then to a halo pattern. In the case where a material has a diffuse ring pattern, it is understood that the material contains amorphous phase. In the case where a material has a halo pattern, it is understood that the material is amorphous.

According to analysts by means of a differential scanning calorimeter (DSC), for an amorphous phase-bearing metal powders there is observed a calorific peak due to crystallization upon heating said metal powder (in the case of an amorphous phase-bearing Sn alloy powder, when it is heated at a temperature in a range of from 200° C. to 600° C.).

Now, in the case where an amorphous alloy particulate has an increased amorphous phase proportion, it in understood from a peak appeared in a X-ray diffraction chart where a sharp peak is appeared in the case of a crystalline, but a broad peak with a widened half width is appeared in the above case.

The amorphous alloy material (particulate) produced by the production process of the present invention has a peak appeared in a range of 2θ=20° to 50° in X-ray diffraction with Kα-rays of Cu, having a half width of preferably more than 0.2°, more preferably more than 0.5°.

The amorphous alloy material (particulate) has a crystallite size, which is calculated based on data obtained in the X-ray diffraction analysis of said amorphous alloy material (in an unused state) before neither charging nor discharging is operated for said amorphous alloy material, which is preferably in a range of less than 50 nm, more preferably in a range of less than 20 nm.

The crystallite size of the amorphous alloy material (particulate) can be determined from the half width and diffraction angle of a peak of a X-ray diffraction curve obtained using a radiation source comprising Kα-rays; of Cu and in accordance with the following Scherrer's equation.

$$Lc = 0.94 \lambda / (\beta \cos \theta) \quad \text{[Scherrer's equation]}$$

Lc: crystallite size
λ: wavelength of X-ray beam
β: half width (radian) of the peak
θ: Bragg angle of the diffraction line The proportion of the amorphous phase in the amorphous alloy material (particulate) can be readily obtain by making a X-ray diffraction pea intensity obtained from a crystallized product, which is obtained by subjecting a sample of said amorphous alloy material to a heat treatment at a temperature of more than 600° C. in an atmosphere composed of inert gas or hydrogen gas, to be a crystalline of 100% (intensity Ic).

When the X-ray diffraction peak intensity of the amorphous alloy material is made to be Ia, the proportion of the amorphous phase is (1−Ia/Ic)×100%.

As specific examples of the amorphous Sn.A.X alloy material produced by the production process of the present invention there can be mentioned those as will be illustrated below.

(1) Specific examples of the amorphous alloy material with a composition comprising Sn element and the foregoing element A which comprises at least one kind of a transition metal element selected from a group consisting of Co, Ni, Fe, Cu, Cr, and M are; Sn—Co amorphous alloy, Sn—Ni amorphous alloy, Sn—Fe amorphous alloy, Sn—Cu amorphous alloy, Sn—Co—Ni amorphous alloy, Sn—Co—Cu amorphous alloy. Sn—Co—Fe amorphous alloy, Sn—Ni-Cu amorphous alloy, Sn—Ni—Fe amorphous alloy, Sn—Co—Fe—Ni—Cr amorphous alloy, Sn—Co—Fe—Ni—Mn amorphous alloy, Sn—Co—Cu—Fe—Ni—Cr amorphous alloy, and Sn—Co—Cu—Fe—Ni—Cr—Mn amorphous alloy.

(2) Specific preferable examples of the amorphous alloy comprising any of the compositions described in the above (1) to which the foregoing element X which comprises at least one kind of an element selected from a group consisting of B, C, N, O, P, and S is added are: Sn—Co-C amorphous alloy, Sn—Ni—C amorphous alloy, Sn—Fe—C amorphous alloy, Sn—Cu—B amorphous alloy, Sn—Fe—Ni—Cr—C amorphous alloy, Sn—Co—Fe—Ni—Cr—C amorphous alloy, Sn—Cu—Fe—Ni—Cr—C amorphous alloy, Sn—Co—Fe—Ni—Cr—Mn—C amorphous alloy, Sn—Co—Cu—Fe—Ni—Cr—Mn-C amorphous alloy, Sn—Co—P amorphous alloy, Sn—Ni—P amorphous alloy, Sn—Fe—P amorphous alloy, Sn—Cu—P amorphous alloy, Sn—Co—B amorphous alloy. Sn—Ni—B amorphous alloy, Sn—Fe—B amorphous alloy, Sn—Cu—B amorphous alloy. Sn—Co—P amorphous alloy. Sn—Co—N amorphous alloy, Sn—Ni—N amorphous alloy, Sn—Fe—N amorphous alloy, Sn—Cu—N amorphous alloy, Sn—Co—S amorphous alloy, Sn—Ni—S amorphous alloy, Sn—Fe—S amorphous alloy, and Sn—Cu—S amorphous alloy.

In a preferred embodiment, the electrode material produced by the electrode material-producing process of the present invention comprises an amorphous alloy particulate having an average particle size preferably in a range of from 0.1 μm to 2 μm or more preferably in a range of from 0.1 μm to 1 μm. Said amorphous alloy particulate is desired to have a particle size distribution preferably in a range of from 0.01 μm to 20 μm, more preferably in a range of from 0.05 μm to 5 μm, or most preferably in a range of from 0.05 μm to 1 μm.

The average particle size and the particle size distribution can be determined by a measuring method using a laser scattering method or a measuring method by means of a scanning electron microscope.

Further, said amorphous alloy particulate is desired to have a specific surface area preferably in a range of more than 10 $m^2/g$ or more preferably in a range of more than 30 $m^2/g$. The specific surface area can be measured by means of a BET (Brunauer-Emmett-Teller) method using gas absorption.

In addition, aforesaid amorphous alloy particulate is desired to comprises particles preferably in a spherical form or more preferably in a form similar to a round form. Particularly, said amorphous alloy particulate is preferred to have a sphericity in that a value of [longest length of particle]/[shortest length of particle] is preferably in a range of 1.0 to 2.0 or more preferably in a range of 1.0 to 1.5 in an average value.

The "longest length of particle" and the "shortest length of particle" are meant that for an apparent plane of one particle of the amorphous alloy particulate in the observation by a scanning electron microscope, a length in a line direction which crosses the center of the plane and which becomes the longest is expressed as "longest length of particle", and a length in a line direction which crosses the center of the plane and which becomes the shortest is expressed as "shortest length of particle" And a value of [longest length of particle]/[shortest length of particle] for said one particle is a value of said "longest length of particle" to said "shortest length of particle".

An average value of [longest length of particle]/[shortest length of particle] for the amorphous alloy particulate can be determined by obtaining a value of [longest length of particle]/[shortest length of particle] for each of, for instance, 20 particles of the amorphous alloy particulate in the manner as described in the above and calculating an average value of the resultant 20 values of [longest length of particle]/[shortest length of particle].

Now, in the step of forming an amorphous alloy by way of the chemical reduction reaction in the electrode material-producing process of the present invention, the reduction reaction is performed in the solvent and therefore, the reduction reaction is uniformly occurred in the entire reaction system as previously described. Because of this, there is an effect in that there is afforded an amorphous alloy particulate comprising particles having a relatively uniform particle form and a relatively uniform particle size. This effect is more improved by conducting agitation upon the reduction reaction treatment such that said amorphous alloy particulate afforded becomes to comprise particles having in desirably complete particle size and a desirably complete particle from similar to a round form.

In the following, description will be made of an electrode structural body and a process for producing said electrode structural body in the present invention.

FIG. 4 is a schematic cross-sectional view illustrating an electrode structural body 405 which contains an electrode material comprising an amorphous alloy material (particulate) obtained by the electrode material-producing process of the present invention.

The electrode structural body 405 shown in FIG. 4 comprises an electrode material layer 404 (an electrode active material layer) provided on a collector 400. The electrode material layer 404 comprises an amorphous alloy particulate 401, a binder 402, and an electrically conductive auxiliary 403. In FIG. 4, the electrode material layer 404 is provided only on one side of the collector 400. However, it is possible for the electrode material layer to be provided on each of the opposite faces of the collector 400.

Description will be made of examples of a process for producing the electrode structural body 405.

The electrode structural body 405 shown in FIG. 4 may be prepared by mixing a given amorphous alloy particulate 401 of obtained by the electrode material-producing process of the present invention which is capable of being alloyed with lithium in the electrochemical reaction, a given electrically conductive auxiliary 403, and a given binder 402 to obtain a mixture, adding a given solvent to said mixture while adjusting the viscosity to obtain a paste, applying said paste on a collector 400, and drying the paste applied to form an electrode material layer 404 of the collector 400. In this case, the thickness or density of the electrode material layer 404 formed may be adjusted by means of roll press or the like.

The application of the above paste on the collector may be conducted, for instance, by a coater coating method or a screen-printing method.

The electrode material layer 404 may be formed by arranging a mixture obtained by mixing the amorphous alloy particulate, the electrically conductive auxiliary and the binder without using the solvent or a mixture obtained by mixing the amorphous alloy particulate and the electrically conductive auxiliary without using the solvent and the binder on the collector and subjecting the mixture arranged on the collector to a press forming treatment.

In the following, description will be made of the collector 400, the binder 402, and the electrically conductive auxiliary 403.

Collector 400:

The collector 400 serves to supply an electric current such that said electric current can be efficiently consumed for the electrode reaction upon charging and it also serves to collect an electric current generated upon discharging. Particularly in the case where the electrode structural body 404 is used as the anode of a rechargeable lithium battery as the constituent of the collector 400, it is desired to use a material having a high electric conductivity and which is inactive to the battery reaction. As preferable examples of such material, there can be mentioned metallic materials which are incapable of being alloyed with lithium in the electrochemical reaction. Specific examples of such metallic material are metals such as Cu, Ni, Fe, Ti, and the like, and alloys of these metals such as stainless steel. The collector 400 is desired to be in the form of a plate shape. The plate shape in this case may be of a thickness in a practical range. The plate shape can include a so-called "foil" configuration with a thickness of about 100 $\mu$m or less. Besides, it is possible to employ a mesh member, a sponge member, a fibrous member, a punching metal member, and an expanded metal member, respectively in the form of a plate shape.

Binder 402:

As the binder 402, it is possible to use an organic polymer material which is water-soluble or water-insoluble. However, it is more preferred to use a water-soluble organic polymer material as the binder 402.

Specific examples of such water-soluble organic polymer material are polyvinyl alcohol, carboxymethyl cellulose, methyl cellulose, ethyl cellulose isopropyl cellulose, hydroxymethyl cellulose, hydroxyethyl cellulose, hydroxypropylmethyl cellulose, cyanoethyl cellulose, ethylhydroxyethyl cellulose, starch, dextran, pullulan, polysarcosine, polyoxyethlene, polyN-vinylpyrrolidone, gum arabic, tragacanth gum, and polyvinyl acetate.

Specific examples or such water-insoluble organic polymer material are fluorine-containing polymers such as polyvinyl fluoride, polyvinylidene fluoride, tetrafluoroethylene polymer, trifluoroethylene polymer, difluoroethylene polymer, ethylene-tetrafluoroethylene copolymer, tetrafluoroethylene-hexafluoropropylene copolymer, tetrafluoroethylene-perfluoroalkylvinyl ether copolymer, and trifluoroetylene chloride polymer; polyolefins such as polyethylene and polypropylene; ethylene-propylenediethane terpolymer; silicone resin polyvinyl chloride; and polyvinyl butyral.

The rate occupied by the binder 402 in the electrode material layer 404 is desired to be preferably in a range of from 1% by weight to 20% by weight or more preferably in a range of from 2% by weight to 10% by weight in order to retain a large amount of an active material in the electrode material layer upon charging.

Electrically Conductive Auxiliary 403:

The electrically conductive auxiliary 403 can include amorphous carbon materials such as acetylene black, ketjen black, and the like, carbonous materials such as graphite structure carbon, and the like, and metallic materials such as Ni, Cu, Ag, Ti, Pt, Al, Co, Fe, Cr, and the like. As the electrically conductive auxiliary, for example, such carbon material or such metallic material as above illustrated is used by blending it in an amount in a range of from 0 to 30% by weight of the electrode material layer.

The electrically conductive auxiliary 403 is preferred to be in a spherical for, a flake form, a filament form, a fabric form, a spike form, or a needle form. In a more preferred embodiment, by adopting two kinds of forms of these forms, it is possible to increase the packing density upon forming the electrode material layer so that the resulting electrode material layer has a small impedance.

Now, an electrode material comprising an amorphous alloy material (particulate) obtained by the electrode material-producing process of the present invention which is used in the electrode material layer (the active material layer) has a volume expansion upon charging in comparison with a conventional carbonous material such as graphite or the like. Because of this, when the density of the electrode material layer formed on the collector using the amorphous alloy material (particulate) as its principal constituent material is excessively high, there is a tendency that the volume of the electrode material layer is expanded upon charging and peeling is liable to occur between the electrode material layer and the collector. In the case where the density of the electrode material layer is excessively small, there is a tendency that the contact resistance among the particles of the amorphous alloy particulate is liable to increase whereby reducing the current-collecting performance in this connection, the density of the electrode material layer is desired to be preferably in a range of from 2.3 to 3.5 g/cm$^3$ or more preferably in a range of from 2.3 to 3.0 g/cm$^3$.

In the following, description will be made of an example of a rechargeable lithium battery and a process for producing said rechargeable lithium battery in the present invention.

Figure 5:
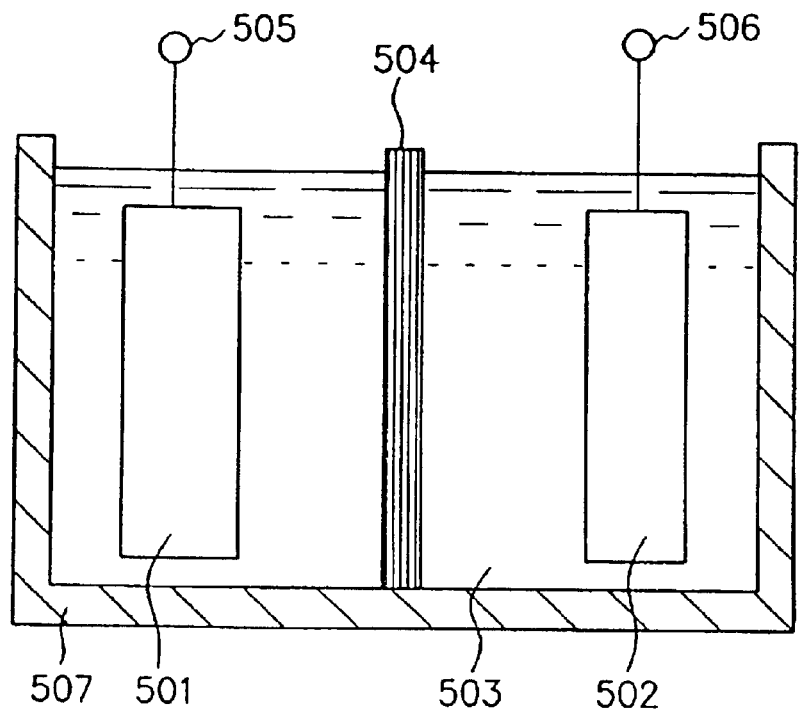
FIG. 5 is a schematic cross-sectional view illustrating a basic constitution of an example of a rechargeable lithium battery according to the present invention.

FIG. 5 is a conceptual view schematically illustrating the constitution of a rechargeable lithium battery according to the present invention. As shown in FIG. 5, an anode 501 comprising the foregoing electrode structural body (405) of the present invention and a cathode 502 are accommodated in a battery housing 507 (a battery case) such that they are opposed to each other through an ion conductor 504 (an electrolyte). And an anode terminal 505 is electrically connected to the anode 501 and a cathode terminal 506 is electrically connected to the cathode 502. Reference numeral 503 indicates an electrolyte solution comprising an electrolyte dissolved in a solvent.

In the present invention, by using an electrode structural body (405) having such configuration as shown in FIG. 4 as the anode 501, because the anode 501 comprises a specific amorphous alloy material (particulate) which is expanded a little when it is alloyed with lithium upon charging, expansion and shrinkage of the anode are quite small in the battery housing 507 even when the charging and discharging cycle is repeated, where the electrode material layer (which retains lithium upon charging) of the anode scarcely suffers fatigue failure. Thus, the rechargeable lithium battery has a markedly prolonged charging and discharging cycle life.

Description will be made of each constituent of the rechargeable lithium battery.

Anode 501:

As the anode 501, the foregoing electrode structural bodies (405) of the present invention can be used as it is.

Cathode 502:

The cathode 502 as a counter electrode to the anode comprising aforesaid electrode structural body in the rechargeable lithium battery comprises at least a cathode active material capable of being a host material for lithium ion and a collector. Preferably, the cathode comprises a layer formed of said cathode active material capable of being a host material for lithium ion and a collector. The layer formed of the cathode material is preferred to comprise said cathode active material capable of being a host material for lithium ion and a binder, if necessary, also an electrically conductive auxiliary.

As the cathode active material capable of being a host material for lithium ion used in the rechargeable lithium battery, transition metal oxide, transition metal sulfides, transition metal nitrides, lithium-transition metal oxides, lithium-transition metal sulfides, and lithium-transition metal nitrides may be selectively used. The transition metal elements of these transition metal oxides transition metal sulfides, and transition metal nitrides can include metal elements having a d-shell or f-shell. Specific examples of such metal element are Sc, Y, lanthanide, actinoids, Ti, Zr, Hf, V, Nb, Ta, Cr, Mo, W, Mn, Tc, Re, Fe, Ru, Os, Co, Rh, Ir, Ni, Pb, Pt, Cu, Ag, and Au.

It is preferred also for the cathode active material (or the cathode material) to comprise an amorphous phase-bearing material in order to increase the amount (that is, the storage capacity) of lithium ion which intercalates. As well as in the ease of the amorphous alloy material (particulate) constituting the anode, the amorphous phase-bearing material is desired to be such that in a X-ray diffraction chart (of X-ray diffraction intensity against a diffraction angle of 2θ) has a main peak with a half width preferably of more than 0.2° or more preferably of more than 0.5° respectively against 2θ.

In the case where the cathode active material is in a powdery form, a cathode active material layer is formed by mixing said powder cathode active material with a binder to obtain a mixture and applying said mixture on the collector or by wintering said powder cathode active material on the collector, whereby forming the cathode. In the case where the conductivity of the powdery cathode active material is insufficient, as well as in the case of forming the electrode material layer (as the anode active material layer) or the foregoing electrode structural body, an adequate electrically conductive auxiliary is added. As said binder and said electrically conductive auxiliary, those mentioned in the above which are used for the formation of the electrode structural body (405) of the present invention may be used.

The collector of the cathode may be constituted by a metal such as Al, Ti, Pt, or Ni, or an alloy such as stainless steel.

Ion Conductor 504:

As the ion conductor 504 used in the rechargeable lithium battery of the present invention, there may be used a separator having an electrolyte solution (a supporting electrolyte solution obtained by dissolving a given supporting electrolyte in an adequate solvent) retained therein, a solid electrolyte, or a solidified electrolyte obtained by gelling an adequate electrolyte solution by a high molecular gelling agent.

The ion conductor used in the rechargeable lithium battery of the present invention is necessary to have an ionic conductivity at 25° C. which is preferably more than $1 \times 10^{-3}$ S/cm or more preferably more than $5 \times 10^{-3}$ S/cm.

The supporting electrolyte can include inorganic acids such as $H_2SO_4$, HCl and $HNO_3$; salts of $Li^+$ (lithium ion) with Lewis acid ion such as $BF_4^-$, $PF_6^-$, $AsF_6^-$, $ClO_4^-$, $CF_3SO_3^-$, or $BPh_4^-$ (with Ph being a phenyl group); and mixtures of these salts. Besides, salts of the above described Lewis acids ions with cations such as sodium ion, potassium ion, tetraalkylammonium ion, or the like are also usable.

In any case, it is desired that the above salts are used after they are subjected to dehydration or deoxygenating, for example, by way of heat treatment under reduced pressure.

The solvent in which the supporting electrolyte is dissolved can include acetonitrile, benzonitrile, propylene carbonate, ethylene carbonate, dimethyl carbonate, diethyl carbonate, dimethylformamide, tetrahydrofuran, nitrobenzene, dichloroethane, diethoxymethane, 1,2-dimethoxyethane, chlorobenzene, Y-butyrolactone, dioxolan, sulfoxide, nitromethane, dimethyl sulfide, dimethyl sulfoxide, methyl formate, 3-methyl-2-oxdazolydinone, 2-methyltetrahydrofuran, 3-propylsydonone, sulfur dioxide, phosphoryl chloride, thionyl chloride, sulfuly chloride, and mixtures of these.

As for these solvents, it is desired for them to be subjected to dehydration using activated alumina, molecular sieve, phosphorous pentaoxide, or calcium chloride, prior to their use. Depending upon some of these moments, it is desired for them to be subjected to distillation in an atmosphere composed of inert gas in the presence of an alkali metal, where moisture and foreign matter are removed.

In order to prevent leakage of the electrolyte solution, it is desired to use a solid electrolyte or solidified electrolyte.

The solid electrolyte can include a glass material such as an oxide material comprising lithium, silicon, phosphorus, and oxygen elements, a polymer chelate comprising an organic polymer having an ether structure, and the like.

The solidified electrolyte can include those obtained by gelling a given electrolyte solution by a gelling agent to solidify said electrolyte solution. As the gelling agent, it is desired to use a polymer having a property of absorbing the solvent of the electrolyte solution to swell or a porous material such as silicagel, capable of absorbing a large amount of liquid. Said polymer can include polyethylene oxide, polyvinyl alcohol, polyacrylamide, polymethyl methacrylate, and polyacrylonitrile. And these polymers are preferred to have a cross-linking structure.

The separator is disposed between the anode and the cathode, and it serves to prevent the anode and the cathode from suffering from internal-shorts. It also serves to retain an electrolyte therein depending upon the situation. The separator having the electrolyte retained therein functions as the ion conductor.

The separator is required to have a structure having a number of perforations capable of allowing lithium ion to pass therethrough and it is also required to be insoluble into and stable to the electrolyte solution. The separator is preferred to be constituted by a nonwoven fabric or a memberane having a micropore structure, made of glass, a polyolefin such as polypropylene, polyethylene or the like, or a fluororesin. Alternatively, the separator may be constituted by a metal oxide film or a resin film combined with a metal oxide, respectively having a plurality of micropores. In a preferred embodiment, the separator is constituted by a multilayered metal oxide film. In this case, the separator effectively prevents a dendrite from passing therethrough and because of this, occurrence of internal-shorts between the anode and the cathode is desirably prevented. Besides, the separator may be constituted by an incombustible material such as a fluororesin film, a glass member or a metal oxide film. In this case, the safety can be more improved.

Shape and Structure of Rechargeable Battery:

The rechargeable battery of the present invention may be in the form of a flat round shape, a cylindrical shape, a prismatic shape, or a sheet-like shape. The structure of the rechargeable battery of the present invention may take a single layer structured a spiral-wound cylindrical structure, or the like. In the case where the rechargeable battery is of a spiral-wound cylindrical structure, the anode, separator, and cathode are arranged in the named order and they are spiral-wound and because of those it has advantages such that the battery area can be increased as desired and a high electric current can be flown upon charging and discharging. In the case where the rechargeable battery is of a prismatic structure or a single layer structure, there is an advantage in that the space of a device for housing the rechargeable battery can be effectively utilized.

In the following, the shape and structure of a rechargeable lithium battery of the present invention will be detailed with reference to FIGS. 6 and 7.

Figure 6:
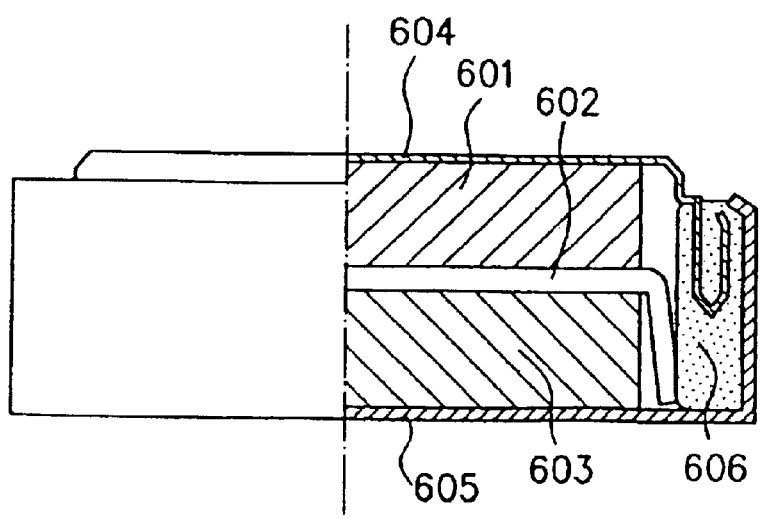
FIG. 6 is a schematic cross-sectional view illustrating an example of a single-layer structure type flat battery according to the present invention.

FIG. 6 is a schematic cross-sectional view illustrating an example of a single-layer flat round type (coin type) rechargeable lithium battery according to the present invention. FIG. 7 is a schematic cross-sectional view illustrating an example of a spiral-wound cylindrical type rechargeable lithium battery according to the present invention.

Figure 7:
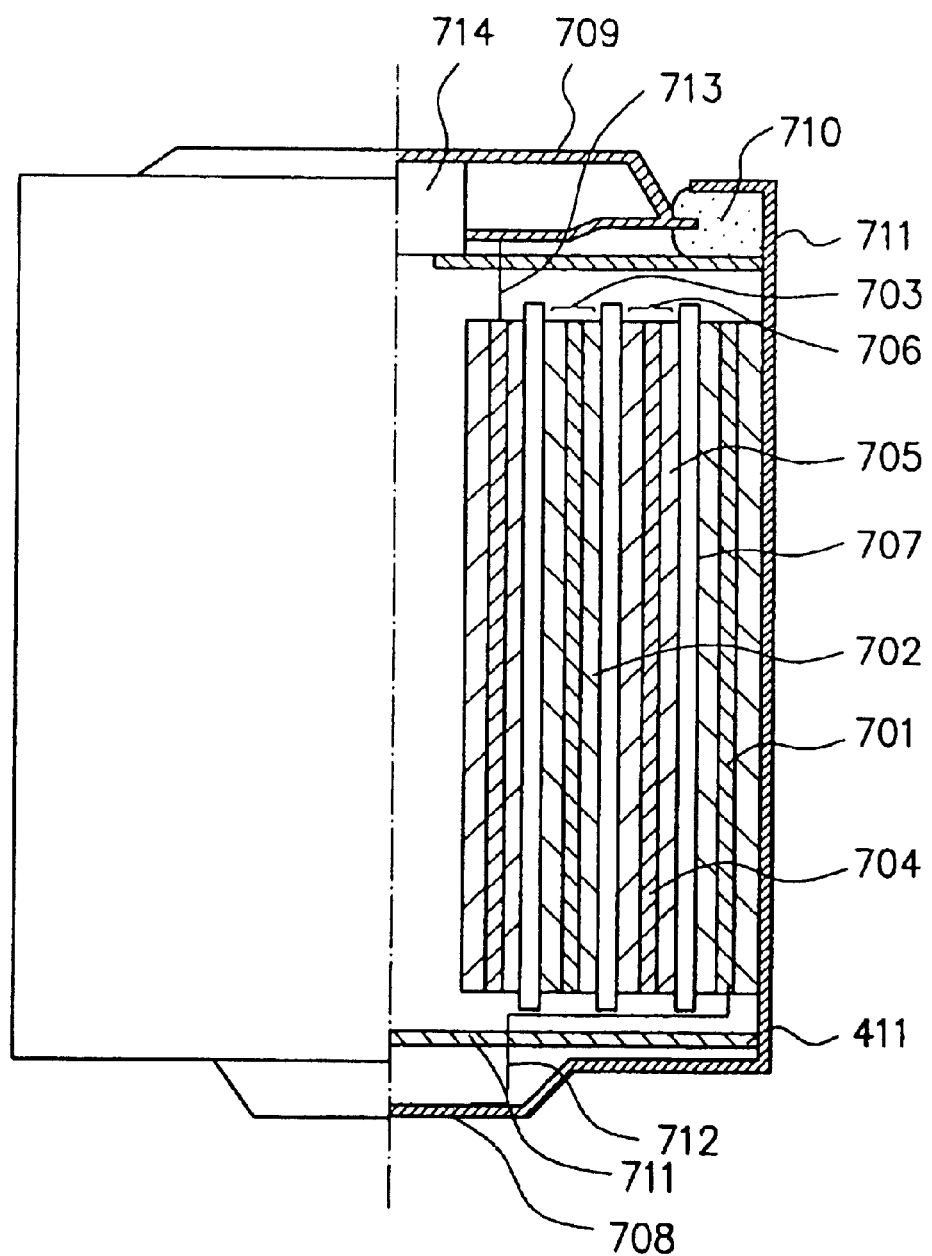
FIG. 7 is a schematic cross-sectional view illustrating an example of a spiral-wound cylindrical battery according to the present invention.

In FIGS. 6 and 7, each of reference numerals 601 and 703 indicates an anode, each of reference numerals 603 and 706 a cathode, each of reference numerals 604 and 708 an anode terminal (an anode cap or an anode cam), each of reference numerals 605 and 709 a cathode terminal (a cathode can or a cathode cap) each of reference numerals 602 and 707 an ion conductor, each of reference numerals 606 and 710 a gasket, reference numeral 701 an anode collector, reference numeral 704 a cathode collector, reference numeral 711 an insulating plate, reference numeral 712 an anode lead, reference numeral 713 a cathode lead, and reference numeral 714 a safety vent.

In the flat round type (coin type) rechargeable battery shown in FIG. 6, the cathode 603 having a cathode material (active material) layer and the anode 601 having an anode material (active material) layer are stacked through the ion conductor 602 comprising a separator having at least an electrolyte solution retained therein to form a stacked body, and this stacked body is accommodated in the cathode can 605 as the cathode terminal from the cathode side, there the anode side is covered by the anode cap 604 as the anode terminal. And the gasket 606 is disposed in the remaining space of the cathode can.

In the spiral-wound cylindrical type rechargeable battery shown in FIG. 7, the cathode 706 having a cathode material (active material) layer 705 formed on the cathode collector 704 and the anode 703 having an anode material (active material) layer 702 formed on the anode collector 701 are opposed to each other through the ion conductor 707 comprising a separator having at least an electrolyte solution retained therein, and wound in multiple to form a stacked body caving a multi-wound cylindrical structure. The stacked body having the cylindrical structure is accommodated in the anode can 708 as the anode terminal. The cathode cap 709 as the cathode terminal is provided on the opening side of the anode can 708, and the gasket 710 is disposed in the remaining space of the anode can. The electrode stacked body of the cylindrical structure is isolated from the cathode cap side trough the insulating plate 711. The cathode 706 is electrically connected to the cathode cap 709 through the cathode lead 713. The anode 703 is electrically connected to the anode can 708 through the anode lead 712. The safety vent 714 for adjusting the internal pressure of the battery is provided on the cathode cap side.

In the above, each of the active material layer of the anode 601 and the active material layer 702 of the anode 703 comprises a layer comprising an amorphous alloy material (particulate) obtained by the electrode material-producing process of the present invention.

In the following, description will be made of an example of a process for fabricating a rechargeable lithium battery having such configuration as shown in FIG. 6 or FIG. 7.

(1) A combination comprising the separator (602, 707) interposed between the anode (601, 703) and the cathode (603, 706) is positioned in the cathode can (605) or the anode can (708).

(2) The electrolyte is introduced thereinto, and the resultant is assembled with the anode cap (604) or the cathode cap (709) and the gasket (606, 710).

(3) The assembled body obtained in the step (2) is subjected to a caulking treatment, whereby the rechargeable lithium battery is completed.

In the battery fabrication, the preparation of the materials for the rechargeable lithium battery and the assembly of the battery are desired to be conducted in a dry air atmosphere whose moisture having been sufficiently removed or in a dry inert gas atmosphere.

Description will be made of the members used in the fabrication of the above rechargeable lithium battery.

Insulating Packing:

The gasket (606, 710) may be constituted by a fluororesin, a polyamide resin, a polysulfone resins or a rubber material. The sealing of the battery may be conducted by way of glass-sealing, sealing using an adhesive welding or soldering, besides the caulking using the insulating packing shown in the case shown in FIG. 6 or FIG. 7.

The insulating plate 711 shown in FIG, 7 may be constituted by a material selected from organic resin materials and ceramics.

Battery Housing:

The battery housing comprises the cathode can or the anode can (605, 708), and the anode cap (604) or the cathode cap (709). Such battery housing preferably comprises a stainless steel sheet. Besides, it may comprise a titanium clad stainless steel sheet, a copper clad stainless steel sheet or a nickel plating steel sheet.

In the case of FIG. 6, the cathode can (605) also functions as the battery housing, and in the case of FIG. 7, the anode can (708) also functions as the battery housing, and therefore, the battery housing in each case is desired to comprise a stainless steel. However, in the case where neither the cathode can nor the anode can also functions as the battery housing, a battery housing comprising said stainless steel, a metallic material of iron or zinc, a plastic material of polypropylene or the lie, or a composite material comprising a metallic material or a glass fiber and a plastic material may be used.

Safety Vent:

In the rechargeable lithium battery, a safety vent may be provided in order to ensure the safety when the internal pressure in n the battery is increased. The safety vent may comprise a rubber, a spring, a metal ball or a rupture foil.

In the following, the present invention will be described in more detail with reference to examples. However, the scope of the present invention is not restricted to these examples. In the following description, "part" and "%" stand for "part by weight" and "% by weight" respectively.

EXAMPLE 1

In this example, there was prepared a rechargeable lithium battery having such cross-sectional structure as shown in FIG. 6. In the anode of the battery, there was used a Sn—Ni amorphous alloy material (particulate) prepared by the electrode material-producing process of the present invention. In the cathode, these was used lithium cobaltate.

In the following, description will be made of preparation procedures of respective constituents of the battery and fabrication procedures of the battery with reference to FIG. 6, starting from the preparation of an anode.

1. Preparation of anode 601:
   (1). Preparation of an alloy powder (particulate) as an electrode material:

5.3 parts of a pentahydrate of tin (IV) chloride as the metal compound capable of being alloyed with lithium, 10.7 pets of a hexahydrate of nickel (II) chloride as the transition metal compound, 75.0 parts of a dihydrate of trisodium citrate, 8.8 parts of ethylenediaminetetraacetic acid, and 8.8 parts of a potassium acetate respectively as the completing agent were mixed with 100 parts of water as the solvent and sufficiently stirred to obtain a mixed solution. The mixed solution was introduced into the reaction vessel 201 (provided with the starting material introduction device 202, the reflux device 203, the gas introduction pipe 204, the agitator 205, and the temperature controlling equipment 206) shown in FIG. 2 through the starting material introduction device, and in order to maintain the inside of the reaction vessel in a nitrogen gas atmosphere, nitrogen gas was introduced into the reaction vessel through the gas introduction pipe, where excessive nitrogen gas was exhausted to the outside of the system through the reflux device. The reaction vessel having the minced solution therein was heated to 70° C. by means of the temperature controlling equipment (water bath), and the mixed solution in the reaction vessel was sufficiently stirred by means of the agitator.

Here, a specimen of the mixed solution treated in the above was subjected to analysis by means of a visible-ultraviolet absorption spectrum analyzer, where an identical peak was appeared at a position of 600 nm and a peak shift from 390 nm to 380 nm a observed. From this result, it was found that a complex formed by the metal of the metal compound (capable of being alloyed with lithium and the completing agent and a complex formed by the transition metal of the transition metal compound and the complexing agent are contained in the mixed solution.

Then, a solution obtained by dissolving 23.1 parts of a titanium (II) chloride as the reducing agent in 73.3 parts of water was heated to 70° C. and added to the mixed solution in the reaction vessel through the starting material introduction device, followed by being sufficiently stirred. This adding and mixing step was performed within one minute. The pH value of the solution in the reaction vessel was measured. As a result, the solution was found to have a pH value of 0.1.

Thereafter, a potassium hydroxide aqueous solution of 8N was added to the solution in the reaction vessel through the starting material introduction device while stirring the solution, so that the pH value of the solution became to be 8.0, and the solution in the reaction-vessel was subjected to a heat treatment at 70° C. for 30 minutes. The adding and mixing step of the potassium hydroxide aqueous solution here was performed within one minute.

Thereafter, the content in the reaction vessel was taken out from the vessel and it was washed with water, and vacuum-dried at 50° C. Thus, there was obtained a product comprising a Sn—Ni alloy power.

A specimen of the resultant alloy powder was subjected to analysis by means of X-ray microanalysis (XMA). As a result, only Sn and Ni were detected without other elements being detected. Then, the specimen was subjected to analysis by means of inductively coupled plasma emission analysis (ICP). As a result, the content of Sn and that of Ni were found to be 61% and 39% respectively in terms of the atom number content.

Separately, using an X-ray diffraction device RINT 2000 (produced by Kabusiki Kaisha RIGAKU), a specimen of the resultant alloy powder was subjected to wide angle X-ray diffraction analysis using $K\alpha$-rays of Cu as a radiation source, which gave peaks having a widened half width appeared in a region of $2\theta=25°$ to $50°$ as shown in FIG. 8(1). And there were observed two main peaks one at $2\theta=30.2°$ and another at $2\theta=43.6°$ in the X-ray diffraction chart, having a half width of 0.8° and that of 0.6°, respectively. The presence of these peaks having a wide half width indicates that the resultant alloy powder is amorphous. Separately, calculation was carried out on the basis of the half widths and the diffraction angles of these peaks and in accordance with the foregoing Scherrer's equation. As a result, there were obtained a crystallite size of 11 nm and another crystallite size of 15 nm.

In addition, a specimen of the resultant alloy powder was subjected to measurement of particle size distribution by means of a particle size distribution measuring equipment using a laser scattering method. As a result, it was found to have au average particle size of 0.23 $\mu$m and a particle size distribution of 0.06 to 0.9 $\mu$m.

Further, a specimen of the resultant alloy powder was examined by means of a scanning electron microscope. As a result, it was found that an average value of the [longest length of particle]/[shortest length of particle] is 1.3. From this result, the resultant alloy powder was found to comprise spherical particles.

Further in addition, a specimen of the resultant alloy powder was subjected to measurement of specific surface area by means of a SET method using nitrogen gas. As a result, it was found to have a specific surface area of 80 $m^2/g$.

(2). Preparation of an electrode structural body as an anode 601:

90 parts of the Sn—Ni alloy powder obtained in the above, 5 parts of a graphite powder as an electrically conductive auxiliary, 2 parts of polyvinyl alcohol, and 3 parts of carboxymethyl cellulose were mixed to obtain a mixture, and the mixture was mixed with 100 parts of water as a solvent, and stirred to obtain a paste-like product. The paste-like product was applied on a copper foil as a collector, followed by drying, and dried at 150° C. under reduced pressure.

Thus, there was obtained an electrode structural body as an anode 601.

2. Preparation of cathode 603:
   90 parts of a powdery lithium cobaltate, 5 parts of an acetylene black, and 5 parts of a powdery polyvinylidene fluoride were mixed to obtain a mixture. The mixture was mixed with 100 parts of N-methyl-2-pyrroidone, followed by being stirred, to obtain a paste-like product.

The paste-like product obtained in the above was applied on an aluminum foil as a collector, followed by drying, and dried at 150° C. under reduced pressure.

Thus, there was obtained a cathode 603.

3. Preparation of an electrolyte solution:
   Ethylene carbonate (EC) whose moisture having been sufficiently removed and dimethyl carbonate (DMC) whose moisture having been sufficiently removed were mixed at an equivalent mixing ratio, to obtain a solvent.

1 M (mol/l) of lithium tetrafluoroborate (LiBF$_4$) was dissolved in the solvent obtained in the above to obtain an electrolyte solution.

4. Provision of a separator 602:

There was provided a separator comprising a polyethylene film member having a number of micropores.

By introducing the electrolyte solution at a later stage, the electrolyte solution becomes to retain in the micropores of the separator, where the separator having the electrolyte solution therein functions as the ion conductor.

5. Fabrication of a rechargeable lithium battery:

The fabrication of a rechargeable lithium battery was conducted in a d atmosphere controlled with respect to moisture with a dew point of less than −50° C.

The separator 602 was sandwiched between the anode 601 and the cathode 603, and the resultant was inserted in a cathode can 605 made of titanium clad stainless steel. Then, the electrolyte solution was introduced into the cathode can such that it was retained in the separator. Thereafter, the resultant was sealed using an anode sap 604 made of titanium clad stainless steel and an insulating packing 606 made of polypropylene.

Thus, there was prepared a rechargeable lithium battery having such cross-sectional structure as shown in FIG. 6.

This rechargeable battery was made to be of an anode capacity-controlled type in that the cathode capacity is larger than the anode capacity.

Evaluation of Battery Characteristics

For the rechargeable lithium battery obtained in this example, evaluation was conducted with respect to battery characteristics, i.e., battery capacity, charge-and-discharge Coulombic efficiency, and charging and discharging cycle life, obtained by performing alternately charging and discharging, in the following manner.

(1). Capacity Test:

The capacity test was conducted through the following charging and discharging cycle test. That is, a cycle in that charging is performed for 10 hours wherein first charging is performed with a constant electric current of a value off 0.1 C (an electric current of 0.1 time a value of capacity/time) obtained on the basis of an electric capacitance calculated from the cathode active material of the rechargeable lithium battery, when the battery voltage reaches 4.2 V, the first charging is terminated, followed by performing second charging with a constant voltage of 4.2, a pause for 10 minutes is taken; then discharging is performed with a constant electric current of aforesaid value of 0.1 C (the electric currant of 0.1 time the value of the capacity/the time) until the battery voltage reaches 2.8 V, and a pause for 10 minutes is taken, was repeated three times. The battery capacity was evaluated on the basis of a value obtained from a discharged electricity quantity provided in the third cycle.

(2). Charge-and-discharge Coulombic efficiency:

The charge-and-discharge Coulombic efficiency was obtained in the following manner. That is, a proportion of the discharged electricity quantity to the charged electricity quantity in the above capacity test was calculated. The resultant proportion value was made to be a charge-and-discharge Coulombic efficiency for the battery.

(3). Charging and discharging cycle life:

The charging and discharging cycle life was evaluated in the following manner. The charging and discharging cycle test was conducted by repeating a cycle of alternately performing charging and discharging with a constant electric current of 0.5 C (an electric current of 0.5 time a value of the capacity/the time) on the basis of the discharged electricity quantity in the third cycle in the above capacity test and taking a pause for 10 minutes. And the number of the charging and discharging cycles when the initial battery capacity became less than 60% was made to be a charging and discharging cycle life for the battery.

In the above evaluation, the cut-off voltage upon the charging was made to be 4.5 V, and that upon the discharging was made to be 2.5 V.

The evaluated results obtained in the above are collectively shown in Table 1.

EXAMPLE 2

In this example, there was prepared a rechargeable lithium battery having such cross-sectional structure as shown in FIG. 6 by repeating the procedures of Example 1 except that the anode was prepared using a Sn—Co amorphous alloy material (particulate) prepared as will be described below.

The rechargeable lithium battery obtained in this example was evaluated with respect to its battery characteristics in the same manner as in Example 1. The evaluated results are shown in Table 1.

Preparation of Anode 601:

(1). Preparation of an alloy powder (particulate) as an electrode material:

5.3 parts of a pentahydrate of tin (IV) chloride as the metal compound capable of being alloyed with lithium, 10.7 parts of a hexahydrate of cobalt (II) chloride as the transition metal compound, 85.0 parts of a dihydrate of trisodium citrate, 8.8 parts of ethylenediaminetetraacetic acid, and 8.8 parts of a potassium acetate respectively as the complexing agent were mixed with 100 parts of water as the solvent and sufficiently stirred to obtain a mixed solution. The mixed solution was introduced into the reaction vessel 201 (provided with the starting material introduction device 202, the reflux device 203, the gas introduction pipe 204, the agitator 205, and the temperature controlling equipment 206) shown in FIG. 2 through the starting material introduction device, and in order to maintain the inside of the reaction vessel in a nitrogen gas atmosphere, nitrogen gas was introduced into the reaction vessel though the gas introduction pipe, where excessive nitrogen gas was exhausted to the outside of the system through the reflux device. The reaction vessel having the mixed solution therein was heated to 70° C. by means of the temperature controlling equipment (water bath), and the mixed solution in the reaction vessel was sufficiently stirred by means of the agitator.

Here, a specimen of the mixed solution treated in the above was subjected to analysis by means of a visible-ultraviolet absorption spectrum analyze. As a result, as well as in Example 1, it was found that a complex formed by the metal of the metal compound (capable of being alloyed with lithium) and the complexing agent and a complex formed by the transition metal of the transition metal compound and the complexing agent are contained in the mixed solution.

Then, a solution obtained by dissolving 23.1 parts of a titanium (III) chloride as the reducing agent in 73.3 parts of water was heated to 70° C. and added to the mixed solution in the reaction vessel through the stating material introduction device, followed by being sufficiently stirred. This adding and mixing step was performed within one minute. The pH value of the solution in the reaction vessel was measured. As a result, the solution was sound to have a pH value of 0.1.

Thereafter, a potassium hydroxide aqueous solution of SN was added to the solution in the reaction vessel through the starting material introduction device while stirring the solution, so that the pH value of the solution became to be 8.0, and the solution in the reaction vessel was subjected to a heat treatment at 70° C. for 30 minutes. The adding and mixing step of the potassium hydroxide aqueous solution here was performed within one minute.

Thereafter, the content in the reaction vessel was taken out from the vessel, and it was washed with water, and vacuum-dried at 50° C. Thus, there was obtained a product comprising a Sn—Co alloy power.

A specimen of the resultant alloy powder was subjected to analysis by means of X-ray microanalysis (XMA). As a result, only Sn and Co were detected without other elements being detected. Then the specimen was subjected to analysts by means of inductively coupled plasma emission analysis (ICP). As a result, the content of Sn and that of Co were found to be 75% and 25% respectively in terms of the atom number content.

Separately, using an X-ray diffraction device RINT 2000 (produced by Kabusiki Kaisha RIGAKU), a specimen of the resultant alloy powder was subjected to wide angle X-ray diffraction analysis using Kα-rays of Cu as a radiation source, which gave peaks having a widened half width appeared in a region of $2\theta=25°$ to $50°$. And there were observed two main peaks one at $2\theta=30.4°$ and another at $2\theta=43.0°$ in the X-ray diffraction chart, having a half width of 0.6° and that of 0.8°, respectively. The presence of these peaks having a wide half width indicates that the resultant alloy powder is amorphous. Separately, calculation was carried out on the basis of the half widths and the diffraction angles of these peaks and in accordance with the foregoing Scherrer's equation. As a result, there were obtained a crystallite size of 14 nm and another crystallite size of 11 nm.

In addition, a specimen of the resultant alloy powder was subjected to measurement of particle size distribution by means of a particle size distribution measuring equipment using a laser scattering method. As a result, it was found to have an average particle size of 0.4 μm and a particle size distribution of 0.06 to 0.9 μm.

Further, a specimen of the resultant alloy powder was examined by means of a scanning electron microscope. As a result, it was found that an average value of the [longest length of particle]/[shortest length of particle] is 1.4. From this result, the resultant alloy powder was found to comprise spherical particles.

Further in addition, a specimen of the resultant alloy powder was subjected to measurement of specific surface area by means of a BET method using nitrogen gas. As a result, it was found to have a specific surface area of 75 $m^2/g$.

(2). Preparation of an electrode structural body au an anode 601:

90 parts of the Sn—Co alloy powder obtained in the above, 5 parts of an acetylene black powder as an electrically conductive auxiliary and 5 parts of a polyvinylidene fluoride powder were mixed to obtain a mixture, and the mixture was mixed with 100 parts of N-methyl-2-pyrrolidone as a solvent, and starred to obtain a paste-like product. The paste-like product was applied on a copper foil as a collector, followed by drying, and dried at 150° C. under reduced pressure.

Thus, there was obtained an electrode structural body as an anode 601.

EXAMPLE 3

In this example, there was prepared a rechargeable lithium battery having such cross-sectional structure as shown in FIG. 6 by repeating the procedures of Example 1 except that the anode was prepared using a Sn—Ni amorphous alloy material (particulate) prepared as will be described.

The rechargeable lithium battery obtained in this example was evaluated with respect to its battery characteristics in the same manner as in Example 1. The evaluated results are shown in Table 1.

Preparation of anode 601:

(1). Preparation of an alloy powder (particulate) as an electrode material:

11 parts of a pentahydrate of tin (IV) chloride as the metal compound capable of being alloyed with lithium, 7.1 parts of a hexahydrate of nickel (II) chloride as the transition metal compound, 75.0 parts of a dehydrate of trisodium citrate, 8.8 parts of ethylenediaminetetraacetic acid, and 8.8 parts of a potassium acetate respectively as the completing agent were mixed with 100 parts of water as the solvent and sufficiently stirred to obtain a mixed solution. The mixed solution was introduced into the reaction vessel 201 (provided with the starting material introduction device 202, the reflux device 203, the gas introduction pipe 204, the agitator 205, and the temperature controlling equipment 206) shown in FIG. 2 through the starting material introduction device, and in order to maintain the inside of the reaction vessel in an inert gas atmosphere, argon gas was introduced into the reaction vessel through the gas introduction pipe, where excessive argon gas was exhausted to the outside of the system through the reflux device. The reaction vessel having the mixed solution therein was heated to 70° C. by means of the temperature controlling equipment (water bath), and the mixed solution in the reaction vessel was sufficiently stirred by means of the agitator.

Here, a specimen of the mixed solution treated in the above was subjected to analysis by means of a visible-ultraviolet absorption spectrum analyzer. As a result, as well as in Example 1, it was found that a complex formed by the metal of the metal compound (capable of being alloyed with lithium) and the complexing agent and a complex formed by the transition metal of the transition metal compound and the complexing agent are contained in the mixed solution.

Then, a solution obtained by dissolving 27.8 parts of a titanium (III) chloride as the reducing agent in 87.9 parts of water was heated to 70° C. and added to the mixed solution in the reaction vessel through the starting material introduction device, followed by being sufficiently stirred. This adding and mixing step was performed within one minute. The pH value of the solution in the reaction vessel was measured. As a result, the solution was found to have a pH value of 0.05.

Thereafter, a potassium hydroxide aqueous solution of SN was added to the solution in the reaction vessel through the stating material introduction device while stirring the solution, so that the pH value of the solution became to be 7.0, and the solution in the reaction vessel was subjected to a heat treatment at 90° C. for 2 hours. The adding and mixing step of the potassium hydroxide aqueous solution here was performed with in one minute.

Thereafter, the content in the reaction vessel was taken out from the vessel, and it was washed with water, and vacuum-dried at 50° C. Thus, there was obtained a product comprising a Sn—Ni alloy power.

A specimen of the resultant alloy powder was subjected to analysis by means of X-ray microanalysis (XMA). As a result, Sn, Ni, Ti, and O were detected without other elements being detected. Then, the specimen was subjected to analysis by means of inductively coupled plasma emission analysis (ICP). As a result, the content of Sn, that of Ni, that of Ti, and that of O were found to be 48%, 39%, 5% and 8% respectively in terms of the atom number content.

Separately, using an X-ray diffraction device RINT 2000 (produced by Kabusiki Kaisha RIGAKU), a specimen of the resultant alloy powder was subjected to wide angle X-ray diffraction analysis using Kα-rays of Cu as a radiation source, which gave peaks having a widened half width appeared in a region of 2θ=25° to 50°. And there were observed two main peaks one at 2θ=30.6° and another at 2θ=43.7° in the X-ray diffraction chart having a half width of 0.8° and that of 0.9°, respectively. The presence of these peaks having a wide half width indicates that the resultant alloy powder is amorphous. Separately, calculation was carried out on the basis of the half widths and the diffraction angles of these peaks and in accordance with the foregoing Scherrer's equation. As a result, there were obtained a crystallite size of 11 nm and another crystallite size of 10 nm.

In addition, a specimen of the resultant alloy powder was subjected to measurement of particle size distribution by means of a particle size distribution measuring equipment using a laser scattering method. As a result it was found to have an average particle size of 0.49 μm and a particle size distribution of 0.10 to 1.0 μm.

Further, a specimen of the resultant alloy powder was examined by means of a scanning electron microscope. As a result, it was found that an average value of the [longest length of particle]/[shortest length of particle] is 1.5. From this result, the resultant alloy powder was found to comprise spherical particles.

Further in additions, a specimen of the resultant alloy powder was subjected to measurement of specific surface area by means of a BET method using nitrogen gas. As a result, it was found to have a specific surface area of 52 $m^2/g$.

(2). Preparation of an electrode structural body as an anode 601:

90 parts of the Sn—Ni alloy powder obtained in the above was introduced into a planetary ball mill, where it was ground for one hour. The resultant, 5 parts of a graphite powder as an electrically conductive auxiliary 2 parts of polyvinyl alcohol, and 3 parts of carboxymethylcellulose were mixed to obtain a mixture, and the mixture was mined with 100 parts of water as a solvent, and stirred to obtain a paste-like product. The paste-like product was applied on a copper foil as a collector. Followed by drying, and dried at 150° C. under reduced pressure.

Thus, there was obtained an electrode structural body as an anode 601.

EXAMPLE 4

In this example, there was prepared a rechargeable lithium battery having such cross-sectional structure as shown in FIG. 6 by repeating the procedures of Example 1 except that the anode was prepared using a Sn—Ni amorphous alloy material (particulate) prepared as will be described below.

The rechargeable lithium battery obtained in this example was evaluated with respect to its battery characteristics in the same manner as in Example 1. The evaluated results are shown in Table 1.

Preparation of anode 601:

(1). Preparation of an alloy powder (particulate) as an electrode material:

5.3 parts of a pentahydrate of tin (IV) chloride as the metal compound capable oft being alloyed with lithium, 10.7 parts of a hexahydrate of nickel (II) chloride as the transition metal compound, 75.0 parts of a dihydrate of trisodium citrate, and 8.8 parts of ethylenediaminetetraacetic acid respectively as the completing agent were mixed with 100 parts of water as the solvent and sufficiently stirred to obtain a mixed solution. The mixed solution was introduced into the reaction vessel 201 (provided with the starting material introduction device 202, the reflux device 203, the gas introduction pipe 204, the agitator 205, and the temperature controlling equipment 206) shown in FIG. 2 through the starting material introduction device, and in order to maintain the inside of the reaction vessel in a nitrogen gas atmosphere, nitrogen gas was introduced into the reaction vessel through the gas introduction pipe, where excessive nitrogen gas was exhausted to the outside of the system through the reflux device. The reaction vessel having the mixed solution therein was heated to 36° C. by means of the temperature controlling equipment (water bath), and the mixed solution in the reaction vessel was sufficiently stirred by means of the agitator.

Here, a specimen of the mixed solution treated in the above was subjected to analysis by means of a visible-ultraviolet absorption spectrum analyzer. As a result, as well as in Example 1, it was found that a complex formed by the metal of the metal compound (capable of being alloyed with lithium) and the complexing agent and a complex formed by the transition metal of the transition metal compound and the complexing agent are contained in the mixed solution.

Then, a solution obtained by dissolving 23.1 parts of a titanium (III) chloride as the reducing agent in 73.3 parts of water was heated to 36° C. and added to the mixed solution in the reaction vessel through the starting material introduction device, followed by being sufficiently stirred. This adding and mixing step was performed within one minute. The pH value of the solution in the reaction vessel was measured. As a result, the solution was found to have a pH value of 0.1 Thereafter, a potassium hydroxide aqueous solution of SN was added to the solution in the reaction vessel through the starting material introduction device while stirring the solution, so that the pH value of the solution became to be 100, and the solution in the reaction vessel was subjected to a heat treatment at 36° C. for 15 minutes. The adding and mixing step of the potassium hydroxide aqueous solution here was performed within one minute.

Thereafter, the content in the reaction vessel was taken out from the vessel, and it was washed with water, and vacuum-dried at 50° C. Thus, there was obtained a product comprising a Sn—Ni alloy power.

A specimen of the resultant alloy powder was subjected to analysis by means of X-ray microanalysis (XMA). As a result, only Sn and Ni were detected without other elements being detected. Then, the specimen was subjected to analysis by means of inductively coupled plasma emission analysis (ICP). As a result, the content of Sn and that of Ni were found to be 75% and 25% respectively in terms of the atom number content.

Separately, using an X-ray diffraction device RINT 2000 (produced by Kabusiki Kaisha RIGAKU) a specimen of the resultant alloy powder was subjected to wide angle X-ray diffraction analysis using Kα-rays of Cu as a radiation source, which gave peaks having a widened half width appeared in a region of 2θ=25° to 50°. And there were observed two main peaks one at 2θ=30.6° and another at 2θ=43.7° in the X-ray diffraction chart, having a half width of 0.6° and that of 0.7°, respectively. The presence of these peaks having a wide half width indicates that the resultant alloy powder is amorphous. Separately, calculation was carried out on the basis of the half widths and the diffraction angles of these peaks and in accordance with the foregoing Scherrer's equation. As a result, there were obtained a crystallite size of 14 nm and another crystallite size of 13 nm.

In addition, a specimen of the resultant alloy powder was subjected to measurement of particle size distribution by means of a particle size distribution measuring equipment using a laser scattering method. As a result, it was found to have an average particle size of 0.24 μm and a particle size distribution of 0.05 to 0.8 μm.

Further, a specimen of the resultant alloy powder was examined by means of a scanning electron microscope. As a result, it was found that an average value of the [longest length of particle]/[shortest length of particle] is 1.2. From this result, the resultant alloy powder was found to comprise spherical particles.

Further in addition, a specimen of the resultant alloy powder was subjected to measurement of specific surface area by means of a BET method using nitrogen gas. As a result, it was found to have a specific surface area of 95 $m^2/g$.

(2). Preparation of an electrode structural body as an anode 601:

90 parts of the Sn—Ni alloy powder obtained in the above was introduced into a planetary ball mill, where it was ground for one hour. The resultant, 5 parts of an acetylene black powder as an electrically conductive auxiliary and 5 parts of a polyvinylidene fluoride powder were mixed to obtain a mixture, and the mixture was mixed with 100 parts of N-methyl-2-pyrrolidone as a solvent, and stirred to obtain a paste-like product. The paste-like product was applied on a copper foil as a collector, followed by drying, ad dried at 150° C. under reduced pressure.

Thus, there was obtained an electrode structural body as an anode 601.

EXAMPLE 5

In this example, there was prepared a rechargeable lithium battery having such cross-sectional structure as shown in FIG. 6 by repeating the procedures of Example 1 except that the anode was prepared using a Sn—Ni amorphous alloy material (particulate) prepared as will be described below.

The rechargeable lithium battery obtained in this example was evaluated with respect to its battery characteristics in the same manner as in Example 1. The evaluated results are shown in Table 1.

Preparation of anode 601:

(1). Preparation of a alloy powder (particulate) as an electrode material:

11.0 parts of a pentahydrate of tin (IV) chloride as the metal compound capable of being alloyed with lithium, 7.1 parts of a hexahydrate of nickel (II) chloride as the transition metal compound, 50.0 parts of a dihydrate of trisodium citrate, and 2.0 parts of a sodium hydrogenphosphate respectively as the complexing agent were mixed with 100 parts of water as the solvent and sufficiently stirred to obtain a mixed solution. The mixed solution was introduced into the reaction vessel 201 (provided with the starting material introduction device 222, the reflux device 203, the gas introduction pipe 204, the agitator 205, and the temperature controlling equipment 206) show FIG. 2 through the starting material introduction device, and in order to maintain the inside of the reaction vessel in a nitrogen gas atmosphere, nitrogen gas was introduced into the reaction vessel through the gas introduction pipe, where excessive nitrogen gas was exhausted to the outside of the system through the reflux device. The reaction vessel having the mixed solution therein was heated to 70° C. by means of the temperature controlling equipment (water bath), and the mixed solution in the reaction vessel was sufficiently stirred by means of the agitator.

Here, a specimen of the mixed solution treated in the above was subjected to analysis by means of a visible-ultraviolet absorption spectrum analyzers. As a result, as well as in Example 1, it was found that a complex formed by the metal of the metal compound (capable of being alloyed with lithium) and the complexing agent and a complex formed by the transition metal of the transition metal compound and the complexing agent are contained in the mixed solution.

Then, a solution obtained by dissolving 45.0 parts of a sodium sulfite as the reducing agent in 168.9 parts of water was heated to 70° C. and added to the mixed solution in the reaction vessel through the starting material introduction device while stirring the mixed solution in the reaction vessel. And the solution in the reaction vessel was subjected to a heat treatment at 70° C. for 30 minutes. This adding and mixing step was performed within one minute. The pH value of the solution in the reaction vessel was measured. As a result, the solution was found to have a pH value of 5.7.

Thereafter, the content in the reaction vessel was taken out from the vessel, and it was washed with water, and vacuum-dried at 50° C. Thus there was obtained a product comprising a Sn—Ni alloy power.

A specimen of the resultant alloy powder was subjected to analysis by means of X-ray microanalysis (XMA). As a result, only Sn, Ni and S were detected without other elements being detected. Then, the specimen was subjected to analysis by means of inductively coupled plasma emission analysis (ICP). As a result, the content of Su, that of Ni, and that of S were found to be 58%, 40%, and 2% respectively in terms of the atom number content.

Separately, using an X-ray diffraction device RINT 2000 (produced by Kabusiki Kaisha RIGAKU), a specimen of the resultant alloy powder was subjected to wide angle X-ray diffraction analysis using Kα-rays of Cu as a radiation source, which gave peaks having a widened half width appeared in a region of 2θ=25° to 50°. And there were observed two main peaks one at 2θ=30.4° and another at 2θ=43.6° in the X-ray diffraction chart, having a half width of 0.5° and that of 0.6°, respectively. The presence of these peaks having a wide half width indicates that the resultant alloy powder is amorphous. Separately, calculation was carried out on the basis of the half widths and the diffraction angles of these peaks and in accordance with the foregoing Scherrer's equation. As a result, there were obtained a crystallite size of 17 nm and another crystallite size of 15 nm.

In addition, a specimen of the resultant alloy powder was subjected to measurement of particle size distribution by means of a particle size distribution measuring equipment using a laser scattering method. As a result, it was found to hand an average particle size of 0.4 μm and a particle size distribution of 0.11 to 1.1 μm.

Further, a specimen of the resultant alloy powder was examined by means of a scanning electron microscope. As a result, it was found that an average value of the [longest length of particle]/[shortest length of particle] is 1.3. From this result, the resultant alloy powder was found to comprise spherical particles.

Further in addition, a specimen of the resultant alloy powder was subjected to measurement of specific surface area by mesas of a BET method using nitrogen gas. As a result, it was found to have a specific surface area of 32 m²/g.

(2). Preparation of an electrode structural body as an anode 601:

90 parts of the Sn—Ni alloy powder obtained in the above, 5 parts of an acetylene black powder as an electrically conductive auxiliary, 2 parts of polyvinyl alcohol and 5 parts of carboxymethylcellulose were mixed to obtain a mixture, and the mixture was mixed with 100 parts of water as a solvent, and stirred to obtain a paste-like product. The paste-like product was applied on a copper foil as a collector, followed by drying, and dried at 150° C. under reduced pressure.

Thus, there was obtained an electrode structural body as an anode 601.

EXAMPLE 6

In this example, there was prepared a rechargeable lithium battery having such cross-sectional structure as shown in FIG. 6 by repeating the procedures of Example 1 except that the anode was prepared using a Sn—Ni amorphous alloy material (particulate) prepared as will be described below.

The rechargeable lithium battery obtained in this example was evaluated with respect to its battery characteristics in the same manner as in Example 1. The evaluated results are shown in Table 1.

Preparation of anode 601:

(1). Preparation of an alloy powder (particulate) as an electrode material:

11.2 parts of a pentahydrate of tin (IV) chloride as the metal compound capable of being alloyed with lithium, 2.5 parts of a hexahydrate of nickel (II) chloride as the transition metal compound, 37.5 parts of a dihydrate of trisodium citrate, and 2 parts of a sodium lactate respectively as the complexing agent were mixed with a mixed solvent comprising 50 parts of water and 50 parts of ethanol as the solvent and sufficiently stirred to obtain a mixed solution. The mixed solution was introduced into the reaction vessel 201 (provided with the starting material introduction device 202, the reflux device 203, the gas introduction pipe 204, the agitator 205, and the temperature controlling equipment 206) shown in FIG. 2 through the starting material introduction device, and in order to maintain the inside of the reaction vessel in an inert gas atmosphere, argon gas was introduced into the reaction vessel through the gas introduction pipe, where excessive argon gas was exhausted to the outside of the system through the reflux device. The reaction vessel having the mixed solution therein was heated to 25° C. by means of the temperature controlling equipment (water bath), and the mixed solution in the reaction vessel was sufficiently stirred by means of the agitator.

Here, a specimen of the mixed solution treated in the above was subjected to analysis by means of a visible-ultraviolet absorption spectrum analyzer. As a result, as well as in Example 1, it was found that a complex formed by the metal of the metal compound (capable of being alloyed with lithium) and the complexing agent and a complex formed by the transition metal of the transition metal compound and the complexing agent are contained in the missed solution.

Then, in solution obtained by dissolving 46.3 parts of a titanium (III) chloride as the reducing agent in 103.7 parts of water was heated to 25° C. and added to the mixed solution in the reaction vessel through the starting material introduction device followed by being sufficiently starred. This adding and mixing step was performed within one minute. The pH value of the solution in the reaction vessel was measured. As a result, the solution was found to have a pH value of 0.03.

Thereafter, a potassium hydroxide aqueous solution of SN was added to the solution in the reaction vessel through the starting material introduction device while stirring the solution, so that the pH value of the solution became to be 7.0, and the solution in the reaction vessel was subjected to a heat treatment at 25° C. for 2 hours. The adding and naming step of the potassium hydroxide aqueous solution here was performed within one minute.

Thereafter, the content in the reaction vessel was taken out from the vessel, and it was washed with water, and vacuum-dried at 50° C. Thus, there was obtained a product comprising a Sn—Ni alloy power.

A specimen of the resultant alloy powder was subjected to analysis by means of X-ray microanalysis (XMA). As a result, Sn, Ni, Ti, and O were detected without other elements being detected. Then, the specimen was subjected to analysis by means of inductively coupled plasma emission anaslysis (ICP). As a result, the content of Sn, that of Ni, that of Ti, and that of O were found to be 68%, 18%, 15% and 9% respectively in terms of the atom number content.

Separately, using an X-ray diffraction device RINT 2000 (produced by Kabusiki Kaisha RIGAKU), a specimen of the resultant alloy powder was subjected to wide angle X-ray diffraction analysis using Kα-rays of Cu as a radiation source, which save peaks having a widened half width appeared in a region of 2θ=25° to 50°. And there were observed two main peaks one at 2θ=30.6° and another at 2θ=43.7° in the X-ray diffraction chart, having a half width of 0.4° and that of 0.5°, respectively. The presence of these pea having a wide half width indicates that the resultant alloy powder is amorphous. Separately, calculation was carried out on the basis of the half widths and the diffraction angles of these peaks and in accordance with the foregoing Scherrer's equation. As a result, there were obtained a crystallite size of 21 nm and another crystallite size of 18 nm.

In addition, a specimen of the resultant alloy powder was subjected to measurement of particle size distribution by means of a particle size distribution measuring equipment using a laser scattering method as a result, it was found to have an average particle size of 0.33 μm and a particle size distribution of 0.05 to 2.1 μm.

Further, a specimen of the resultant alloy powder was examined by means of a scanning electron microscope. As a result, it was found that an average value of the [longest length of particle]/[shortest length of particle] is 1.3. From this result, the resultant alloy powder was found to comprise spherical particles.

Further in addition, a specimen of the resultant alloy powder was subjected to measurement of specific surface area by means of a BET method using nitrogen gas. As a result, it was found to have a specific surface area of 31 m²/g.

(2). Preparation of an Electrode Structural Body as an Anode 601:

90 parts of the Sn—Ni alloy powder obtained in the above, 5 parts of a graphite powder as an electrically conductive auxiliary, 2 parts of polyvinyl alcohol, and 3 parts of carboxymethylcellulose were mixed to obtain a mixture, aid the mixture was mixed with 100 parts of water as a solvent, and stirred to obtain a paste-like products. The paste-like product was applied on a copper foil as a collector, followed by doing, and dried at 150° C. under reduced pressure.

Thus, there was obtained an electrode structural body as an anode 601.

EXAMPLE 7

In this example there was prepared a rechargeable lithium battery having such cross-sectional structure as shown in FIG. 6 by repeating the procedures of Example 1 except that the anode was prepared using a Sn—Ni amorphous alloy material (particulate) prepared as will be described below.

The rechargeable lithium battery obtained in this example was evaluated with respect to its battery characteristics in the same manner as in Example 1. The evaluated results are shown in Table 1.

Preparation of anode 601:

(1). Preparation of an alloy powder (particulate) as an electrode material:

3.6 parts of a tin (II) nitrate as the metal compound capable of being alloyed with lithium, 13.7 parts of a nickel (II) nitrate as the transition metal compound, and 26.5 parts of a dihydrate of trisodium citrate as the complexing agent were mixed with 100 parts of water as the solvent and sufficiently stirred to obtain a mixed solution. The mixed solution was introduced into the reaction vessel 201 (provided with the starting material introduction device 202, the reflux device 203, the gas production pipe 204, the agitator 205, and the temperature controlling equipment 206) shown in FIG. 2 through the starting material introduction device, and in order to maintain the inside of the reaction vessel in an inert gas atmosphere, argon gas was introduced into the reaction vessel through the gas introduction pipe, where excessive argon gas was exhausted to the outside of the system through the reflux device. The reaction vessel having the mixed solution therein was heated to 40° C. by means of the temperature controlling equipment (water bath), and the mixed solution in the reaction vessel was sufficiently stirred by means of the agitator.

Here, a specimen of the mixed solution treated in the above was subjected to analysis by means of a visible-ultraviolet absorption spectrum analyzer. As a result, as well as in Example 1, it was found that a complex formed by the metal of the metal compound (capable of being alloyed with lithium) and the completing agent and a complex farmed by the transition metal of the transition metal compound and the complexing agent are contained in the mixed solution.

Then, a solution obtained by dissolving 83.4 parts of a titanium (III) chloride as the reducing agent in 264 parts of water was heated to 25° C. and added to the mixed solution in the reaction vessel through the starting material introduction device followed by being sufficiently stirred. This adding and mixing step was performed within one minute. The pH value of the solution in the reaction vessel was measured. As a result, the solution was found to have a pH value of 0.02.

Thereafter, a potassium hydroxide aqueous solution of SN was added to the solution in the reaction vessel through the starting material introduction device while stirring the solution, so that the pH value of the solution became to be 7.0, and the solution in the reaction vessel was subjected to a heat treatment at 40° C. for 2 hours. The adding and mixing step of the potassium hydroxide aqueous solution here was performed within one minute.

Thereafter, the content in the reaction vessel was taken out from the vessel, and it was washed with water and vacuum-dried at 50° C. Thus, there was obtained a product comprising a Sn—Ni alloy power.

A specimen of the resultant alloy powder was subjected to analysis by means of X-ray microanalysis (XMA). As a result, Sn, Ni, Ti, and O were detected without other elements being detected. Then, the specimen was subjected to analysis by means of inductively coupled plasma emission analysis (ICP). As a result, the content of Sn, that of Ni, that of Ti, and that of O were found to be 47%, 30%, 23% and 10% respectively in terms of the atom number content.

Separately, using an X-ray diffraction device RINT 2000 (produced by Kabusiki Kaisha RIGAKU), a specimen of the resultant alloy powder was subjected to wide angle X-ray diffraction analysis using Kα-rays of Cu as a radiation source which gave peaks having a widened half width appeared in a region of 2θ=25° to 50°. And there were observed two main peaks one at 2θ=30.6° and another at 2θ=43.7° in the X-ray diffraction chart, having a half width of 0.2° and that of 0.3°, respectively. The presence of these peaks having a wide half width indicates that the resultant alloy powder is amorphous. Separately, calculation was carried out on the basis of the half widths and the diffraction angles of these peaks and in accordance with the foregoing Scherrer's equation. As a result, there were obtained a crystallite size of 43 nm and another crystallite size of 30 nm.

In addition, a specimen of the resultant alloy powder was subjected to measurement of particle size distribution by means of a particle size distribution measuring equipment using a laser scattering method. As a result, it was found to have an average particle size of 1.12 μm and a particle size distribution of 0.20 to 19.0 μm.

Further, a specimen of the resultant alloy powder was examined by means of a scanning electron microscope. As a result, it was found that an average value of the [longest length of particle]/[shortest length of particle] is 1.8. From this result, the resultant alloy powder was found to comprise spherical particles.

Further in addition, a specimen of the resultant alloy powder was subjected to measurement of specific surface area by means of a BET method using nitrogen gas. As a result, it was found to have a specific surface area of 11 $m^2/g$.

(2). Preparation of an Electrode Structural Body as an Anode 601:

90 parts of the Sn—Ni alloy powder obtained in the above, 5 parts of a graphite powder as an electrically conductive auxiliary, 2 parts of polyvinyl alcohol, and 3 parts of carboxymethylcellulose were mixed to obtain a mixture and the mixture was mixed with 100 parts of water as a solvent, and stirred to obtain a paste-like product. The paste-like product was applied on a copper foil as a collector, followed by drying, and dried at 150° C. under reduced pressure.

Thus, there was obtained an electrode structural body as an anode 601.

EXAMPLE 8

In this examples, there was prepared a rechargeable lithium battery having such cross-sectional structure as shown in FIG. 6 by repeating the procedures of Example 1 except that the anode was prepared using a Sn—Ni—Co amorphous alloy material (particulate) prepared as will be described below.

The rechargeable lithium battery obtained in this example was evaluated with respect to its battery characteristics in the same manner as in Example 1. The evaluated results are shown in Table 1.

Preparation of anode 601:

(1). Preparation of an Alloy Powder (Particulate) as an Electrode Material:

11 parts of a pentahydrate of tin (IV) chloride as the metal compound capable of being alloyed with lithium, 3.6 parts of a hexahydrate of nickel (II) chloride and 3.5 parts of a pentahydrate of cobalt (II) chloride respectively as the transition metal compound, 75.0 parts of a dihydrate of trisodium citrate, 8.8 parts of ethylenediaminetetraacetic acid and 8.8 parts of potassium acetate respectively as the completing agent were mixed with 100 parts of water as the solvent and sufficiently stirred to obtain a mated solution. The mixed solution was introduced into the reaction vessel 201 (provided with the starting material introduction device 202, the reflux device 203, the gas introduction pipe 204 the agitator 205, and the temperature controlling equipment 206) shown in FIG. 2 through the starting material introduction device, and in order to maintain the inside of the reaction vessel in an inert gas atmosphere, argon gas was introduced into the reaction vessel through the gas introduction pipe, where excessive argon gas was exhausted to the outside of the system through the reflux device. The reaction vessel having the mixed solution therein was heated to 70° C. by means of the temperature controlling equipment (water bath), and the mixed solution in the reaction vessel was sufficiently stirred by means of the agitator.

Here, a specimen of the mixed solution treated in the above was subjected to analysis by means of a visible-ultraviolet absorption spectrum analyzer. As a result, as well as in Example 1, it was found that a complex formed by the metal of the metal compound (capable of being alloyed with lithium) and the complexing agent and a complex formed by the transition metal of the transition metal compound and the complexing agent are contained in the mixed solution.

Then, a solution obtained by dissolving 27.8 parts of a titanium (III) chloride as the reducing agent in 87.9 parts of water heated to 70° C. and added to the mixed solution in the reaction vessel through the starting material introduction device, followed by being sufficiently stirred. This adding and mixing step was performed within one minute. The pH value of the solution in the reaction vessel was measured as a result the solution was found to have a pH value of 0.05.

Thereafter, a potassium hydroxide aqueous solution of SN was added to the solution in the reaction vessel through the starting material introduction device while stirring the solution, so that the pH value of the solution became to be 7.0, and the solution in the reaction vessel was subjected to a heat treatment at 90° C. for 2 hours. The adding and mixing step of the potassium hydroxide aqueous solution here was performed within one minute.

Thereafter, the content in the reaction vessel was taken out from the vessel, and it was washed with water, and vacuum-dried at 50° C. Thus, there was obtained a product comprising a Sn—Ni—Co alloy power.

A specimen of the resultant alloy powder was subjected to analysis by means of X-ray microanalysis (XMA). As a result, Sn, Ni, and Co were detected without other elements being detected. Then, the specimen was subjected to analysis by means of inductively coupled plasma emission analysis (ICP). As a result, the content of Sn, that of Ni, and that of Co were found to be 61%, 14%, and 25% respectively in terms of the atom number content.

Separately, using an X-ray diffraction device RINT 2000 (produced by Kabusiki Kaisha RIGAKU), a specimen of the resultant alloy powder was subjected to wide angle X-ray diffraction analysis using Kα-rays of Cu as a radiation source, which gave peaks having a widened half width appeared in a region of 2θ=25° to 50°. And there were observed two main peaks one at 2θ=30.6° and another at 2θ=43.5° in the X-ray diffraction chart, having a half width of 0.8° and that of 1.0°, respectively. The presence of these peaks having a wide half width indicates that the resultant alloy powder is amorphous. Separately, calculation was carried out on the basis of the half widths and the diffraction angles of these peaks and in accordance with the foregoing Scherrer's equation. As a result, there were obtained a crystallite size of 11 nm and another crystallite size of 9 nm.

In addition, a specimen of the resultant alloy powder was subjected to measurement of particle size distribution by means of a particle size distribution measuring equipment using a laser scattering method. As a result, it was found to have an average particle size of 0.35 μm and a particle size distribution of 0.08 to 0.9 μm.

Further, a specimen of the resultant alloy powder was examined by means of a scanning electron microscope. As a result, it was found that an average value of the [longest length of particle]/[shortest length of particle] is 1.3. From this result, the resultant alloy powder was found to comprise spherical particles.

Further in addition, a specimen of the resultant alloy powder was subjected to measurement of specific surface area by means of a BET method using nitrogen gas. As a result, it was found to have a specific surface area of 77 m²/g.

(2). Preparation of an Electrode Structural Body as an Anode 601:

90 parts of the Sn—Ni—Co alloy powder obtained in the above 5 parts of a graphite powder as an electrically conductive auxiliary, 2 parts of polyvinyl alcohol, and 3 parts of carboxymethylcellulose were mixed to obtain a mixture, and the mixture was mixed with 100 parts of water as a solvent, and stirred to obtain a paste-like product. The paste-like product was applied on a copper foil as a collector, followed by drying, and dried at 150° C. under reduced pressure.

Thus, there was obtained an electrode structural body as an anode 601.

EXAMPLE 9

In this example, there was prepared a rechargeable lithium battery having such cross-sectional structure as shown in FIG. 6 by repeating the procedures of Example 1 except that the anode was prepared using a Sn-In-Ni amorphous alloy material (particulate) prepared as will be described below.

The rechargeable lithium battery obtained in this example was evaluated with respect to its battery characteristics in the same manner as in Example 1. The evaluated results are shown in Table 1.

Preparation of Anode 601:

(1). Preparation of an Alloy Powder (Particulate) as an Electrode Material:

5.3 parts of a pentahydrate of tin (IV) chloride and 4.5 parts of an indium (III) chloride respectively as the metal compound capable of being alloyed with lithium, 10.7 parts of a hexahydrate of nickel (II) chloride as the transmission metal compound, 75.0 parts of a dihydrate of trisodium citrate, 8.8 parts of ethylenediaminetetraacetic acid and 8.8 parts of potassium acetate respectively as the complexing agent were mixed with 100 parts of water as the solvent and sufficiently stirred to obtain a mixed solution. The mixed solution was introduced into the reaction vessel 201 (provided with the starting material introduction device 202, the reflux device 203, the gas introduction pipe 204 the agitator 205, and the temperature controlling equipment 206) shown in FIG. 2 through the starting material introduction device, and in order to maintain the inside of the reaction vessel in an inert gas atmosphere, argon gas was introduced into the reaction vessel through the gas introduction pipe, where excessive argon gas was exhausted to the outside of the system through the reflux device. The reaction vessel having the mixed solution therein was heated to 70° C. by means of the temperature controlling equipment (water bath), and the mixed solution in the reaction vessel was sufficiently stirred by means of the agitator.

Here, a specimen of the mixed solution treated in the above was subjected to analysis by means of a visible-ultraviolet absorption spectrum analyzer. As a result, as well as in Example 1, it was found that a complex formed by the metal of the metal compound (capable of being alloyed with lithium) and the complexing agent and a complex formed by the transition metal of the transition metal compound and the complexing agent are contained in the mixed solution.

Then, a solution obtained by dissolving 33.0 parts of a titanium (III) chloride as the reducing agent in 104.7 parts of water was heated to 70° C. and added to the mixed solution in the reaction vessel through the starting material introduction device, followed by being sufficiently stirred. This adding and mixing step was performed within one minute. The pH value of the solution in the reaction vessel was measured. As a result, the solution was found to have a pH value of 0.05.

Thereafter, a potassium hydroxide aqueous solution of SN was added to the solution in the reaction vessel through the starting material introduction device while stirring the solution, so that the pH value of the solution became to be 7.0, and the solution in the reaction vessel was subjected to a heat treatment at 70° C. for one hour. The adding and mixing step of the potassium hydroxide aqueous solution here was performed within one minute.

Thereafter, the content in the reaction vessel was taken out from the vessel, and it was washed with water, and vacuum-dried at 50° C. Thus, there was obtained a product comprising a Sn—In—Ni alloy power.

A specimen of the resultant alloy powder was subjected to analysis by means of X-ray microanalysis (XMA). As a result, Sn, In and Ni were detected without other elements being detected. Then, the specimen was subjected to analysis by means of inductively coupled plasma emission analysis (ICP). As a result, the content of Sn, that of In, and that of Ni were found to be 65%, 10%, and 25% respectively in terms of the atom number content.

Separately, using an X-ray diffraction device RINT 2000 (produced by Kabusiki Kaisha RIGAKU), a specimen of the resultant alloy powder was subjected to wide angle X-ray diffraction analysis using K$\alpha$-rays of Cu as a radiation source, which gave peaks having a widened half width appeared in a region of $2\theta=25°$ to $50°$. And there were observed two main peaks one at $2\theta=30.7°$ and another at $2\theta=43.7°$ in the X-ray diffraction chart, having a half width of $0.8°$ and that of $0.8°$, respectively. The presence of these peaks having a wide hale width indicates that the resultant alloy powder is amorphous. Separately, calculation was carried out on the basis of the half widths and the diffraction angles of these peaks and in accordance with the foregoing Scherrer's equation as a result, there were obtained a crystallite size of 11 nm and another crystallite size of 11 nm.

In addition, a specimen of the resultant alloy powder was subjected to measurement of particle size distribution by means of a particle size distribution measuring equipment using a laser scattering method. As a result, it was found to have an average particle size of 0.31 $\mu$m and a particle size distribution of 0.08 to 1.0 $\mu$m.

Further, a specimen of the resultant alloy powder was examined by means of a scanning electron microscope. As a result, it was found that an average value of the [longest length of particle]/[shortest length of particle] is 1.4. From this result the resultant alloy powder was found to comprise spherical particles.

Further in addition, a specimen of the resultant alloy powder was subjected to measurement of specific surface area by means of a BET method using nitrogen gas. As a result, it was found to have a specific surface area of 62 $m^2/g$.

(2). Preparation of an Electrode Structural Body as an Anode 601:

90 parts of the Sn—In—Ni alloy powder obtained in the above, 5 parts of a graphite powder as an electrically conductive auxiliary, 2 parts of polyvinyl alcohol, and 3 parts of carboxymethylcellulose were mixed to obtain a mixture, and the mixture was mixed with 100 parts of water as a solvent, and stirred to obtain a paste-like product. The paste-like product was applied on a copper foil as a collector, followed by drying, and dried at 150° C. under reduced pressure.

Thus, there was obtained an electrode structural body as an anode 601.

EXAMPLE 10

In this example, there was prepared a rechargeable lithium battery having such cross-sectional structure as shown in FIG. 6 by repeating the procedures of Example 1 except that the anode was prepared using a Zn—Ni amorphous alloy material (particulate) prepared as will be described below.

The rechargeable lithium battery obtained in this example was evaluated with respect to its battery characteristics in the some manner as in Example 1. The evaluated results are shown in Table 1.

Preparation of anode 601:

(1). Preparation of an alloy powder (particulate) as an electrode material:

6.1 parts of a zinc (II) chloride as the metal compound capable of being alloyed with lithium, 10.7 parts of a hexahydrate of nickel (II) chloride as the transition metal compound, 40.1 parts of a dihydrate of trisodium citrate and 4.2 parts of a disodium ethylenediaminetetraacete respectively as the complexing agent were mused with 100 parts of water as the solvent and sufficiently stirred to obtain a mixed solution. The mixed solution was introduced into the reaction vessel 201 (provided with the starting material introduction device 202, the reflux device 203, the gas introduction pipe 204, the agitator 205, and the temperature controlling equipment 206) shown in FIG. 2 through the starting material introduction device, and in order to maintain the inside of the reaction vessel in an inert gas atmosphere, argon gas was introduced into the reaction vessel through the gas introduction pipe, where excessive argon gas was exhausted to the outside of the system through the reflux device. The reaction vessel heaving the mixed solution therein was heated to 70° C. by means of the temperature controlling equipment (water bath), and the mixed solution in the reaction vessel was sufficiently stirred by means of the agitator.

Here, a specimen of the mixed solution treated in the above was subjected to analysis by means of a visible-ultraviolet absorption spectrum analyzer. As a result, as well as in Example 1, it was found that a complex formed by the metal of the metal compound (capable of being alloyed with lithium) and the complexing agent and a complex formed by the transition metal of the transition metal compound and the complexing agent are contained in the mixed solution.

Then, a solution obtained by dissolving 25.0 parts of a sodium, hypophosphite as the reducing agent in 75 parts of water was heated to 70° C. and added to the mixed solution in the reaction vessel through the starting material introduction device, followed by being sufficiently stirred for one hour while maintaining the temperature of the solution at 70° C. This adding and mixing step was performed within one minute. The pH value of the content in the reaction vessel was measured. As a result, it was found to have a pH value of 6.5.

Thereafter, the content in the reaction vessel was taken out from the vessel, and it was washed with water, and vacuum-dried at 50° C. Thus, there was obtained a product comprising a Zn—Ni alloy power.

A specimen of the resultant alloy powder was subjected to analysis by means of X-ray microanalysis (XMA). As a result, Zn, Ni and P were detected without other elements being detected. Then, the specimen was subjected to analysis by means of inductively coupled plasma emission analysis (ICP). As a result, the content of Zn, that of Ni, and that of P were found to be 73%, 23%, and 4%; respectively in terms of the atom number content.

Separately, using an X-ray diffraction device RINT 2000 (produced by Kabusiki Kaisha RIGAKU), a specimen of the resultant alloy powder was subjected to wide angle X-ray diffraction analysis using K$\alpha$-rays of Cu as a radiation source. As a result, there was observed a main peak at 2$\theta$=43.2° in the X-ray diffraction chart, having a half width of 0.5°. The presence of this peak having such wide half width indicates that the resultant alloy powder is amorphous separately, calculation was carried out on the basis of the half width and the diffraction angle of the peak and in accordance with the foregoing Scherrer's equation. As a result, there were obtained a crystallite size of 18 nm.

In addition, a specimen of the resultant alloy powder was subjected to measurement of particle size distribution by means of a particle size distribution measuring equipment using a laser scattering method. As a result, it was found to have an average particle size of 0.9 $\mu$m and a particle size distribution of 0.20 to 16.5 nm.

Further, a specimen of the resultant alloy powder was examined by means of a scanning electron microscope. As a result, it was found that an average value of the [longest length of particle]/[shortest length of particle] is 1.7. From this result, the resultant alloy powder was found to comprise spherical particles.

Further in addition, a specimen of the resultant alloy powder was subjected to measurement of specific surface area by means of a BET method using nitrogen gas. As a result, it was found to have a specific surface area of 17 m$^2$/g.

(2). Preparation of an Electrode Structural Body as an Anode 601:

90 parts of the Zn—Ni alloy powder obtained in the above, 5 parts of an acetylene black powder as an electrically conductive auxiliary, and 5 parts of a polyvinylidene fluoride powder were mixed to obtain a mixture, and the mixture was mixed with 100 parts of N-methyl-2-pyrrolidone as a solvent, and stirred to obtain a paste-like product. The paste-like product was applied on a copper foil as a collector, followed by drying, and dried at 150° C. under reduced pressure thus, there was obtained an electrode structural body as an anode 601.

EXAMPLE 11

In this example, there was prepared a rechargeable lithium battery having such cross-sectional structure as shown in FIG. 6 by repeating the procedures of Example 1 except that the anode was prepared using an In—Ni amorphous alloy material (particulate) prepared as will be described below.

The rechargeable lithium battery obtained in this example was evaluated with respect to its batter characteristics in the same manner as in Example 1. The evaluated results are shown in Table 1.

Preparation of Anode 601:

(1). Preparation of an Alloy Powder (Particulate) as an Electrode Material:

4.5 parts of an indium (III) chloride as the metal compound capable of being alloyed with lithium, 10.7 parts of a hexahydrate of nickel (II) chloride as the transition metal compound, 40.0 parts of a dihydrate of trisodium citrate and 4.2 parts of a disodium ethylenediaminetetraacete respectively as the complexing agent were mixed with 100 parts of water as the solvent and sufficiently stirred to obtain a mixed solution. The mixed solution was introduced into the reaction vessel 201 (provided with the starting material introduction device 202, the reflux device 203, the gas introduction pipe 204, the agitator 205, and the temperature controlling equipment 206) shown in FIG. 2 through the starting material introduction device, and in order to maintain the inside of the reaction vessel in an inert gas atmosphere, argon gas was introduced into the reaction vessel through the gas introduction pipe, where excessive argon gas was exhausted to the outside of the system through the reflux device. The reaction vessel having the mixed solution therein was heated to 70° C. by means of the temperature controlling equipment (water bath), and the mixed solution in the reaction vessel was sufficiently stirred by means of the agitator.

Here, a specimen of the mixed solution treated in the above was subjected to analysis by means of a visible-ultraviolet absorption spectrum analyzer. As a result, as well as in Example 1, it was found that a complex formed by the metal of the metal compound (capable off being alloyed with lithium) and the complexing agent and a complex formed by the transition metal of the transition metal compound and the complexing agent are contained in the mixed solution.

Then, a solution obtained by dissolving 7.5 parts of a sodium thiosulfate as the reducing agent in 25 parts of water was heated to 70° C. and added to the mixed solution in the reaction vessel through the starting material introduction device, followed by being sufficiently stirred for one hour while maintaining the temperature of the solution at 70° C. This adding and mixing step was performed within one minute. The pH value of the content in the reaction vessel was measured. As a result. It was found to have a pH value of 6.5.

Thereafter the content in the reaction vessel was taken put from the vessel, and it was wasted with water, and vacuum-dried at 50° C. Thus, there was obtained a product comprising an In—Ni alloy power.

A specimen of the resultant alloy powder was subjected to analysis by means of X-ray microanalysis (XMA). As a result, In, Ni and S were detected without other elements being detected. Then, the specimen was subjected to analysis by means of inductively coupled plasma emission analysis (ICP). As a result, the content of In, that of Ni, and that of S were found to be 45%, 44%, and 8% respectively in terms of the atom number content.

Separately, using an X-ray diffraction device RINT 2000 (produced by Kabusiki Kaisha RIGAKU), a specimen of the resultant alloy powder was subjected to wide angle X-ray diffraction analysis using. K$\alpha$-rays of Cu as a radiation source. As a result, there were observed two main peaks one at 2$\theta$=32.8° and the other at 2$\theta$=43.5° and in the X-ray diffraction chart, respectively having a half width of 0.5° and a half width of 0.6°. The presence of these peaks having such wide half width indicates that the resultant alloy powder is amorphous. Separately, calculation was carried out on the basis of the half width and the diffraction angle of the peak and in accordance with the foregoing Scherrer's equation. As a result, there were obtained a crystallite size of 17 nm and another crystallite size of 15 nm.

In addition, a specimen of the resultant alloy powder was subjected to measurement of particle size distribution by means of a particle size distribution measuring equipment using a laser scattering method. As a result, it was found to have an average particle size of 0.8 $\mu$m and a particle size distribution of 0.18 to 14.2 $\mu$m.

Further, a specimen of tae resultant alloy powder was examined by means of a scanning electron microscope. As a result, it was found that an average value of the [longest length of particle]/[shortest length of particle] is 1.5. From this result, the resultant alloy powder was found to comprise spherical particles.

Further in addition, a specimen of the resultant alloy powder was subjected to measurement of specific surface area by means of a BET method using nitrogen gas. As a result, it was found to hare a specific surface area of 26 m$^2$/g.

(2). Preparation of an Electrode Structural Body as an Anode 601:

90 parts of the In—Ni alloy powder obtained in the above, 5 parts of an acetylene black powder as an electrically conductive auxiliary, and 5 parts of a polyvinylidene fluoride powder were mixed to obtain a mixture, and the mixture was mixed with 100 parts of N-methyl-2-pyrrolidone as a solvent, and stirred to obtain a paste-like product. The paste-like product was applied on a copper foil as a collector, followed by drying, and dried at 150° C. under reduced pressure.

Thus, there was obtained an electrode structural body as an anode 601.

EXAMPLE 12

In this example, there was prepared a rechargeable lithium battery having such cross-sectional structure as shown in FIG. 6 by repeating the procedures of Example 1 except that the anode was prepared using a Sn—Ni amorphous alloy material (particulate) prepared using the fabrication apparatus shown FIG. 3 as will be described below. As previously described, the fabrication apparatus shown in FIG. 3 comprises the starting material addition vessel 302, the reducing agent addition vessel 303, the mixing vessel 304, the addition vessel 308, the reaction vessel 301, and the product recovery vessel 309.

The rechargeable lithium battery obtained in this example was evaluated with respect to its battery characteristics in the same manner as in Example 1. The evaluated results are shown in Table 1.

Preparation of anode 601:

(1). Preparation of an Alloy Powder (Particulate) a an Electrode Material:

53 parts of a pentahydrate of tin (IV) chloride as the metal compound capable of being alloyed with lithium, 107 parts of a hexahydrate of nickel (II) chloride as the transition metal compound, 750 parts of a dehydrate of trisodium citrate, 88 parts of ethylenediaminetetraacetic acid and 88 parts of a potassium acetate respectively as the complexing agent were mixed with 914 parts of water as the solvent and sufficiently stirred to obtain a mixed solution. The mixed solution was introduced into the starting material addition vessel 302 (charged with nitrogen gas) of the fabrication apparatus shown in FIG. 3, where the mixed solution was well stirred by means of the agitator and it was heated to and maintained at 70° C. by means of the temperature controlling equipment.

Here, a specimen of the mimed solution treated in the above was subjected to analysis by means of a visible-ultraviolet absorption spectrum analyzer. As a result, as well as in Example 1, it was found that a complex formed by the metal of the metal compound (capable of being alloyed with lithium) and the complexing agent and a complex formed by the transition metal of the transition metal compound and the complexing agent are contained in n the mixed solution.

Separately, a mixture comprising 231 parts of a titanium (III) chloride as the reducing agent and 769 parts of water was introduced into the reducing agent addition vessel 303 charged pith nitrogen gas, where the mixture was well stirred by means of the agitator and heated to and maintained at 70° C. by means of the temperature controlling equipment.

Further, a potassium hydroxide aqueous solution of SN was introduced into the addition vessel 308, where it was heated to and maintained at 70° C. by means of the temperature controlling equipment.

Then, the flow rate regulating valve of each of the starting material addition vessel 302, the reducing agent addition vessel 303, the mixing vessel 304, the reaction vessel 301, and the addition vessel 308 was opened while regulating the opening of the valve.

That is, the flow rate regulating valve of the starting material addition vessel 302 was opened to flow the mixed solution in the starting material addition vessel into the vessel 304 at a prescribed flow rate by regulating the opening of the flow rate regulating valve and the flow rate regulating valve of the reducing agent addition vessel 303 was opened to flow the reducing agent solution in the reducing agent addition vessel into the existing vessel 304 at a prescribed flow rate by regulating the opening of the flow rate regulating valve, where a mixture comprising the mixed solution and the reducing agent solution introduced into the mixing vessel was well stirred by stirring by means of the agitator while adjusting the temperature of the mixture to 70° C. by means of the temperature controlling equipment.

The flow rate regulating valve of the mixing vessel 304 was opened to flow the solution obtained in the mixing vessel into the reaction vessel 301 at a prescribed flow rate by regulating the opening of the flow rate regulating valve and the flow rate regulating valve of the addition vessel 308 was opened to flow the potassium hydroxide aqueous solution in the addition vessel into the reaction vessel 301 at a prescribed flow rate by regulating the opening of the flow rate regulating valve, where the solution introduced into the reaction vessel and which was added with the potassium hydroxide aqueous solution was stirred by mean of the agitator while adjusting the temperature of the solution to 70° C. by means of the temperature controlling equipment.

The flow rate regulating valve of the reaction vessel 301 was opened to flow a product obtained in the reaction vessel into the product recovery vessel at a prescribed flow rate by regulating the opening of the flow rate regulating valve, where the temperature of the product recovery vessel was adjusted to 70° C. by means of the temperature controlling equipment.

In the above, the flow rate of the flow rate regulating valve of the starting material addition vessel 302, that of the reducing agent addition vessel 303, that of the addition vessel 308, that of the mixing vessel 304, and that of the reaction vessel 301 were adjusted so that they became 2:1:1.5:3:4.5 and that the solution stayed in the reaction vessel for 5 minutes; that is, the solution took 5 minutes to pass through the reaction vessel.

In the above, the pH value of the solution in the mixing vessel 304 was examined, and as a result, the solution was found to have a pH value of 0.1. Similarly, the pH value of the solution in the reaction vessel 301, as a result, the solution was found to have a pH value of 7.4.

Thereafter, the product in the product recovery vessel 309 was taken out, and it was washed with water, and vacuum-dried at 50° C. Thus, there was obtained a Sn—Ni alloy power.

A specimen of the resultant alloy powder was subjected to analysis by mean of X-ray microanalysis (XMA). As a result, only Sn and Ni were detected without other elements being detected. Then, the specimen was subjected to analysis by means of inductively coupled plasma emission analysis (ICP). As a result, the content of Sn and that of Ni were found to be 63% and 37% respectively in terms of the atom number content.

Separately, using an X-ray diffraction device RINT 2000 (produced by Kabusiki Kaisha RIGAKU), a specimen of the resultant alloy powder was subjected to wide angle X-ray diffraction analysis using K$\alpha$-rays of Cu as a radiation source, which gave peaks having a widened half width appeared in a region of $2\theta=25°$ to $50°$. And there were observed two main peaks one at $2\theta=30.9°$ and another at $2\theta=43.8°$ in the X-ray diffraction chart, having a half width of 0.7° and that of 0.7°, respectively. The presence of these peaks having a wide half width indicates that the resultant alloy powder is amorphous. Separately, calculation was carried out on the basis of the half widths and the diffraction angles of these peaks and in accordance with the foregoing Scherrer's equation. As a result, there were obtained a crystallite size of 12 nm and another crystallite size of 13 nm.

In addition, a specimen of the resultant alloy powder was subjected to measurement of particle size distribution by means of a particle size distribution measuring equipment using a laser scattering method. As a result, it was found to have an average particle size of 0.24 $\mu$m and a particle size distribution of 0.05 to 0.75 $\mu$m.

Further, a specimen of the resultant alloy powder was examined by means of a scanning electron microscope. As a result, it was found that an average value of the [longest length of particle]/[shortest length of particle] is 1.2. From this result, the resultant alloy powder was found to comprise spherical particles.

Further in addition, a specimen of the resultant alloy powder was subjected to measurement of specific surface area by means of a BET method using nitrogen gas. As a result, it was found to have a specific surface area of 78 $m^2/g$.

(2). Preparation of an Electrode Structural Body as an Anode 601:

90 parts of the Sn—Ni alloy powder obtained in the above, 5 parts of a graphite powder as an electrically conductive auxiliary, 2 parts of polyvinyl alcohol, and 3 parts of carboxymethylcellulose were mixed to obtain a mixture, and the mixture was mixed with 100 parts of water as a solvent, and stirred to obtain a paste-like product. The paste-like product was applied on a copper foil as a collector, followed by drying, ant dried at 150 under reduced pressure.

Thus, there was obtained an electrode structural body as an anode 601.

COMPARATIVE EXAMPLE 1

In this comparative example, there was prepared a rechargeable lithium battery having such cross-sectional structure as shown in FIG. 6 by repeating the procedures of Example 1 except that the anode was prepared using a Sn-powder prepared as will be described below.

The rechargeable lithium battery obtained in this comparative example was evaluated with respect to its battery characteristics in the same manner as in Example 1. The evaluated results are shown in Table 1.

Preparation of Anode 601:

(1). Preparation of a Sn-Powder an Electrode Material:

21.0 parts of a pentahydrate of tin (IV) chloride, 75.0 parts of a dihydrate of trisodium citrate, 8.8 parts of ethylenediaminetetraacetic acid, and 8.8 parts of a potassium acetate were mixed with 100 parts of water and sufficiently stirred to obtain a mixed solution. The mixed solution was introduced into the reaction vessel 201 (provided with the starting material introduction device 202, the reflux device 203, the gas introduction pipe 204, the agitator 205, an the temperature controlling equipment 206) shown in FIG. 2 through the starting material introduction device, and in order to maintain the inside of the reaction vessel in a nitrogen gas atmosphere, nitrogen gas was introduced into the reaction vessel through the gas introduction pipe where excessive nitrogen gas was exhausted to the outside of the system through the reflux device. The reaction vessel having the mixed solution therein was heated to 70° C. by means of the temperature controlling equipment (water bath), and the mixed solution in the reaction vessel was sufficiently stirred by means of the agitator.

Then, a solution obtained by dissolving 23.1 parts of a titanium (III) chloride in 73.3 parts of water was heated to 70° C. and added to the mixed solution in the reaction vessel through the starting material introduction device, followed by being sufficiently stirred. This adding and mixing step was performed within one minute. The pH value of the content in the reaction vessel was measured. As a result, it was found to have a pH value of 0.1.

Thereafter, a potassium hydroxide aqueous solution of SN was added to the content in the reaction vessel through the starting material introduction device while stirring the solution, so that the pH value of the content became to be 7.0, and the content in the reaction vessel was subjected to a heat treatment at 70° C. for 30 minutes. The adding and mixing step of the potassium hydroxide aqueous solution here was performed within one minute.

Thereafter, the content in the reaction vessel was taken out from the vessel, and it was washed with water, and vacuum-dried at 50° C. Thus, there was obtained a Sn-power.

A specimen of the result powder was subjected to analysis by means of X-ray microanalysis (XMA). As a result, only Sn was detected without other elements being detected. Separately, using an X-ray diffraction device RINT 2000 (produced by Kabusiki Kaisha RIGAKU), a specimen of the resultant powder was subjected to wide angle X-ray diffraction analysis using Kα-rays of Cu as a radiation source, and calculation was carried out on the basis of the half width and the diffraction angle in the X-ray diffraction analysis and in accordance with the foregoing Scherrer's equation. As a result, there was obtained a crystallite size of 52 nm.

(2). Preparation of an electrode structural body as an anode 601:

90 parts of the Sn-powder obtained in the above, 5 parts of an acetylene black powder as an electrically conductive auxiliary, 2 parts of polyvinyl alcohol, and 3 parts of carboxymethylcellulose were mixed to obtain a mixture, and the mixture was mixed with 100 parts of water as a solvent, and stirred to obtain a paste-like product. The paste-like product was applied on a copper foil as a collector, followed by drying, and dried at 150° C. under reduced pressure.

Thus, there was obtained an electrode structural body as an anode 601.

COMPARATIVE EXAMPLE 2

In this comparative example, there was prepared a rechargeable lithium battery having such cross-sectional structure as shown in FIG. 6 by repeating the procedures of Example 1 except that the anode was prepared using a Sn—Ni amorphous alloy material (particulate) prepared as will be described below.

The rechargeable lithium battery obtained in this comparative example was evaluated with respect to its battery characteristics in the same manner as in Example 1 The evaluated results are shown in Table 1.

Preparation of anode 601:

(1). Preparation of an alloy powder as an electrode material:

5.3 parts of a pentahydrate of tin (IV) chloride and 10.7 parts of a hexahydrate of nickel (II) chloride were mixed with 100 parts of water and sufficiently stirred to obtain a mixed solution. The mixed solution was introduced into the reaction vessel 201 (provided with the starting material introduction device 202, the reflux device 203, the gas introduction pipe 204, the agitator 205, and the temperature controlling equipment 206) shown in FIG. 2 through the starting material introduction device, and in order to maintain the inside of the reaction vessel in a nitrogen gas atmosphere, nitrogen gas was introduced into the reaction vessel through the gas introduction pipe, where excessive argon gas was exhausted to the outside of the system through the reflux device. The reaction vessel having the mixed solution therein was heated to 70° C. by means of the temperature controlling equipment (water bath), and the mixed solution in the reaction vessel was sufficiently stirred by means of the agitators.

Then, a solution obtained by dissolving 23.1 parts of a titanium (III) chloride in 73.3 parts of water was heated to 70° C. and added to the mixed solution in the reaction vessel through the starting material introduction device, followed by being sufficiently stirred. This adding and mixing step was performed within one minute. The pH value of the solution in the reaction vessel was measured. As a result, It was found to have a pH value of 0.1.

Thereafter, a potassium hydroxide aqueous solution of SN was added to the solution in the reaction vessel through the starting material introduction device while starring the solution, so that the pH value of the solution became to be 5.0, and the solution in the reaction vessel was subjected to a heat treatment at 70° C. for 30 minutes. The adding and mixing step of the potassium hydroxide aqueous solution here was performed within one minute.

Thereafter, the content in the reaction vessel was taken out, and it was washed with water, and vacuum-dried at 50° C. Thus, there was obtained a Sn—Ni alloy power.

A specimen of the resultant alloy powder was subjected to analysis by means of X-ray microanalysis (XMA). As a result, Sn, Ni, and O were detected without other elements being detected. Then, the specimen was subjected to analysis by means of inductively coupled plasma emission analysis (ICP). As a result, the content of Sn, that of Ni, and that of O were found to be 30%, 50%, and 65% respectively in terms of the atom number content.

Separately, a specimen of the resultant alloy powder was subjected to qualitative analysis using an X-ray diffraction apparatus. The result revealed that the alloy powder is mostly comprised of thin oxide.

Further, using an X-ray diffraction device RINT 2000 (produced by Kabusiki Kaisha RIGAKU), a specimen of the resultant alloy powder we subjected to wide angle X-ray diffraction analysis using Kα-rays of Cu as a radiation source. As a result, there were observed two main peaks one at 2θ=26.7° and another at 2θ=51.9° in the X-ray diffraction cart, having a half width of 0.3° and that of 0.4°, respectively. Separately, calculation was carried out on the basis of the half widths and the diffraction angles of these peaks and in accordance with the foregoing Scherrer's equation. As a result, there were obtained a crystallite size of 28 nm and another crystallite size of 23 nm.

(2). Preparation of an electrode structural body as an anode 650:

90 parts of the alloy powder obtained in the above, 5 parts of an acetylene black powder as an electrically conductive auxiliary, 2 parts of polyvinyl alcohol, and 3 parts of carboxymethylcellulose were mixed to obtain a mixture, and the mixture was mixed with 100 parts of water as a solvent, and stirred to obtain a paste-like product. The paste-like product was applied on a copper foil as a collector followed by drying, and dried at 150° C. under reduced pressure.

Thus, there was obtained an electrode structural body as an anode 601.

COMPARATIVE EXAMPLE 3

In this comparative example, there was prepared a rechargeable lithium battery having such cross-sectional structure as shown in FIG. 6 by repeating the procedures of Example 1 except that the anode was prepared as will be described below.

The rechargeable lithium battery obtained in this comparative example was evaluated with respect to its batted characteristics in the same manner as in Example 1. The evaluated results are shown in Table 1.

Preparation of an anode 601:

There were provided a cathode comprising a copper foil having a thickness of 18 m which has been degreased and washed using acetone and isopropyl alcohol and dried and an node comprising a tin plate which has been degreased and washed using acetone and isopropyl alcohol and dried.

The cathode and the anode was arranged in an electrolyte solution comprising 40 g/liter of a stannous sulfate. 60 g/liter of sulfuric acid, 2 g/liter of a gelatin, and water as a solvent so as to have an interval between the cathode and the anode, where the electrolyte solution was maintained at 25° C., while stirring the electrolyte solution, a direct current electric field was applied between the cathode and the anode to make the cathode have an electric current density of 10 mA/cm$^2$, and under this condition, energization of 20 C/cm$^2$ was conducted, whereby a layer comprising as metallic tin material was formed on the copper foil as the cathode.

After the copper foil having the metallic tin material layer was washed with water, it was treated by immersing in an aqueous solution containing 60 g/liter of Na$_4$PO$_4$·12H$_2$O dissolved therein maintained at 60° C. for one minute, and the copper soil thus treated was washed with water and dried at 150° C. under reduced pressure. Thus, there was obtained an anode 601.

Using an X-ray diffraction device RINT 2000 (produced by Kabusiki Kaisha RIGAKU), a specimen of the electrode material layer of the anode 601 was subjected to wide angle X-ray diffraction analysis using Kα-rays of Cu as a radiation source, and calculation was carried out on the basis of the half width and the diffraction angle in the X-ray diffraction chart and in accordance with the foregoing Scherrer's equation. As a result, there was obtained a crystallite size of 57 nm.

COMPARATIVE EXAMPLE 4

In this comparative example, there was prepared a rechargeable lithium battery having such cross-sectional structure as shown in FIG. 6 by repeating the procedures of Example 1 except that the anode was prepared as will be described below.

The rechargeable lithium battery obtained in this comparative example was evaluated with respect to its battery characteristics in the same manner as in Example 1. The evaluated results are shown in Table 1.

Preparation of anode 601:

90 parts of a commercially available Sn-powder, 5 parts of an acetylene black powder as an electrically conductive auxiliary, and 5 parts of a polyvinylidene fluoride powder were mixed to obtain a mixture, and the mixture was mixed with 100 parts of N-methyl-2-pyrrolidone as a solvent, and stirred to obtain a paste-like product. The paste-like product was applied on a copper foil as a collector, followed by drying, and dried at 15° C. under reduced pressure. Thus, there was obtained an anode 601.

Now, Using an X-ray diffraction device RINT 2000 (produced by Kabusiki Kaisha RIGAKU), a specimen of aforesaid commercially available Sn-powder was subjected to wide angle X-ray diffraction analysis using K α-rays of Cu as a radiation source, and calculation was carried out on the basis of the half width and the diffraction angle in the X-ray diffraction chart and in accordance with the foregoing Scherrer's equation. AS a result, there was obtained a crystallite size of 80 nm.

COMPARATIVE EXAMPLE 5

In this comparative example, there was prepared a rechargeable lithium battery having such cross-sectional structure as shown in FIG. 6 by repeating the procedures of Example 1 except that the anode was prepared using a Zn-powder prepared as will be described below.

The rechargeable lithium battery obtained in this comparative example was evaluated with respect to its battery characteristics in the same manner as in Example 1. The evaluated results are shown in Table 1.

Preparation of anode 601:
(1). Preparation of a Zn-powder as a electrode material:
6.1 parts of a zinc (II) chloride. 40 parts of a dehydrate of trisodium citrate, and 4.2 parts of ethylenediaminetetraacetic acid were mixed with 100 parts of water and sufficiently stirred to obtain a mixed solution. The mixed solution was introduced into the reaction vessel 203 (provided with the starting material introduction device 202, the reflux device 203, the gas introduction pipe 204, the agitator 205 and the temperature controlling equipment 206) shown in FIG. 2 through the starting material introduction device, and in order to maintain the inside of the reaction vessel in an inert gas atmosphere, argon gas was introduced into the reaction vessel through the gas introduction pipe, where excessive argon gas was exhausted to the outside of the system through the reflux device. The reaction vessel having the mixed solution therein was heated to 70° C. by means of the temperature controlling equipment (water bath), and the mixed solution in the reaction vessel was sufficiently stirred by means of the agitator.

Then, a solution obtained by dissolving 25.0 parts of a sodium hypophosphite as a reducing agent in 75 parts of water was heated to 70° C. and added to the mixed solution in the reaction vessel through the starting material introduction device while stirring the mixed solution, followed by subjecting to a heat treatment at 70° C. for one hour. This adding and mixing step was performed within one minute. The pH value of the content in the reaction vessel was measured. As a result, it was found to have a pH value of 6.5.

Thereafter, the content in the reaction vessel was taken out, and it was washed with water, and vacuum-dried at 50° C. Thus, there was obtained a Zn-power.

A specimen of the resultant powder was subjected to analysis by means of X-ray microanalysis (XMA). As a result, only Zn was detected without other elements being detected. Then, using an X-ray diffraction device RINT 2000 (produced by Kabusiki Kaisha RIGAKU), a specimen of the resultant powder was subjected to wide angle X-ray diffraction analysis using Kα-rays of Cu as a radiation source, and calculation was carried out on the basis of the half width and the diffraction angle in the X-ray diffraction chart and in accordance with the foregoing Scherrer's equation. As a result, there was obtained a crystallite size of 51 nm.

(2). Preparation of an electrode structural body as an anode 601:
90 parts of the Zn-powder obtained ix the above, 5 parts of an acetylene black powder as an electrically conductive auxiliary, and 5 parts of a polyvinylidene fluoride powder were mixed to obtain a mixture, and the mixture was mixed with 100 parts of N-methyl-2-pyrrolidone as a solvent, and stirred to obtain a paste-like product. The paste-like product was applied on a copper foil as a collector, followed by drying, and dried at 150° C. under reduced pressure.

Thus, there was obtained an electrode structural body as an anode 601.

COMPARATIVE EXAMPLE 6

In this comparative example, there was prepared a rechargeable lithium battery having such cross-sectional structure as shown in FIG. 6 by repeating the procedures of Example 1 except that the anode was prepared using a In powder prepared as will be described below.

The rechargeable lithium battery obtained in this comparative example was evaluated with respect to its battery characteristics in the same manner as in Example 1 The evaluated results are shown in Table 1.

Preparation of anode 601:

(1). Preparation of an In-powder as an electrode material:

4.5 parts of a indium (III) chloride, 40.0 parts of a dihydrate of trisodium citrate and 4.2 parts of a disodium ethylenediaminetetraacete were mixed with 100 parts of water and sufficiently stirred to obtain a mixed solution. The mixed solution was introduced into the reaction vessel 201 (provided with the starting material introduction device 202, the reflux device 203, the gas introduction pipe 204, the agitator 205, and the temperature controlling equipment 206) shown in FIG. 2 through the starting material introduction device, and in order to maintain the inside of the reaction vessel in an inert gas atmosphere, argon gas was introduced into the reaction vessel through the gas introduction pipe, where excessive argon gas was exhausted to the outside of the system through the reflux device. The reaction vessel having the mixed solution therein was heated to 70° C. by means of the temperature controlling equipment (water bath) and the mixed solution in the reaction vessel was sufficiently stirred by means of the agitator.

Then, a solution obtained by dissolving 7.5 parts of a sodium hypophosphite as a reducing agent in 25 parts of water was heated to 70° C. and added to the content in the reaction vessel through the starting material introduction device while stirring the content, followed by subjecting a heat treatment at 70° C. for one hour. This adding and mixing step was performed within one minute. The pH value of the content in the reaction vessel was measured. As a result, it was found to have a pH value of 6.5.

Thereafter, the content in the reaction vessel was taken out, and it was washed with water, and vacuum-dried at 50° C. Thus, there was obtained an In-power.

A specimen of the resultant powder was subjected to analysis by means of X-ray microanalysis (XMA). As a result, only In was detected without other elements being detected. Then using an X-ray diffraction device RINT 2000 (produced by Kabusiki Kaisha RIGAKU), a specimen or the resultant powder was subjected to wide angle X-ray diffraction analysis using Kα-rays of Cu as a radiation source, and calculation was carried out on the basis of the half width and the diffraction angle in the X-ray diffraction chart and in accordance with the foregoing Scherrer's equation. As a result, there was obtained a crystallite size of 53 nm.

(2). Preparation of an electrode structural body as anode 601:

90 parts of the In-powder obtained in the above, 5 parts of an acetylene black powder as an electrically conductive auxiliary, and 5 parts of a polyvinylidene fluoride powder were mixed to obtain a mixture, and the mixture was mixed with 100 parts of N-methyl-2-pyrrolidone as a solvent, and stirred to obtain a paste-like product. The paste-like product was applied on a copper foil as a collector, followed by drying, and dried at 150° C. under reduced pressure.

Thus, there was obtained an electrode structural body as an anode 601.

Table 1 illustrates the evaluated battery characteristics of the rechargeable lithium batteries obtained in Examples 1–12 and Comparative Examples 1–6. In Table 1, the values of Examples 2–9 and 12 and those of Comparative Examples 1–4 are normalized values when the values of Example 1 are set at 100 Similarly, the values of Comparative Example 5 are normalized values when the values of Example 10 are set at 100, and the values of Comparative Example 6 are normalized values when the values of Example 11 are set at 100.

As Table 1 illustrates it is understood that when any of the amorphous alloy materials prepared in Examples 1–12 is used as an electrode material constituting the anode of a rechargeable lithium battery, there can be attained a high performance rechargeable lithium battery which excels in the battery capacity and charge-and-discharge Coulombic efficiency and markedly excels particularly in the charging and discharging cycle life.

As detailed in the above, according to the present invention. It is possible to stably produce a highly reliable electrode material for rechargeable lithium battery at a high yield and at reasonable production cost, said electrode material comprising a specific amorphous alloy material (particulate) which has excellent characteristics and comprises particles which are complete and uniform in terms of particle form and which contain impurity a little.

The use of said electrode material makes it possible to industrially produce a high performance rechargeable lithium battery having excellent battery characteristics and a prolonged charging and discharging cycle life at a reasonable production cost.

TABLE 1

|  | battery capacity *1 | charge-and-discharge Coulombic efficiency *2 | charging and discharging cycle life *3 |
|---|---|---|---|
| Example 1 | 100 | 100 | 100 |
| Example 2 | 109 | 106 | 122 |
| Example 3 | 105 | 98 | 101 |
| Example 4 | 100 | 101 | 107 |
| Example 5 | 98 | 99 | 103 |
| Example 6 | 100 | 99 | 95 |
| Example 7 | 95 | 93 | 91 |
| Example 8 | 110 | 105 | 131 |
| Example 9 | 109 | 100 | 100 |
| Example 12 | 101 | 100 | 101 |
| Comparative Example 1 | 111 | 65 | 48 |
| Comparative Example 2 | 59 | 53 | 19 |
| Comparative Example 3 | 110 | 62 | 42 |
| Comparative Example 4 | 105 | 43 | 23 |
| Example 10 | 100 | 100 | 100 |
| Comparative Example 5 | 102 | 87 | 57 |
| Example 11 | 100 | 100 | 100 |
| Comparative Example 6 | 107 | 75 | 51 |

*1 A value per unit weight obtained from a discharged electricity quantity provided in the third cycle. The value of each of Examples 2–9 and 12 and Comparative Examples 1–4 is a value relative to the value of Example 1, which is set at 100. The value of Comparative Example 5 is a value relative to the value of Example 10, which is set at 100. The value of Comparative Example 6 is a value relative to the value of Example 11, which is set at 100.

*2 A value based on a proportion of the discharges electric quantity to the charged electric quantity in the capacity test. The value of each of Examples 2–9 and 12 and Comparative Examples 1–4 is a value relative to the value of Example 1, which is set at 100. The value of Comparative Example 5 is a value relative to the value of Example 10, which is set at 100. The value of Comparative Example 6 is a value relative to the value of Example 11, which is set at 100.

*3 A value based on the number of the charging and discharging cycles when the initial battery capacity became less than 60% in the charging and discharging cycle test. The value of each of Examples 2–9 and 12 and Comparative Examples 1–4 is a value relative to the value of Example 1, which is set at 100. The value of Comparative Example 5 is a value relative to the value of Example 10, which is set at 100. The value of Comparative Example 6 is a value relative to the value of Example 11, which is set at 100.

What is claimed is:

1. A process for producing an electrode material for a rechargeable lithium battery in which an oxidation-reduction reaction is used, said process comprising the steps of:

(1) mixing at least one kind of a metal compound (a) selected from the group consisting of metal salts and metal complexes of a metal (a') capable of being electrochemically alloyed with lithium, at least one kind of transition metal compound (b) selected from the group consisting of transition metal salts and transition metal complexes of a transition metal (b'), and a complexing agent (c) with solvent (d) to obtain a mixed solution, (2) mixing a reducing agent (e) with said solution to obtain a mixture with a pH of less than 2, and (3) oxidizing said reducing agent contained in said mixture obtained in said step (2) to reduce an ion of said metal (a') and an ion of said transition metal (b') contained in said mixture by adding an alkali to said mixture obtained in said step (2) so that the pH value of said mixture is changed from less than 2 to a value in a range of from 3 to 12, thereby to obtain an amorphous alloy material capable of being electrochemically alloyed with lithium as said electrode material.

2. The process according to claim 1, wherein said amorphous alloy material is a powdery amorphous alloy material containing an amorphous metallic material.

3. The process according to claim 2, wherein said powdery amorphous alloy material has a main peak having a half width of more than 0.2° in X-ray diffraction using Kα-rays of Cu as a radiation source.

4. The process according to claim 2, wherein said powdery amorphous alloy material has a main peak having a half width of more than 0.5° in X-ray diffraction using Kα-rays of Cu as a radiation source.

5. The process according to claim 2, wherein said powdery amorphous alloy material has a peak appeared in range of 2θ=25° to 50° in X-ray diffraction using Kα-rays of Cu as a radiation source, having a half width of more than 0.2°.

6. The process according to claim 2, wherein said powdery amorphous alloy material has a peak appeared in range of 2θ=25° to 50° in X-ray diffraction using Kα-rays of Cu as a radiation source having a half width of more than 0.5°.

7. The process according to claim 2, wherein said powdery amorphous alloy material has a crystallite size calculated from X-ray diffraction analysis, which is less than 50 nm.

8. The process according to claim 2, wherein said powdery amorphous alloy material has a crystallite size calculated from X-ray diffraction analysis, which is less than 20 nm.

9. The process according to claim 1, wherein said metal (a') comprises at least one kind of a metal selected from the group consisting of Bi, In, Pb, Si, Ag, Sr, Ge, Zn, Sn, Cd, Sb, Tl, and Hg.

10. The process according to claim 1, wherein said metal (a') comprises at least one kind of a metal selected from the group consisting of Bi, In, Pb, Zn, Sn, Sb and Tl.

11. The process according to claim 1, wherein said metal (a') substantially comprises Sn.

12. The process according to claim 11, wherein said amorphous alloy material contains an amorphous Sn·A·X alloy with a substantially non-stoichiometric ratio composition, with A being at least one kind of a transition metal element, and X being at least one kind of an element selected from the group consisting of B, C, N, O, P, and S, where the element X is not always necessary to be contained, and said amorphous Sn·A·X alloy has a relationship of Sn/(Sn+A+X)=20 to 80 atomic percent in terms of the atom number of each element.

13. The process according to claim 1, wherein said transition metal (b') comprises at least one kind of a transition metal selected from the group consisting of Cr, Mn, Fe, Co, Ni, Cu, Mo, Tc, Ru, Rh, Pd, Ag, Os, Ir, Pt, Au, Ti, V, Y, Sc, Zr, Nb, Hf, Ta, and W.

14. The process according to claim 1, wherein said transition metal (b') comprises at least one kind of a transition metal selected from the group consisting of Cr, Mn, Fe, Co, Ni, Cu, Ru, Rh, Pd, Ag, Os, Ir, Pt, and Au.

15. The process according to claim 1, wherein said transition metal (b') comprises at least one kind of a transition metal selected from the group consisting of Cr, Mn, Fe, Co, Ni, and Cu.

16. The process according to claim 12, wherein said amorphous alloy material has a peak appeared in a range of 2θ=25° to 50° in X-ray diffraction using Kα-rays of Cu as a radiation source, having a half width of more than 0.2°.

17. The process according to claim 12, wherein said amorphous alloy material has a peak appeared in a range of 2θ=25° to 50° in X-ray diffraction using Kα-rays of Cu as a radiation source, having a half width of more than 0.5°.

18. The process according to claim 12, wherein said amorphous alloy material has a crystallite size calculated from X-ray diffraction analysis, which is less than 50 nm.

19. The process according to claim 12, wherein said amorphous alloy material has a crystallite size calculated from X-ray diffraction analysis, which is less than 20 nm.

20. The process according to claim 1, wherein said amorphous alloy material has an average particle size in a range of from 0.1 to 2 µm.

21. The process according to claim 1, wherein said amorphous alloy material has an average particle size in a range of from 0.1 to 1 µm.

22. The process according to claim 20, wherein said amorphous alloy material has a particle size distribution in a range of from 0.01 to 20 µm.

23. The process according to claim 20, wherein said amorphous alloy material has a particle size distribution in a range of from 0.05 to 1 µm.

24. The process according to claim 20, wherein said amorphous alloy material has an average value of (longest length of particle)/(shortest length of particle), which is in a range of from 1.0 to 2.0.

25. The process according to claim 20, wherein said amorphous alloy material has an average value of (longest length of particle)/(shortest length of particle), which is in a range of from 1.0 to 1.5.

26. The process according to claim 1, wherein said amorphous alloy material has a specific surface area of more than 10 $m^2/g$.

27. The process according to claim 1, wherein said amorphous alloy material has a specific surface area of more than 30 $m^2/g$.

28. The process according to claim 1, wherein said metal compound (a) is soluble in said solvent (d).

29. The process according to claim 1, wherein said metal compound (a) comprises at least one kind of a metal salt selected from a group consisting of chlorides, sulfates and nitrates of said metal (a').

30. The process according to claim 1, wherein said metal compound (a) comprises at least one kind of a metal salt selected from a group consisting of chlorides, sulfates and nitrates of Sn.

31. The process according to claim 1, wherein said transition metal compound (b) is soluble in said solvent (d).

32. The process according to claim 1, wherein said transition metal compound (b) comprises at least one kind of a metal salt selected from the group consisting of chlorides, sulfates and nitrates of said transition metal (b').

33. The process according to claim 1, wherein said complexing agent (c) comprises at least one kind of a compound selected from a group consisting of organic carboxylic acids and amines.

34. The process according to claim 33, wherein said complexing agent (c) comprises at least one kind of a compound selected from the group consisting of citric acids, ethylenedianminetetraacetic acid, and salts thereof.

35. The process according to claim 1, wherein said reducing agent (e) comprises a material having an electrode potential which is inferior by more than 0.1 V to that of said metal (a') or said transition metal (b') which is the lowest.

36. The process according to claim 1, wherein said reducing agent (e) comprises a material having an electrode potential which is inferior by more than 0.2 V to that of said metal (a') or said transition metal (b') which is the lowest.

37. The process according to claim 1, wherein said reducing agent (e) comprises a material having a property that an aqueous solution of said material maintained at 25° C. exhibits a normal electrode potential al of less than −0.2 V.

38. The process according to claim 1, wherein said reducing agent (e) comprises a material having a property that an aqueous solution of said material maintained at 25° C. exhibits a normal electrode potential of less than −0.5 V.

39. The process according to claim 1, wherein said reducing agent (e) comprises at least one kind of a compound selected from the group consisting of lower oxygen compounds selected from the group consisting of hypophosphorous acid, phosphorous acid, sulfurous acid, thiosulfuric acid, and dithionous acid; salts of these compounds; metal salts in the low valence state of Fe (II), Ti (III) and Cr (II); organic compounds selected from the group consisting of formaldehyde, formic acid, and oxalic acid; and salts of these organic compounds.

40. The process according to claim 1, wherein said reducing agent (e) is soluble in said solvent (d).

41. The process according to claim 1, wherein said solvent (d) comprises at least one kind of a solvent selected from the group consisting of water and polar solvents.

42. The process according to claim 1, wherein said polar solvent includes alcohol, ester compounds, amide compounds, nitrile compounds, amine compounds, halogen compounds, sulfur compounds, liquid ammonia, and glacial acetic acid.

43. The process according to claim 1, wherein said solvent comprises at least one kind of a solvent selected from a group consisting of water and alcohols.

44. The process according to claim 1, wherein said mixed solution obtained in said step (1) contains a complex formed by said metal (a') and said complexing agent (c).

45. The process according to claim 1, wherein said mixed solution obtained in said step (1) contains a complex formed by said transition metal (b') and said complexing agent (c).

46. The process according to claim 1, wherein the step (2) of mixing the reducing agent (e) with the mixed solution obtained in the step (1) is performed under condition with a temperature of −10 to 100° C.

47. The process according to claim 1, wherein the step (2) of mixing the reducing agent (e) with the mixed solution obtained in the step (1) is performed under condition with a temperature of 10 to 90° C.

48. The process according to claim 1, wherein the step (3) of oxidizing the reducing agent (e) contained in the mixture obtained in the step (2) is performed under condition with a temperature of −10 to 100° C.

49. The process according to claim 1, wherein the step (3) of oxidizing the reducing agent (e) contained in the mixture obtained in the step (2) is performed under condition with a temperature of 10 to 90° C.

50. The process according to claim 1, wherein the addition of said alkali in the step (3) is performed so that the pH value of the mixture is changed from less than 2 to a value in at range of from 5 to 10.

51. The process according to claim 1, wherein the alkali comprises at least one kind of a compound selected from the group consisting of hydroxides of alkali metals, hydroxides of alkaline earth metals, amines, and ammonia.

52. The process according to claim 1, wherein the step (2) is performed in an atmosphere comprising at least one kind of a gas selected from the group consisting of hydrogen gas, nitrogen gas, and inert gas selected from the group consisting of argon gas and helium gas.

53. The process according to claim 1, wherein the step (3) is performed in an atmosphere comprising at least one kind of a gas selected from the group consisting of hydrogen gas, nitrogen gas, and inert gas selected from the group consisting of argon gas and helium gas.

54. The process according to claim 1, wherein the metal compound (a) and the transition metal compound (b) are used respectively in such an amount that (the number of moles of the metal (a') in the metal compound (a))/(the number of moles of the transition metal (b') in the transition metal compound (b)) falls in a range of from 0.1 to 10.

55. The process according to claim 1, wherein the metal compound (a) and the transition metal compound (b) are used respectively in such an amount that (the number of moles of the metal (a') in the metal compound (a))/(the number of moles of the transition metal (b') in the transition metal compound (b)) falls in a range of from 0.2 to 5.

56. The process according to claim 1, wherein the complexing agent (c) is used in such an amount that (the number of moles of the complexing agent (c))/(the number of moles of the metal compound (a)+the number of moles of the transition metal compound (b)) falls in a range of from 1 to 5.

57. The process according to claim 1, wherein the completing agent (c) is used in such an amount that (the number of moles of the complexing agent (c))/(the number of moles of the metal compound (a)+the number of moles of the transition metal compound (b)) falls in a rang of from 2 to 5.

58. The process according to claim 1, wherein the reducing agent (e) is used in an amount which is 1 to 3 times versus the sum of the equivalence point of the metal compound (a) and that of the transition metal compound (b).

59. The process according to claim 1, wherein the reducing agent (e) is used in an amount which is 1 to 2 times versus the sum of the equivalence point of the metal compound (a) and that of the transition metal compound (b).

60. The process according to claim 1, which further includes a step of washing said amorphous alloy material.

61. The process according to claim 1, which further includes a step of drying said amorphous alloy material.

62. The process according to claim 1, which further includes a step of grinding said amorphous alloy material.

63. A process for producing an electrode structural body, including a step of arranging an electrode material produced by the process defined in claim 1 on a collector constituted by a material incapable of being alloyed with lithium in electrochemical reaction.

64. The process according to claim 63, wherein said electrode material is arranged on said collector by way of press-forming.

65. The process according to claim 63, which comprises a step of preparing a paste by mixing said electrode material with a binder and, if necessary, a solvent and a step of arranging said paste on said collector.

66. A process for producing a rechargeable lithium battery comprising at least an anode, a cathode and an electrolyte and in which oxidation-reduction reaction of lithium is used, characterized by including a step (i) of forming said anode by arranging an electrode material produced by the process defined in claim 1 on a collector comprising a material incapable of being alloyed with lithium in electrochemical reaction to form an electrode structural body as said anode and a step (ii) of arranging said anode and said cathode to oppose to each other through said electrolyte.

67. The process according to claim 66, wherein the step (i) includes a step of arranging said electrode material said collector by way of press-forming.

68. The process according to claim 66, wherein the step (i) includes a step of preparing a paste by mixing said electrode material with a binder and, if necessary, a solvent and a step of arranging said paste on said collector.

69. The process according to claim 66 which further includes a step of forming said cathode using a lithium-containing electrode material.

* * * * *

UNITED STATES PATENT AND TRADEMARK OFFICE
CERTIFICATE OF CORRECTION

PATENT NO. : 6,835,332 B2
DATED : December 28, 2004
INVENTOR(S) : Tomoya Yamamoto et al.

It is certified that error appears in the above-identified patent and that said Letters Patent is hereby corrected as shown below:

Title page,
Item [56], References Cited, FOREIGN PATENT DOCUMENTS,
"JP 362464 3/1991" should read -- JP 3-62464 3/1991 --.

Column 1,
Line 42, "effect to" should read -- effect due to --;
Line 50, "circumstance," should read -- circumstances --; and
Line 58, "anya'r" should read -- any air --.

Column 2,
Line 14, "icon" should read -- ion --;
Line 36, "one" should be deleted;
Line 42, "an electrolyte" should read -- in an electrolyte --;
Line 43, "a irregular" should read -- an irregular --; and
Line 55, "situate on" should read -- situation --.

Column 3,
Line 14, "i.e." should read -- i.e., --;
Line 15, "and B;" should read -- and Bi --;
Line 26, "surf" should read -- surf- --;
Line 32, "used the" should read -- used as the --;
Line 37, "respect the" should read -- respect to the --; and
Line 64, "as alloy" should read -- alloy --.

Column 4,
Line 1, "sire" should read -- wire --;
Line 2, "In" should read -- in --;
Line 3, "lifer" should read -- life, --;
Line 31, "metal," should read -- metal. --; and
Line 36, "However" should read -- However, --.

Column 5,
Line 30, "amorphilization" should read -- amorphization --;
Line 59, "of;" should read -- of: --; and
Line 66, "completing" should read -- complexing --.

UNITED STATES PATENT AND TRADEMARK OFFICE
CERTIFICATE OF CORRECTION

PATENT NO. : 6,835,332 B2
DATED : December 28, 2004
INVENTOR(S) : Tomoya Yamamoto et al.

It is certified that error appears in the above-identified patent and that said Letters Patent is hereby corrected as shown below:

Column 6,
Line 1, "M aid" should read -- said --;
Line 16, "Cu" should read -- C, --;
Line 19, "Sn/(sn+A+X)" should read -- Sn/(Sn+A+X) --;
Line 22, "maters al" should read -- material --;
Line 23, "electrodes" should read -- electrode, --;
Line 31, "comprising" should read -- comprises --; and
Line 39, "off" should read -- of --.

Column 7,
Line 15, "ton" should read -- ion --;
Line 18, "a," should read -- a --;
Line 46, "bony" should read -- body --; and
Line 63, "completing" should read -- complexing --.

Column 8,
Line 16, "Ti," should read -- T1, --;
Line 17, "Zn." should read -- Zn, --; and "Sa" should read -- Sn --;
Line 18, "ox" should read -- or --;
Line 21, "To," should read -- Tc, --; and "Ft," should read -- Pt, --;
Line 22, "Ma," should read -- Mn, --; and "Cu." should read -- Cu, --;
Line 23, "Pa," should read -- Pd, --;
Line 24, "Si," should read -- Ni, --;
Line 32, "one," should read -- one --;
Line 43, "0.2," should read -- 0.2°, --; and
Line 64, "the as" should read -- them as --.

Column 9,
Line 4, "mental" should read -- metal --; and
Line 31, "inventions" should read -- invention, --.

Column 10,
Line 16, "(C)]" should read -- (c)] --;
Line 38, "an material" should read -- a material --; and
Line 63, "paste-le" should read -- paste-like --.

Column 11,
Line 6, "a producing" should read -- producing --; and
Line 11, "an given" should read -- a given --.

UNITED STATES PATENT AND TRADEMARK OFFICE
CERTIFICATE OF CORRECTION

PATENT NO. : 6,835,332 B2
DATED : December 28, 2004
INVENTOR(S) : Tomoya Yamamoto et al.

It is certified that error appears in the above-identified patent and that said Letters Patent is hereby corrected as shown below:

Column 12,
Line 34, "molecular hinders to" should read -- molecularly hinders the --;
Line 44, "as small" should read -- is small --;
Line 47, "sanded" should read -- expanded --;
Line 55, "can" should be deleted; and
Line 59, "followings" should read -- following, --; and "sore" should read -- more --.

Column 13,
Line 2, "synthesizing" should be deleted;
Line 3, "rial" should read -- rial is synthesized --; and
Line 56, "stared" should read -- stirred --.

Column 14,
Line 17, "(b') a completing" should read -- (b'), a complexing --;
Line 42, "agent an" should read -- agent in --; and
Line 57, "means;" should read -- means --.

Column 15,
Line 27, "obtain red." should read -- obtained. --;
Line 50, "sulfa" should read -- sulfur --;
Line 58, "dissolved a" should read -- dissolved in a --; and
Line 64, "FIG. C)," should read -- FIG. 1), --.

Column 16,
Lines 1 and 3, "electron" should read -- electrons --;
Line 33, "That is" should read -- That is, --; and
Line 66, "mount" should read -- amount --.

Column 17,
Line 36, "unproved." should read -- improved. --;
Line 46, "diminishes." should read -- diminished. --; and
Line 49, "To adjust" should read -- Adjustment of --.

Column 18,
Line 3, "region) in" should read -- region). ¶ In --;
Line 5, "vale" should read -- value --;
Line 28, "amine" should read -- amines, --;
Line 41, "mired" should read -- mixed --;
Line 57, "on" should read -- ion --;
Line 61, "seating" should read -- heating --; and
Line 65, "following" should read -- following, --; and "made each" should read -- made of each --.

UNITED STATES PATENT AND TRADEMARK OFFICE
CERTIFICATE OF CORRECTION

PATENT NO.    : 6,835,332 B2
DATED         : December 28, 2004
INVENTOR(S)   : Tomoya Yamamoto et al.

It is certified that error appears in the above-identified patent and that said Letters Patent is hereby corrected as shown below:

Column 19,
Line 20, "foaming" should read -- forming --;
Line 38, "ad" should read -- and --;
Line 42, "Pd." should read -- Pd, --; and "AU," should read -- Au, --;
Line 43, "Mm," should read -- Mn, --;
Line 58, "ME," should read -- Mn, --;
Line 59, "sore" should read -- more --;
Line 63, "fee" should read -- the --;
Line 66, "Co." should read -- Co, --; and
Line 67, "To," should read -- Tc, --; and "Au." should read -- Au, --.

Column 20,
Line 9, "AU," should read -- Au, --;
Line 10, "Nb RE," should read -- Nb, Hf, --;
Line 19, "witch" should read -- which --;
Line 25, "as stable" should read -- a stable --;
Line 26, "lie" should read -- like --;
Line 40, "dietylenetriamine and slats" should read -- diethylenetriamine and salts --;
Line 52, "combination two" should read -- combination of two --; and
Line 67, "formamido," should read -- formamide, --; and "N, N-diethylformamide" should read -- N, N-dimethylformamide, --.

Column 21,
Line 1, "1,3-diethyl-2-imidazolidinone," should read -- 1,3-dimethyl-2-imidazolidinone --;
Line 2, "N-methylpyrrolidone nitrites" should read -- N-methylpyrrolidone; nitriles --; and
Line 39, "the the" should read -- the --.

Column 22,
Line 7, "the an" should read -- an --;
Line 8, "maintained at an aqueous solution" should be deleted;
Line 15, "tis" should read -- this --;
Line 21, "ahoy" should read -- alloy --;
Line 28, "asp" should read -- as --;
Line 42, "BI," should read -- Bi, --;
Line 43, "Ti," should read -- T1, --;
Line 47, "No," should read -- Mo, --; and
Line 55, "a meta" should read -- a metal --.

UNITED STATES PATENT AND TRADEMARK OFFICE
CERTIFICATE OF CORRECTION

PATENT NO. : 6,835,332 B2
DATED : December 28, 2004
INVENTOR(S) : Tomoya Yamamoto et al.

It is certified that error appears in the above-identified patent and that said Letters Patent is hereby corrected as shown below:

Column 23,
Line 2, "F has" should read -- P have --;
Line 11, "Sn.A.X." should read -- Sn.A.X., --;
Line 13, "W." should read -- W, --;
Line 23, "then" should read -- than --;
Line 38, "an which" should read -- in which --; and
Line 61, "allow" should read -- alloy --.

Column 24,
Line 20, "patter" should read -- pattern --;
Line 29, "analysts" should read -- analysis --;
Line 31, "powders" should read -- powder, --;
Line 56, "Kα-rays;" should read -- Kα-rays --;
Line 66, "obtain" should read -- obtained --; and
Line 67, "pea" should read -- peak --.

Column 25,
Line 16, "M" should read -- Mn --;
Lines 20, 41, 43 and 44, "alloy." should read -- alloy, --; and
Line 33, "Sn–Cu–B" should read -- Sn–Cu–C --.

Column 26,
Line 2, "comprises" should read -- comprise --;
Line 40, "in" should read -- a --;
Line 42, "from" should read -- form --; and
Line 64, "of obtained" should read -- obtained --.

Column 27,
Line 49, "ethyl cellulose isopropyl" should read -- ethyl cellulose, isopropyl --;
Line 53, "polyoxyethlene, polyN-vinylpyrrolidone," should read -- polyoxyethylene, poly-N-vinylpyrrolidone, --; and
Line 62, "trifluoroetylene" should read -- trifluoroethylene --.

Column 28,
Line 16, "for," should read -- form, --.

Column 29,
Line 23, "oxides" should read -- oxides, --;
Line 26, "element are" should read -- elements are --;
Line 33, "ease" should read -- case --; and
Line 43, "wintering" should read -- sintering --.

UNITED STATES PATENT AND TRADEMARK OFFICE
CERTIFICATE OF CORRECTION

PATENT NO. : 6,835,332 B2
DATED : December 28, 2004
INVENTOR(S) : Tomoya Yamamoto et al.

It is certified that error appears in the above-identified patent and that said Letters Patent is hereby corrected as shown below:

Column 30,
Line 3, "$BF_4^-$" should read -- $BF_4^-$, --; and
Line 15, "Y-butyrolactone" should read -- ϒ-butyrolactone --;
Line 16, "dioxolan, sulfoxide" should read -- dioxolane, sulfolane, --;
Line 20, "sulfuly" should read -- sulfuryl --;
Line 24, "moments," should read -- solvents, --;
Line 55, "memberane" should read -- membrane --.

Column 31,
Line 6, "structured" should read -- structure, --;
Line 10, "those" should read -- this --;
Line 29, "cam)," should read -- can), --; and
Line 64, "trough" should read -- through --.

Column 32,
Line 23, "having" should read -- has --;
Line 28, "resins" should read -- resin, --;
Line 33, "FIG, 7" should read -- FIG. 7 --;
Line 48, "functions" should read -- function --; and
Line 51, "lie," should read -- like, --.

Column 33,
Line 14, "pets" should read -- parts --;
Line 39, "a observed" should read -- was observed --;
Line 41, "lithium" should read -- lithium) --;
Line 42, "completing" should read -- complexing --;
Line 46, "titanium (II)" should read -- titanium (III) --; and
Line 65, "power." should read -- powder. --.

Column 34,
Line 8, "Kabusiki" should read -- Kabushiki --;
Line 27, "au" should read -- an --;
Line 37, "SET" should read -- BET --; and
Line 57, "N-methyl-2-pyrroidone" should read -- N-methyl-2-pyrrolidone --.

Column 35,
Line 13, "d atmosphere" should read -- dry atmosphere --;
Line 20, "sap" should read -- cap --;
Line 40, "off" should read -- of --; and
Line 49, "currant" should read -- current --.

UNITED STATES PATENT AND TRADEMARK OFFICE
CERTIFICATE OF CORRECTION

PATENT NO. : 6,835,332 B2
DATED : December 28, 2004
INVENTOR(S) : Tomoya Yamamoto et al.

It is certified that error appears in the above-identified patent and that said Letters Patent is hereby corrected as shown below:

Column 36,
Line 28, "85.0 parts" should read -- 75.0 parts --;
Line 41, "though" should read -- through --;
Line 51, "analyze." should read -- analyzer. --;
Line 60, "stating" should read -- starting --;
Line 64, "sound" should read -- found --; and
Line 66, "SN" should read -- 8N --.

Column 37,
Line 10, "power." should read -- powder. --;
Line 14, "analysts" should read -- analysis --;
Line 20, "Kabusiki" should read -- Kabushiki --;
Line 51, "au" should read -- as --; and
Line 58, "starred" should read -- stirred --.

Column 38,
Line 14, "dehydrate" should read -- dihydrate --;
Line 52, "SN" should read -- 8N --;
Line 54, "stating" should read -- starting --;
Line 59, "with in" should read -- within --; and
Line 63, "power." should read -- powder. --.

Column 39,
Line 6, "Kabusiki" should read -- Kabushiki --;
Line 32, "additions," should read -- addition, --;
Line 42, "auxiliary" should read -- auxiliary, --;
Line 45, "mined" should read -- mixed --;
Line 47, "collector." should read -- collector, --;
Line 48, "Followed" should read -- followed --; and
Line 67, "oft" should read -- of --.

Column 40,
Line 4, "completing" should read -- complexing --;
Line 39, "of 0.1 Thereafter," should read -- of 0.1. ¶ Thereafter, --;
Line 40, "SN" should read -- 8N --;
Line 43, "be 100," should read -- be 10.0, --;
Line 51, "power." should read -- powder. --; and
Line 61, "Kabusiki" should read -- Kabushiki --.

UNITED STATES PATENT AND TRADEMARK OFFICE
CERTIFICATE OF CORRECTION

PATENT NO.   : 6,835,332 B2
DATED        : December 28, 2004
INVENTOR(S)  : Tomoya Yamamoto et al.

It is certified that error appears in the above-identified patent and that said Letters Patent is hereby corrected as shown below:

Column 41,
Line 37, "ad" should read -- and --; and
Line 66, "device 222," should read -- device 202, --.

Column 42,
Line 15, "analyzers." should read -- analyzer. --;
Line 35, "power." should read -- powder. --;
Line 41, "Su," should read -- Sn, --;
Line 45, "Kabusiki" should read -- Kabushiki --; and
Line 64, "hand" should read -- have --.

Column 43,
Line 7, "mesas" should read -- means --; and
Line 42, "lactate" should read -- laurate --.

Column 44,
Line 2, "missed" should read -- mixed --;
Line 7, "starred." should read -- stirred. --;
Line 12, "SN" should read -- 8N --;
Line 22, "power." should read -- powder. --;
Line 28, "anaslysis" should read -- analysis --;
Line 32, "Kabusiki" should read -- Kabushiki --;
Line 35, "save" should read -- gave --;
Line 40, "pea" should read -- peaks --; and
Line 50, "method as" should read -- method. As --.

Column 45,
Line 3, "aid" should read -- and --;
Line 5, "products." should read -- product. --;
Line 6, "doing," should read -- drying, --;
Line 51, "completing" should read -- complexing --; and "farmed" should read
-- formed --; and
Line 63, "SN" should read -- 8N --.

Column 46,
Line 7, "power." should read -- powder. --;
Line 17, "Kabusiki" should read -- Kabushiki --; and
Line 64, "examples," should read -- example, --.

UNITED STATES PATENT AND TRADEMARK OFFICE
CERTIFICATE OF CORRECTION

PATENT NO. : 6,835,332 B2
DATED : December 28, 2004
INVENTOR(S) : Tomoya Yamamoto et al.

It is certified that error appears in the above-identified patent and that said Letters Patent is hereby corrected as shown below:

Column 47,
Line 19, "mated" should read -- mixed --;
Line 45, "water heated" should read -- water was heated --;
Line 49, "measured as" should read -- measured. As --; and
Line 62, "power." should read -- powder. --.

Column 48,
Line 5, "Kabusiki" should read -- Kabushiki --; and
Line 39, "above" should read -- above, --.

Column 49,
Line 39, "SN" should read -- 8N --;
Line 50, "power." should read -- powder. --; and
Line 60, "Kabusiki" should read -- Kabushiki --.

Column 50,
Line 1, "hale" should read -- half --;
Line 55, "40.1 parts" should read -- 40.0 parts --;
Line 57, "raacete" should read -- raacetate --; and
Line 58, "mused" should read -- mixed --.

Column 51,
Line 4, "heaving" should read -- having --;
Line 17, "sodium," should read -- sodium --;
Line 40, "Kabusiki" should read -- Kabushiki --;
Line 46, "amorphous" should read -- amorphous. --;
Line 47, "separately," should read -- Separately, --; and
Line 50, "were" should read -- was --.

Column 52,
Line 11, "pressure" should read -- pressure. --;
Line 12, "thus," should read -- ¶ Thus, --;
Line 21, "batter" should read -- battery --;
Line 32, "raacete" should read -- raacetate --; and
Line 66, "result. It" should read -- result, it --.

UNITED STATES PATENT AND TRADEMARK OFFICE
CERTIFICATE OF CORRECTION

PATENT NO. : 6,835,332 B2
DATED : December 28, 2004
INVENTOR(S) : Tomoya Yamamoto et al.

It is certified that error appears in the above-identified patent and that said Letters Patent is hereby corrected as shown below:

Column 53,
Line 1, "put" should read -- out --;
Line 2, "wasted" should read -- washed --;
Line 4, "power." should read -- powder. --;
Line 11, "be 45%," should read -- be 48%, --;
Line 14, "Kabusiki" should read -- Kabushiki --;
Line 16, "using." should read -- using --;
Line 32, "tae" should read -- the --; and
Line 41, "hare" should read -- have --.

Column 54,
Line 6, "a an" should read -- as an --;
Line 11, "dehydrate" should read -- dihydrate --;
Line 23, "mimed" should read -- mixed --;
Line 30, "in n" should read -- in --;
Line 34, "pith" should read -- with --;
Line 38, "SN" should read -- 8N --; and
Line 51, "valve and" should read -- valve, and --.

Column 55,
Line 4, "mean" should read -- means --;
Line 31, "mean" should read -- means --; and
Line 39, "Kabusiki" should read -- Kabushiki --.

Column 56,
Line 13, "ant" should read -- and --; and
Line 14, "150 under" should read -- 150° C. under --.

Column 57,
Line 3, "Sn-power." should read -- Sn-powder. --; and
Line 8, "Kabusiki" should read -- Kabushiki --.

UNITED STATES PATENT AND TRADEMARK OFFICE
CERTIFICATE OF CORRECTION

PATENT NO. : 6,835,332 B2
DATED : December 28, 2004
INVENTOR(S) : Tomoya Yamamoto et al.

It is certified that error appears in the above-identified patent and that said Letters Patent is hereby corrected as shown below:

Column 58,
Line 2, "It" should read -- it --;
Line 4, "SN" should read -- 8N --;
Line 6, "starring" should read -- stirring --;
Line 8, "5.0," should read -- 8.0, --;
Line 14, "power." should read -- powder. --;
Line 20, "50%," should read -- 5% --;
Line 25, "thin" should read -- tin --;
Line 27, "Kabusiki" should read -- Kabushiki --;
Line 32, "cart," should read -- chart, --;
Line 39, "anode 650:" should read -- anode 601: --;
Line 59, "batted" should read -- battery --; and
Line 66, "node" should read -- anode --.

Column 59,
Line 1, "was" should read -- were --;
Line 2, "sulfate." should read -- sulfate, --;
Line 15, "soil" should read -- foil --;
Line 19, "Kabusiki" should read -- Kabushiki --;
Line 46, "15° C." should read -- 150° C. --;
Line 47, "Using" should read -- using --;
Line 48, "Kabusiki" should read -- Kabushiki --; and
Line 54, "AS" should read -- As --.

Column 60,
Line 3, "chloride." should read -- chloride, --; and "dehydrate" should read -- dihydrate --;
Line 8, "203" should read -- 201 --;
Line 32, "Zn-power." should read -- Zn-powder. --;
Line 37, "Kabusiki" should read -- Kabushiki --; and
Line 46, "ix" should read -- in --.

Column 61,
Line 5, "ethylenediaminetetraacete" should read -- ethylenediaminetetraacetate --;
Line 32, "In-power." should read -- In-powder. --;
Line 37, "Kabusiki" should read -- Kabushiki --; and
"specimen or" should read -- specimen of --; and
Line 61, "at 100" should read -- at 100. --.

Column 62,
Line 50, "discharges" should read -- discharged --.

UNITED STATES PATENT AND TRADEMARK OFFICE
CERTIFICATE OF CORRECTION

PATENT NO. : 6,835,332 B2
DATED : December 28, 2004
INVENTOR(S) : Tomoya Yamamoto et al.

It is certified that error appears in the above-identified patent and that said Letters Patent is hereby corrected as shown below:

<u>Column 63,</u>
Line 5, "kind of transition" should read -- kind of a transition --;
Line 8, "with solvent" should read -- with a solvent --;
Line 10, "said solution" should read -- said mixed solution --; and
Line 38, "in range" should read -- in a range --.

<u>Column 65,</u>
Line 10, "ethylenedianminetetraacetic" should read -- ethylenediaminetetraacetic --; and
Line 21, "potential al" should read -- potential --.

<u>Column 66,</u>
Line 7, "at" should read -- a --;
Line 44, "pleting" should read -- plexing --; and
Line 47, "rang" should read -- range --.

<u>Column 68,</u>
Line 4, "material said" should read -- material on said --.

Signed and Sealed this

Seventh Day of February, 2006

JON W. DUDAS
*Director of the United States Patent and Trademark Office*